United States Patent
Kagawa

(10) Patent No.: US 7,974,542 B2
(45) Date of Patent: Jul. 5, 2011

(54) OTDM-DPSK SIGNAL GENERATOR CAPABLE OF DETECTING AN OPTICAL CARRIER PHASE DIFFERENCE BETWEEN OPTICAL PULSES

(75) Inventor: Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 950 days.

(21) Appl. No.: 11/905,025

(22) Filed: Sep. 27, 2007

(65) Prior Publication Data
US 2008/0080859 A1 Apr. 3, 2008

(30) Foreign Application Priority Data
Sep. 28, 2006 (JP) .................................. 2006-265680

(51) Int. Cl.
*H04B 10/04* (2006.01)
*H04B 10/12* (2006.01)
(52) U.S. Cl. ............ 398/188; 398/31; 398/98; 398/101; 398/102; 398/182; 398/183; 398/195; 398/198; 398/201
(58) Field of Classification Search ............... 398/31, 398/98, 101, 102, 182–201
See application file for complete search history.

(56) References Cited

U.S. PATENT DOCUMENTS

| 2005/0117191 A1* | 6/2005 | Griffin | 359/245 |
| 2006/0159458 A1* | 7/2006 | Kagawa | 398/75 |
| 2007/0165679 A1* | 7/2007 | Kagawa | 370/516 |
| 2010/0021175 A1* | 1/2010 | Kagawa | 398/101 |

FOREIGN PATENT DOCUMENTS

| JP | 2005-006175 | 1/2005 |
| JP | 2005006176 A * | 1/2005 |

OTHER PUBLICATIONS

R. Ludwig, et al., 160 Gbit/s DPSK-Transmission-Technologies and System Impact; Proc. 30th European Conference on Optical communication (ECOC 2004), Tu1.1, 1; 4 pages.

* cited by examiner

Primary Examiner — Ken N Vanderpuye
Assistant Examiner — Daniel G Dobson
(74) Attorney, Agent, or Firm — Rabin & Berdo, P.C.

(57) ABSTRACT

An OTDM-DPSK signal generator includes an optical splitter, a first and a second phase modulator, an optical coupler, and a monitor signal splitter. The optical splitter splits an optical pulse string into a first and a second optical pulse string. The first and second phase modulators generate a first and a second channel DPSK signal, respectively. The DPSK signals are provided with one bit delay to generate another DPSK signal, which enters the optical coupler, which outputs an OTDM-DPSK signal, which enters a monitor signal splitter. The monitor signal splitter splits from the OTDM-DPSK signal a monitor signal and inputs the monitor signal to an optical carrier phase difference detector. The detector generates an optical carrier phase difference detection signal as a function of an optical carrier phase difference between optical pulses. The optical carrier phase difference can thus be detected between optical pulses in an OTDM-DPSK signal.

13 Claims, 18 Drawing Sheets

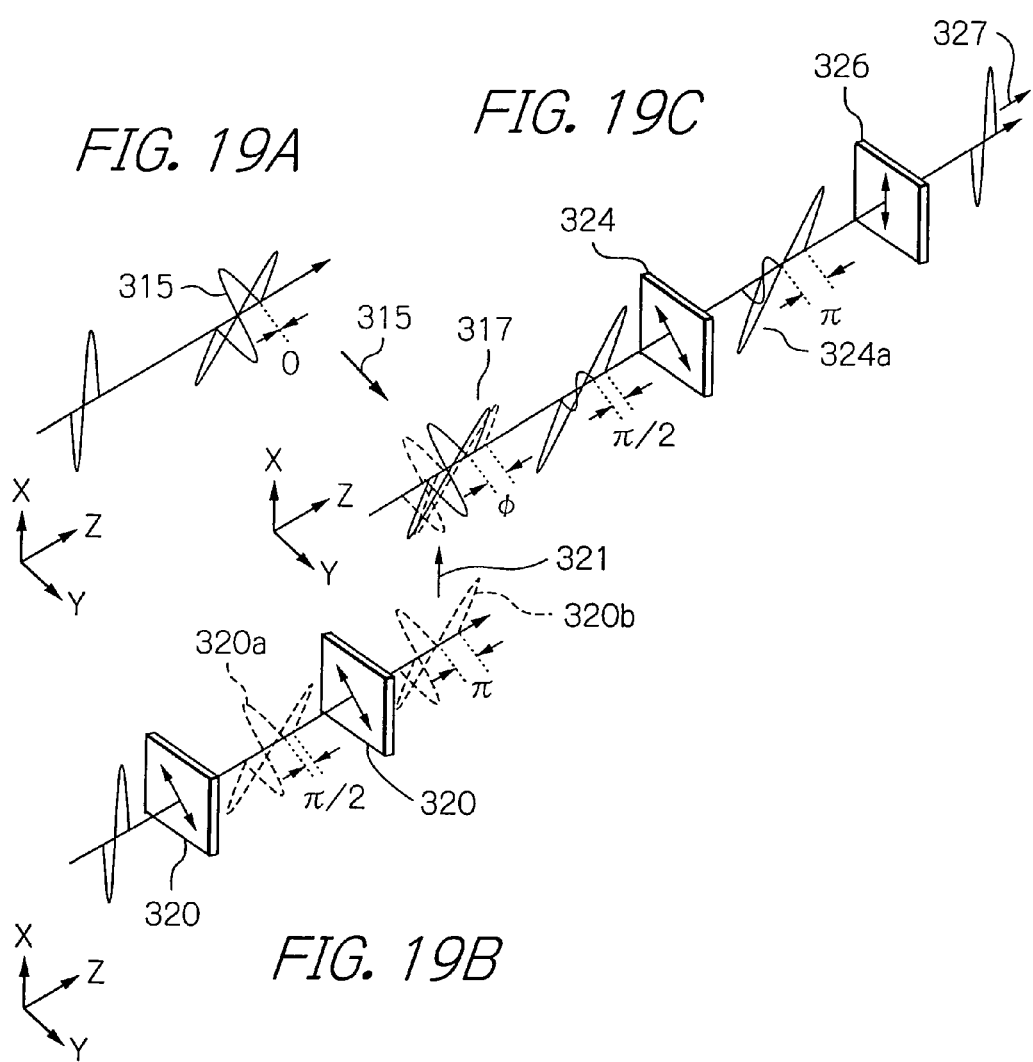

OTDM-DPSK SIGNAL GENERATOR CAPABLE OF DETECTING AN OPTICAL CARRIER PHASE DIFFERENCE BETWEEN OPTICAL PULSES

BACKGROUND OF THE INVENTION

1. Field of the Invention

The present invention relates to an optical pulse signal generator system that provides an optical pulse signal coded in the differential phase shift keying (DPSK) scheme with an optical time division multiplexing (OTDM), thus generating and outputting an optical time division multiplexing differential phase shift keying (OTDM-DPSK) signal, and more particularly to a system for detecting an optical carrier phase difference between optical pulses in an OTDM-DPSK signal and to a system for controlling an optical carrier phase difference between optical pulses.

2. Description of the Background Art

In the field of optical communications technology, the intensity modulation-direct detection (IM-DD) scheme and the balanced detection scheme are proposed, see, for example, R. Ludwig, et al., "160 Gbit/s DPSK-Transmission-Technologies and System Impact" Proc. 30th European Conference on Optical Communication (ECOC 2004), Tu1. 1, 1.

In the IM-DD scheme, a receiver end uses a photo diode to determine the envelope strength of an optical carrier of a received signal to detect the received signal. One typical example is optical communications using an optical pulse signal coded in the amplitude shift keying (ASK) scheme. Although the intensity modulation is generally referred to as the amplitude shift keying (ASK) or the on and off keying (OOK), the following description simply refers to the intensity modulation as the ASK.

In the balanced detection scheme, a receiver end uses a balanced detector to sensing an electrical signal with amplitude twice as large as in the IM-DD scheme to detect the received signal. One typical example is optical communications using an optical pulse signal coded in the DPSK scheme.

The IM-DD scheme has advantages that it allows for transmitting and received signals using a simple system and it may apply to an intensity recovering system incorporating an optical amplifier. The advantages allow the scheme to be widely used. The DPSK scheme uses two variables of zero and $\pi$ to modulate an optical pulse string to produce and output a transmission signal, and the receiver end divides a received signal into first and second received signals, providing the first received signal with a time delay corresponding to a period of time occupied by one optical pulse, i.e. one bit, on the time axis, adding the first received signal having the time delay and the second received signal to each other, and providing the resulting received signal with the balanced detection. Hereafter, n is a positive integer, and 1/n of the time occupied by one optical pulse on the time axis may be referred to as a time corresponding to 1/n bit. A transmission signal (optical pulse signal) resultant from modulation of an optical pulse string using two variables of zero and $\pi$ may also be referred to as a transmission signal coded in DPSK scheme or an optical pulse signal coded in DPSK scheme.

An optical pulse and the phase of an optical pulse will be described in more detail below. An optical pulse is observed as a change in light strength or intensity. An optical pulse is represented as the envelope of the amplitude waveform of the electric field vector of an optical carrier. In the following discussion, therefore, the temporal waveform of an optical pulse is directed to a representation of the envelope of the amplitude waveform of the electric field vector of an optical pulse.

The phase of an optical carrier for an optical pulse is directed to a representation of the relative phase of the peak of an optical carrier with respect to the peak of the envelope of the electric field vector of the optical pulse, and is referred to as the optical carrier phase or the absolute phase. Strictly speaking, the optical carrier phase or the absolute phase may be referred to as the carrier-envelope phase (CEP). The phase of an optical carrier for an optical pulse will hereafter be referred to as an optical carrier phase. Each peak of the envelope of the electric field vector of an optical pulse includes a great many peaks of the optical carrier.

For example, a wavelength of 1.5 μm for the optical carrier corresponding to a frequency of approximately $2\times10^{14}$ Hz. If the optical pulse has its repetition frequency approximately equal to 40 GHz, the frequency is $4\times10^{10}$ Hz. Therefore, each peak of the envelope of the electric field vector of the optical pulse includes 5000 [$=(2\times10^{14})/(4\times10^{10})=5\times10^{3}$] peaks of the optical carrier.

The modulation of the optical pulse using the two variables of zero and $\pi$ corresponds to maintaining the phase of the electric field vector of an optical carrier (the phase for an optical carrier) in an optical pulse or shifting the phase by $\pi$ with respect to the envelope of an optical carrier. In other words, the modulation of an optical pulse using the two variables of zero and $\pi$ corresponds to maintaining the optical carrier phase or shifting the phase by $\pi$.

It is known that the balanced detection scheme applied to the DPSK scheme may improve the receiver sensitivity by 3 dB or more compared to the intensity modulation-direct detection scheme applied to the ASK scheme, see, for example, R. Ludwig, et al., indicated above.

R. Ludwig, et al., discloses an OTDM communications system in DPSK scheme. The system operates as follows. The system generates a DPSK signal of 40 Gbit/s. The system divides the DPSK signal into four signals. The system provides, except the first line signal (corresponding to one channel), the second, third and fourth line signals (corresponding to three channels) with a time delay corresponding to ¼, 2/4, ¾ bit, respectively. The system multiplexes the first to fourth line signals (including the first line signal without time delay), thus producing the OTDM signal. Among the four line signals, therefore, the first line is of the actual signal and the remaining second, third and fourth lines may be considered as copy signals of the first line signal. The practical generator system requires the first to fourth line signals to be different. The OTDM communications system in DPSK scheme disclosed in R. Ludwig, et al., may thus not be directly used to provide a system that generates practical OTDM-DPSK signals.

With reference to FIG. 1, a description will be given of an exemplified system in which the practical multiple-channel optical pulse signals coded in DPSK scheme are provided with the OTDM to generate an optical time division multiplexing differential phase shift keying signal, the system being sometimes referred to as "OTDM-DPSK signal generator system". The system is configured according to the OTDM communications system in DPSK scheme disclosed in R. Ludwig, et al. FIG. 1 is a schematic block diagram of the configuration of an OTDM-DPSK signal generator system 10.

The OTDM-DPSK signal generator system 10 includes an optical splitter 12, a first phase modulator 14, a second phase modulator 16, a ½-bit delay device 18, and an optical coupler

20. The OTDM-DPSK signal generator system 10 is supplied with a transmission signal from the first and second modulator drivers 22 and 24.

An optical pulse string 11 including optical pulses at regular intervals on the time axis enters the OTDM-DPSK signal generator system 10. The optical pulse string 11 is split by the optical splitter 12 into a first and a second optical pulse string 13-1 and 13-2. The first and second optical pulse strings 13-1 and 13-2 enter the first and second phase modulators 14 and 16, respectively.

In the first and second phase modulators 14 and 16, the first and second optical pulse strings 13-1 and 13-2 are decoded in DPSK scheme using the transmission signals 23 and 25 supplied from the first and second modulator drivers 22 and 24, thus generating and outputting the first and second phase shift keying signals 15 and 17, respectively.

The second phase shift keying signal 17 enters the ½-bit delay device 18 that provides the signal 17 with a time delay corresponding to ½ bit, thus generating and outputting a delayed second phase shift keying signal 19. The first phase shift keying signal 15 and the delayed second phase shift keying signal 19 are multiplexed by the optical multiplexer 20, thus generating and outputting a multiple phase shift keying signal 21. The OTDM-DPSK signal generator system 10 thus has a function of being responsive to the optical pulse string 11 to convert the two-channel transmission signals supplied from the first and second modulator drivers 22 and 24 into the DPSK signal, and providing the two-channel DPSK signals with the OTDM to output a resultant signal.

Although FIG. 1 shows an example where the two-channel OTDM is provided, the OTDM with any number of channels may be applied. For example, the four-channel OTDM may be provided by providing the first to fourth channel optical pulse signals coded in DPSK scheme with respective time delays corresponding to zero, ¼, 2/4, and ¾ bit, and multiplexing resultant signals.

In order that the OTDM-DPSK signal generator system 10 may operate as a system that generates an OTDM-DPSK signal, it is required that the first and second optical pulse strings 13-1 and 13-2 generated in the optical splitter 12 experience no phase modulation other than the phase modulation provided by the first phase modulator 14, the second phase modulator 16, and the ½-bit delay device 18. In the optical multiplexer 20, therefore, the optical carrier phase differences between the optical pulses in the first phase shift keying signal 15 and between the optical pulses in the delayed second phase shift keying signal 19 must not take a value other than zero or $\pi$.

Temperature variations or the like cause fluctuations in the optical path length, however, of an transmission line over which the first and second optical pulse strings 13-1 and 13-2 propagate, and the transmission line over which the first and second phase shift keying signals 15 and 17 propagate, and the transmission line over which the delayed second phase shift keying signal 19 propagates. It is extremely difficult for the conventional technologies to reduce the fluctuations in the optical path length below a level that is negligible compared to zero or $\pi$ in terms of the optical carrier phase. Therefore, a need exists for a method of detecting and controlling an optical carrier phase difference between optical pulses in an optical pulse signal.

One example of the method of detecting and controlling an optical carrier phase difference is disclosed by Japanese patent laid-open publication No. 2005-006175. The '175 Japanese publication discloses a method that splits a portion from an optical pulse signal coded in ASK scheme, leads the split optical pulse signal to an interferometer, and observes the intensity of the interference light output from the interferometer.

The method disclosed in the '175 publication will be described below with respect to, for example, the optical pulse signal in carrier-suppressed-return-to-zero (CS-RZ) format. An optical pulse signal in CS-RZ format is generated from an optical pulse string (which may be referred to hereafter as "the CS optical pulse string") coded in ASK scheme, the optical pulse string including adjacent optical pulses with an optical carrier phase difference of $\pi$ between them.

In order to divide a portion of the optical pulse signal in CS-RZ format according to its intensity to detect an optical carrier phase difference, the signal is led to an optical carrier phase difference detection system. The optical carrier phase difference detection system divides the input optical pulse signal in CS-RZ format into two sub-signals. The system then provides one sub-signal with one bit delay, and then causes the two sub-signals to interfere again. When the interference signal is thus output from the optical carrier phase difference detection system, the ideal optical pulse signal in CS-RZ format will cause output light of zero intensity, the ideal optical pulse signal including adjacent optical pulses with the optical carrier phase difference between them taking no other value than $\pi$.

This is for the following reasons. The CS-RZ format includes smallest optical pulses that invert their phases between zero and $\pi$ on a bit-by-bit basis. When the optical pulse string is divided into two sub-strings, one sub-string is provided with one bit delay and the two sub-strings are then caused to interfere, the optical pulses both of which have an optical carrier phase of $\pi$ will interfere.

When, in an optical pulse signal in CS-RZ format, the adjacent optical pulses have between them an optical carrier phase difference that takes a value other than zero and $\pi$, the optical carrier phase difference detection system outputs an interference signal having non-zero intensity. Specifically, when the optical pulses have between them an optical carrier phase difference that is offset from zero or $\pi$ by an angle of $\phi$ (zero<$\phi$=<$\pi$), the optical carrier phase difference detection system outputs an interference signal having an intensity that increases as $\phi$ approaches zero and that has the maximum intensity for $\phi$=zero. Thus, the time average of the intensity of the interference signal output from the optical carrier phase difference detection system may be monitored to know the value of $\phi$. A feedback control may be performed so that the time average of the intensity of the interference signal output from the optical carrier phase difference detection system is always of the minimum. This may generate the ideal optical pulse signal in CS-RZ format in which the optical carrier phase difference between the adjacent optical pulses takes no other value than $\pi$. Hereafter, $\phi$ may be referred to as the size of phase fluctuations.

The optical carrier phase difference detection method that uses the optical pulse signal in CS-RZ format may not apply, however, to the OTDM-DPSK signal output from the OTDM-DPSK signal generator system described with reference to FIG. 1. The reason will be described below with reference to FIG. 2, parts (A), (B), and (C). FIG. 2, parts (A), (B), and (C) show the temporal waveforms of an optical signal at each location in the OTDM-DPSK signal generator system. Part (A) shows the temporal waveform of the first phase shift keying signal 15. Part (B) shows the temporal waveform of the delayed second phase shift keying signal 19. Part (C) shows the temporal waveform of the multiple phase shift keying signal 21. The temporal waveforms shown in parts (A), (B), and (C) include the envelopes of the amplitude waveforms of the electric field vector of the optical carrier, but only the positive halves of the envelopes are depicted with the negative halves thereof omitted from illustration. The x-axis is the time axis and the y-axis represents the amplitude, both on an arbitrary scale.

The first phase shift keying signal 15 shown in FIG. 2, part (A) and the delayed second phase shift keying signal 19 shown in part (B) interfere with each other when the optical pulses in the signals 15 and 19 have the optical carrier phases of zero and $\phi$, $\phi$ and $\pi$, zero and $(\pi+\phi)$, and $\pi$ and $(\pi+\phi)$, respectively. When the ideal optical pulse signal in CS-RZ format is provided with the OTDM to be generated in the vorm of multiple phase shift keying signal 21, the phase fluctuations have a size of zero, i.e. $\phi$=zero. However, because fluctuations in optical path length occur in each optical transmission line over which the optical signal of the OTDM-DPSK signal generator system propagates, some control is required to keep $\phi$=zero.

The first and second phase modulators 14 and 16 modulate the optical pulses in the CS optical pulse string by zero or $\pi$ as the optical carrier phase. Specifically, the modulators 14 and 16 provide the optical pulses in the CS optical pulse string without shift of the optical carrier phase of the optical pulses (zero modulation), or with $\pi$ shift of the optical carrier phase of the optical pulses ($\pi$ modulation).

The optical carrier phase of the optical pulses in the first and delayed second phase shift keying signals 15 and 19 are provided with, after the modulation in the first and second phase modulators 14 and 16, respectively, no phase change, shown as zero in FIG. 2, parts (A) and (B), or a phase change of $\pi$ shift, shown as $\pi$ in parts (A) and (B). In addition to the phase modulation, the optical carrier phase of the optical pulses of the first and delayed second phase shift keying signals 15 and 19 is added with the phase fluctuations $\phi$ caused by the fluctuations in the optical path length or the like.

Therefore, when the first phase shift keying signal 15 shown in FIG. 2, part (A) and the delayed second phase shift keying signal 19 shown in part (B) are added to or combined with each other, the resultant multiple phase shift keying signal 21 has a temporal waveform as shown in part (C). The reason will be described below.

In FIG. 2, parts (A), (B), and (C), the time axis is sectioned by vertical broken lines into time intervals each including one optical pulse. In parts (A), (B), and (C), the leftmost optical pulses will now be considered. Among the optical pulses in the first phase shift keying signal 15 shown in part (A), the leftmost optical pulse has an optical carrier phase of zero. Among the optical pulses in the delayed second phase shift keying signal 19 shown in part (B), the leftmost optical pulse has an optical carrier phase of $\phi$. When the two pulses interfere, the resultant optical pulse has a non-zero finite amplitude, referred to as a first amplitude, as shown in part (C) as the leftmost one of the optical pulses in the multiple phase shift keying signal 21.

Now, the second left optical pulses will be considered. The optical pulse with an optical carrier phase of $\phi$ and the optical pulse with an optical carrier phase of $\pi$ interfere, thus generating an optical pulse having amplitude, referred to as a second amplitude, different from the first amplitude.

Therefore, when viewing the amplitudes of the optical pulses in the signals shown in FIG. 2, parts (A), (B) and (C) from left to right, the following may be concluded. The optical pulse having the first amplitude is generated when the optical pulses in the first and delayed second phase shift keying signals 15 and 19 interfere with each other with their optical carrier phases of zero and $\phi$, and $\pi$ and $(\pi+\phi)$, respectively. The optical pulse having the second amplitude is generated when the optical pulses in the first and delayed second phase shift keying signals 15 and 19 interfere with each other their optical carrier phases of $\phi$ and $\pi$, and zero and $(\pi+\phi)$, respectively.

It can therefore be seen that the multiple phase shift keying signal 21 includes two types of optical pulses: the first size optical pulses and the second size optical pulses. The two types of optical pulses in the multiple phase shift keying signal 21 have amplitudes which are the function of $\phi$ that is caused by the fluctuations in the optical path length or the like. When $\phi$ approximates zero, the first amplitude is larger than the second amplitude. When $\phi$ approximates $\pi$, the second amplitude is larger than the first amplitude. FIG. 2, part (C), shows an example where the first amplitude is larger than the second amplitude, i.e. $\phi$ approximates zero.

Therefore, when $\phi$ changes between zero and $\pi$, the first and second amplitudes change in a relationship that when one amplitude decreases the other increases. The average intensity of the multiple phase shift keying signal 21 thus remains unchanged, thus preventing the optical carrier phase difference detection method that uses the optical pulse signal in CS-RZ format from detecting the phase difference $\phi$.

SUMMARY OF THE INVENTION

It is therefore an object of the present invention to provide an OTDM-DPSK signal generator system including an optical carrier phase difference detector which can detect an optical carrier phase difference between optical pulses in an OTDM-DPSK signal.

It is another object of the present invention to provide an OTDM-DPSK signal generator system that may control an optical carrier phase difference between optical pulse signals coded in DPSK scheme according to the optical carrier phase difference value detected by an optical carrier phase difference detector.

A first OTDM-DPSK signal generator system includes an OTDM-DPSK signal generator and an optical carrier phase difference detector. The first OTDM-DPSK signal generator system generates and outputs a duplex OTDM-DPSK signal. The OTDM-DPSK signal generator and the optical carrier phase difference detector are configured as follows.

The OTDM-DPSK signal generator includes an optical splitter, a first and second phase modulators, an optical coupler, and a monitor signal splitter. The optical splitter splits an optical pulse string into a first optical pulse string and a second optical pulse string. The first and second phase modulators receive the first and second optical pulse strings, thus generating and outputting a first and a second DPSK signal coded in DPSK scheme, respectively. The optical coupler provides the first and second channel DPSK signals with an OTDM, thus generating and outputting a duplex OTDM-DPSK signal. The monitor signal splitter splits from the duplex OTDM-DPSK signal a monitor signal.

The optical carrier phase difference detector receives the monitor signal, and generates and outputs an optical carrier phase difference detection signal as a function of an optical carrier phase difference between optical pulses in the monitor signal.

It is apparent that the first OTDM-DPSK signal generator system generally generating and outputting $2^N$-multiple OTDM-DPSK signals, where N is an integer of 2 or more, may be configured as follows. The OTDM-DPSK signal generator includes an optical splitter, a first to a $2^N$th phase modulator, plural ($2^{N-1}$) optical couplers, plural ($2^{N-1}$) first-order monitor signal splitters, and plural ($2^{N-k}$) kth-order monitor signal splitters.

Specifically, the OTDM-DPSK signal generator includes an optical splitter, a first to a $2^N$th phase modulator, plural ($2^N-1$) optical couplers, and plural ($2^{N-k}$) kth-order monitor signal splitters, where k is an integer from 1 to N. The optical splitter splits an optical pulse string into a first to a $2^N$th optical pulse string, where N is an integer of 2 or more. The first to $2^N$th phase modulators receive the first to $2^N$th optical pulse strings, thus generating and outputting a first to a $2^N$th channel DPSK coded in DPSK scheme, respectively. The ($2^N-1$) optical couplers provide the first to $2^N$th channel DPSK signals with an OTDM, thus generating and outputting $2^N$-multiple OTDM-DPSK signals. The ($2^{N-1}$) first-order monitor signal splitters splits, from plural ($2^{N-1}$) first-order OTDM-DPSK signals, first-order monitor signals, respectively. The ($2^{N-1}$) first-order OTDM-DPSK signals are generated from the adjacent ith channel and (i+1)th channel DPSK signals provided with the OTDM, where i is an integer from 1 to $2^N-1$. The ($2^{N-k}$) kth-order monitor signal splitters split, from plural ($2^{N-k}$) kth-order OTDM-DPSK signals, kth-order monitor signals, respectively, where k is an integer from 1 to N.

The optical carrier phase difference detector receive the first to kth-order monitor signals, and generate and output plural ($2^N-1$) optical carrier phase difference detection signals as a function of optical carrier phase differences respectively present between optical pulses in each of the first to kth-order monitor signals.

The optical carrier phase difference detection signal has a total number of ($2^N-1$) for the reasons described below. The optical carrier phase difference detection signals are given as a function of the optical carrier phase differences respectively present between the optical pulses in each of the first to kth-order monitor signals. The optical carrier phase difference detection signals thus have the same total number as the first to kth-order monitor signals. The first-order monitor signal has a number of ($2^{N-1}$). The second-order monitor signal has a number of ($2^{N-2}$). The kth-order monitor signal generally has a number of ($2^{N-k}$). The first to kth-order monitor signals thus have a total number of $2^{N-1}+2^{N-2} \ldots +2^0 = 2^N-1$.

A second OTDM-DPSK signal generator system includes an OTDM-DPSK signal generator, an optical carrier phase difference detector, and an optical carrier phase difference controller. The second OTDM-DPSK signal generator system has a function of generating and outputting a duplex OTDM-DPSK signal, and controlling, according to the optical carrier phase difference value detected by the optical carrier phase difference detector, the optical carrier phase difference of the OTDM-DPSK signal. The OTDM-DPSK signal generator, the optical carrier phase difference detector, and the optical carrier phase difference controller are configured as follows.

The OTDM-DPSK signal generator includes an optical splitter, a first and a second phase modulator, an optical coupler, and a monitor signal splitter. The optical splitter splits an optical pulse string into a first optical pulse string and a second optical pulse string. The first and second phase modulators receive the first and second optical pulse strings, thus generating and outputting a first and a second channel DPSK signal coded in DPSK scheme, respectively. The optical coupler provides the first and second channel DPSK signals with the OTDM, thus generating and outputting a duplex OTDM-DPSK signal. The monitor signal splitter splits from the duplex OTDM-DPSK signal a monitor signal.

The optical carrier phase difference detector receives the monitor signal, and generates and outputs an optical carrier phase difference detection signal as a function of the optical carrier phase difference between the optical pulses in the monitor signal.

The optical carrier phase difference controller receives the optical carrier phase difference detection signal, and generates and outputs an optical carrier phase difference control signal to control the OTDM-DPSK signal generator so that fluctuations defined as an offset from a phase value zero or π to be taken by the optical carrier phase of the optical pulses in the OTDM-DPSK signal are reduced to zero.

In a second OTDM-DPSK signal generator system that generally generates and outputs $2^N$-multiple OTDM-DPSK signals, where N is an integer of 2 or more, the OTDM-DPSK signal generator, the optical carrier phase difference detector, and the optical carrier phase difference controller may be configured as follows.

The OTDM-DPSK signal generator includes an optical splitter, a first to a $2^N$th phase modulator, plural ($2^N-1$) optical couplers, plural ($2^N-1$) first-order monitor signal splitters, and plural ($2^{N-k}$) kth-order monitor signal splitters, where k is an integer from 1 to N. The optical splitter splits an optical pulse string into a first to a $2^N$th optical pulse string, where N is an integer of 2 or more. The first to $2^N$th phase modulators receive the first to $2^N$th optical pulse strings, thus generating and outputting a first to a $2^N$th channel DPSK signal coded in DPSK scheme, respectively. The ($2^N-1$) optical couplers provide the first to $2^N$th channel DPSK signals with the OTDM, thus generating and outputting $2^N$-multiple OTDM-DPSK signals. The ($2^{N-1}$) first-order monitor signal splitters split, from plural ($2^{N-1}$) first-order OTDM-DPSK signals, first-order monitor signals, respectively. The ($2^{N-1}$) first-order OTDM-DPSK signals are generated from the adjacent ith channel and (i+1)th channel DPSK signals provided with the OTDM, where i is an integer from 1 to $2^N-$). The ($2^{N-k}$) kth-order monitor signal splitters split, from the ($2^{N-k}$) kth-order OTDM-DPSK signals, where k is an integer from 1 to N, kth-order monitor signals, respectively.

The optical carrier phase difference detector receives the first to kth-order monitor signals, and generates and outputs plural ($2^N-1$) optical carrier phase difference detection signals as a function of optical carrier phase differences respectively present between the optical pulses in each of the first to kth-order monitor signals.

The optical carrier phase difference controller receives the ($2^N-1$) optical carrier phase difference detection signals, and generates and outputs a first to a kth optical carrier phase difference control signal to control the OTDM-DPSK signal generator so that fluctuations defined as an offset from a phase value zero or π to be taken by the optical carrier phase of the optical pulses in the OTDM-DPSK signal are reduced to zero.

A third OTDM-DPSK signal generator system includes an OTDM-DPSK signal generator and an optical carrier phase difference detector.

The OTDM-DPSK signal generator includes a wavelength division multiplexing (WDM) coupler, an optical splitter, a first and a second phase modulator, an optical coupler, and a WDM splitting filter. The WDM coupler adds an optical pulse string at a wavelength of $\lambda_1$ and an optical pulse string at a wavelength of $\lambda_2$, thus generating and outputting a multiple wavelength optical pulse string. The optical splitter splits the multiple wavelength optical pulse string into a first multiple wavelength optical pulse string and a second multiple wavelength optical pulse string.

The first and second phase modulators receive the first and second multiple wavelength optical pulse strings, thus generating and outputting a first and a second channel DPSK signal coded in DPSK scheme, respectively. The optical coupler provides the first and second channel differential phase shift keying signals with the OTDM, thus generating and outputting a duplex OTDM-DPSK signal. The WDM splitting filter splits the duplex OTDM-DPSK signal into an OTDM-DPSK signal at a wavelength of $\lambda_1$ and a monitor signal at a wavelength of $\lambda_2$.

The optical carrier phase difference detector receives the monitor signal, thus generating and outputting an optical carrier phase difference detection signal as a function of an optical carrier phase difference between optical pulses in the monitor signal.

A fourth OTDM-DPSK signal generator system includes an OTDM-DPSK signal generator and an interference signal detector.

The OTDM-DPSK signal generator includes a WDM coupler, an optical splitter, a first and a second phase modulator, and a compound optical add drop module. The WDM coupler adds an optical pulse string at a wavelength of $\lambda_1$ and an optical pulse string at a wavelength of $\lambda_2$, thus generating and outputting a multiple wavelength optical pulse string. The optical splitter splits the multiple wavelength optical pulse string into a first and a second multiple wavelength optical pulse string. The first and second phase modulator receive the first and second multiple wavelength optical pulse strings, thus generating and outputting a first and a second channel DPSK signal coded in DPSK scheme, respectively. The compound optical add drop module receives the first and second DPSK signals and provides the signals with the OTDM, thus generating and outputting a duplex OTDM-DPSK signal and generating and outputting an interference monitor signal at a wavelength of $\lambda_2$.

The interference signal detector receives the interference monitor signal, thus generating and outputting an optical carrier phase difference detection signal as a function of an optical carrier phase difference between the optical pulses in the interference monitor signal.

The compound optical add drop module may include a first half mirror, a second half mirror, a third half mirror, a ¼-wavelenth plate, and a fourth half mirror. The second half mirror is provided at an output of the first half mirror to which the first channel DPSK signal incident on the first half mirror is reflected and output. The third half mirror is provided at an output of the first half mirror to which the first channel DPSK signal incident on the first half mirror is transmitted and output. The ¼-wavelenth plate is provided at an output of the third half mirror to which the first channel DPSK signal incident on the third half mirror is reflected and output. The fourth half mirror is provided at a position where signal light reflected and output from the second half mirror and signal light reflected and output from the third half mirror interfere.

In the first to fourth OTDM-DPSK signal generator systems that generate and output the duplex OTDM-DPSK signals, the OTDM-DPSK signal generator preferably includes a bit delay device. The bit delay device provides the second channel DPSK signal with a time delay necessary to bit interleave each of the first and second channel DPSK signals to provide them with the OTDM. The time delay corresponds to half of the time on a time axis occupied by one of the optical pulses in the second channel differential phase shift keying signal.

In the first and second OTDM-DPSK signal generator systems that generate and output the $2^N$-multiple OTDM-DPSK signals, the OTDM-DPSK signal generator preferably includes a bit delay circuit. The bit delay circuit provides each of the second to $2^N$th channel DPSK signals with a time delay necessary to bit interleave the signals to provide them with the OTDM.

In the first to fourth OTDM-DPSK signal generator systems that generate and output the duplex OTDM-DPSK signals, the optical carrier phase difference detector preferably includes an optical carrier interferometer and an interference signal detector. The optical carrier interferometer receives the input monitor signal, and modulates, depending on the optical carrier phase difference between the optical pulses in the monitor signal, the intensity of the monitor signal to generate interference light, and outputs the interference light as an interference monitor signal. The interference signal detector receives the interference monitor signal, thus generating and outputting an optical carrier phase difference detection signal.

The interference signal detector includes: a photoelectric converter that photoelectrically converts the interference multiple monitor signal, thus outputting an electrical interference signal; a low-pass filter that cuts off a high frequency component of the electrical interference signal, thus outputting a low frequency electrical interference signal; and an intensity detector that detects a time average intensity of the low frequency electrical interference signal, thus outputting the optical carrier phase difference detection signal.

In the first and second OTDM-DPSK signal generator systems that generate and output the $2^N$-multiple OTDM-DPSK signals, the optical carrier phase difference detector preferably includes k optical carrier interferometers and an interference signal detector, where k is an integer from 1 to $2^N-1$. The k optical carrier interferometers receive the input first to kth order monitor signals, and modulate, depending on the optical carrier phase differences respectively present between the optical pulses in the first to kth order monitor signals, intensity of the first to kth order monitor signals to generate interference light, and output the interference light as first to kth interference monitor signals, respectively. The interference signal detector receives the kth interference monitor signals, thus generating and outputting the plural ($2^N-1$) optical carrier phase difference detection signals.

The interference signal detector includes: k photoelectric converters that photoelectrically convert the first to kth interference multiple monitor signals, thus outputting first to kth electrical interference signals, respectively; a low-pass filter that cuts off high frequency components of the first to kth electrical interference signals, thus outputting first to kth low frequency electrical interference signals, respectively; and an intensity detector that detects a time average intensity of the first to kth low frequency electrical interference signals, thus outputting the optical carrier phase difference detection signals.

In the second OTDM-DPSK signal generator system that generates and outputs the duplex OTDM-DPSK signal, the optical carrier phase difference controller preferably includes a bias signal adjustment device and a first and a second signal coupler. The bias signal adjustment device supplies the first and second phase modulators with a first and a second bias adjustment signal, respectively. The first and second signal couplers couple and add the first and second bias signals to a first and a second channel transmission signal supplied from a first and a second modulator driver, respectively.

In the second OTDM-DPSK signal generator system that generates and outputs the $2^N$-multiple OTDM-DPSK signals, the optical carrier phase difference controller preferably includes a bias signal adjustment device and a first to a $2^N$th signal coupler. The bias signal adjustment device supplies the first to $2^N$th phase modulators with a first to a $2^N$th bias adjustment signal, respectively. The first to $2^N$th signal couplers couple and add the first to $2^N$th bias adjustment signals to a first to a $2^N$th channel transmission signal supplied from a first to a $2^N$th modulator driver, respectively.

The optical carrier interferometer preferably includes a first optical splitter, a second optical splitter, a third optical splitter, a $\pi$ phase shifter, a $\pi/2$ phase shifter, a first optical coupler, a second optical coupler, and a third optical coupler.

The first optical splitter intensity splits the monitor signal into a first and a second split monitor signal and outputs the signals to a first and a second arm waveguide, respectively.

The second optical splitter splits the first split monitor signal according to its intensity into a (1-1)th and a (1-2)th split monitor signal and outputs the signals to a (1-1)th and a (1-2)th arm waveguide, respectively.

The third optical splitter splits the second split monitor signal according to its intensity into a (2-1)th and a (2-2)th split monitor signal and outputs the signals to a (2-1)th and a (2-2)th arm waveguide, respectively.

The optical path lengths of the (1-1)th and (1-2)th arm waveguides are set so that the (1-1)th and (1-2)th split monitor signals have a time delay difference therebetween corresponding to a time occupied by one of the optical pulses on the time axis.

The optical path lengths of the (2-1)th and (2-2)th arm waveguides are set so that the (2-1)th and (2-2)th split monitor signals have a time delay difference therebetween corresponding to a time occupied by one of the optical pulses on the time axis.

The $\pi$ phase shifter is provided in the (2-2)th arm waveguide, and shifts an optical carrier phase of the (2-1)th split monitor signal by $\pi$, thus generating and outputting a $\pi$ phase shifted (2-1)th split monitor signal.

The second optical coupler multiplexes the (1-1)th and (1-2)th split monitor signals that have propagated over the (1-1)th and (1-2)th arm waveguides, respectively, thus generating and outputting a second multiple monitor signal.

The third optical coupler multiplexes the $\pi$ phase shifted (2-2)th split monitor signal output from the $\pi$ phase shifter and the (2-1)th split monitor signal that has propagated over the (2-1)th arm waveguide, thus generating and outputting a third multiple monitor signal.

The $\pi/2$ phase shifter shifts an optical carrier phase of the third multiple monitor signal by $\pi/2$, thus generating and outputting a $\pi/2$ phase shifted third multiple monitor signal.

The first optical coupler multiplexes the second multiple monitor signal output from the second optical coupler and the $\pi/2$ phase shifted third multiple monitor signal, thus generating and outputting the first multiple monitor signal.

The optical path length from the first optical splitter to the second optical splitter is set substantially equal to the optical path length from the first optical splitter to the third optical splitter. The optical path length from the second optical coupler to the first optical coupler is set substantially equal to the optical path length from the third optical coupler to the first optical coupler.

The optical carrier interferometer preferably includes a first half mirror, a ¼-wavelenth plate, a second half mirror, a first ½-bit delay device, a first phase fine adjustment device, a first total reflection mirror, a second total reflection mirror, a third half mirror, a second ½-bit delay device, a second phase fine adjustment device, a third total reflection mirror and a fourth total reflection mirror.

The optical carrier interferometer includes, in the direction in which the input signal passes through the first half mirror, the first half mirror, the ¼-wavelenth plate, the second half mirror, the first ½-bit delay device, the first phase fine adjustment device, and the first total reflection mirror in series. The optical carrier interferometer also includes, in the direction in which the input signal reflects from the first half mirror, the first half mirror, the third half mirror, the second ½-bit delay device, the second phase fine adjustment device, and the third total reflection mirror in series. The second total reflection mirror is provided on a side of the second half mirror to which signal light passing through the first half mirror is reflected and output by the second half mirror. The fourth total reflection mirror is provided on a side of the third half mirror to which signal light passing through the first half mirror is reflected and output by the third half mirror.

The optical carrier interferometer further preferably includes a polarizer, a half mirror, a ½-bit delay device, a first total reflection mirror, a first uniaxial crystal, a second total reflection mirror, a second uniaxial crystal, and an analyzer.

The optical carrier interferometer includes, in a direction in which an input signal passes through the half mirror, the polarizer, the half mirror, the first uniaxial crystal, and the second total reflection mirror in series. The optical carrier interferometer also includes, from an output end surface of the half mirror to which input signal light is reflected and output by the half mirror, the ½-bit delay device and the first total reflection mirror in sequence. The optical carrier interferometer also includes, from an end surface opposite to the end surface of the half mirror to which input signal light is reflected and output by the half mirror, the second uniaxial crystal and the analyzer in sequence.

In the first OTDM-DPSK signal generator system that generates and outputs the duplex OTDM-DPSK signal, the monitor signal splitter in the system splits from the OTDM-DPSK signal the monitor signal.

The monitor signal includes, as will be described below, information on the optical carrier phase difference between the optical pulses in the OTDM-DPSK signal. The monitor signal enters the optical carrier phase difference detector, thus generating and outputting the optical carrier phase difference detection signal as a function of the optical carrier phase difference between the optical pulses in the monitor signal.

In the first OTDM-DPSK signal generator system, therefore, the optical carrier phase difference detector may detect the optical carrier phase difference between the optical pulses in the OTDM-DPSK signal.

When the first OTDM-DPSK signal generator system is extended to a more general system that generates and outputs the $2^N$-multiple OTDM-DPSK signals, the system may detect the optical carrier phase difference between the optical pulses in the $2^N$-multiple OTDM-DPSK signal.

The second OTDM-DPSK signal generator system that generates and outputs the duplex OTDM-DPSK signal includes the OTDM-DPSK signal generator, the optical carrier phase difference detector, and additionally the optical carrier phase difference controller. The second OTDM-DPSK signal generator system may thus detect the optical carrier phase difference between the optical pulses in an OTDM-DPSK signal. The second OTDM-DPSK signal generator system may also control, according to the optical carrier phase difference detection signal supplied from the optical carrier phase difference detector to the optical carrier phase difference controller, the optical carrier phase difference between the optical pulse signals coded in DPSK scheme.

When the second OTDM-DPSK signal generator system is extended to a more general system that generates and outputs the $2^N$-multiple OTDM-DPSK signals, the system may detect the optical carrier phase difference between the optical pulses in the $2^N$-multiple OTDM-DESK signal. The system may also control, according to the optical carrier phase difference detection signal supplied from the optical carrier phase difference detector to the optical carrier phase difference controller, the optical carrier phase difference between the optical pulse signals coded in DPSK scheme.

In the third OTDM-DPSK signal generator system, the OTDM-DPSK signal generator includes the WDM coupler that adds the optical pulse strings at wavelengths of $\lambda_1$ and $\lambda_2$, thus generating and outputting the multiple wavelength optical pulse string. The generator also includes the WDM splitting filter that splits the duplex OTDM-DPSK signal into the OTDM-DPSK signal at a wavelength of $\lambda_1$ and the monitor signal at a wavelength of $\lambda_2$ and outputs them.

The third OTDM-DPSK signal generator system may thus generate a monitor signal having a different wavelength from the OTDM-DPSK signal. The third OTDM-DPSK signal generator system may thus operate so that when the phase fluctuations of the TDM-DPSK signal have the minimum size $\phi$, the optical carrier phase difference detection signal has a value between the maximum and the minimum. Depending on the variations of the optical carrier phase difference detection signal, the phase fluctuations size $\phi$ may be increased or decreased, thus making it possible to determine the direction (increasing or decreasing) of the variation of the phase fluctuations size $\phi$.

The fourth OTDM-DPSK signal generator system includes the OTDM-DPSK signal generator and the optical carrier phase difference detector. In the OTDM-DPSK signal generator, the optical coupler and WDM splitting filter are replaced by the compound optical add drop module that combines the functions of the two components. The compound optical add drop module receive, specifically, the first and second channel DPSK signals, thus generating and outputting the duplex OTDM-DPSK signal at a wavelength of $\lambda_1$ and also the monitor signal at a wavelength of $\lambda_2$. The compound optical add drop module may thus be used to reduce the number of parts in the OTDM-DPSK signal generator and provide a lower cost to manufacture the system.

The compound optical add drop module may include the first half mirror, the second half mirror, the third half mirror, the ¼-wavelenth plate, and the fourth half mirror. The compound optical add drop module may thus have a function of receiving the first and second channel DPSK signals, thus generating and outputting the duplex OTDM-DPSK signal at a wavelength of $\lambda_1$ and also the monitor signal at a wavelength of $\lambda_2$.

The first to fourth OTDM-DPSK signal generator systems may include the bit delay device. The systems may thus bit interleave each of the first and second channel DPSK signals, thus generating the duplex OTDM-DPSK signal. The first and second OTDM-DPSK signal generator systems may include the bit delay circuit. The systems may thus bit interleave each of the second to $2^N$th channel DPSK signals, thus generating and outputting the $2^N$-multiple OTDM-DPSK signals.

In the first to fourth OTDM-DPSK signal generator systems that generate and output the duplex OTDM-DPSK signal, the optical carrier phase difference detector may include the optical carrier interferometer and the interference signal detector. The systems may thus generate and output the optical carrier phase difference detection signal. Likewise, in the first and second OTDM-DPSK signal generator systems that generate and output the $2^N$-multiple OTDM-DPSK signals, the optical carrier phase difference detector may include the k optical carrier interferometers and the interference signal detector. The systems may thus generate and output the plural ($2^N$–1) optical carrier phase difference detection signals.

The optical carrier interferometer may include the first optical splitter, the second optical splitter, the third optical splitter, the $\pi$ phase shifter, the $\pi/2$ phase shifter, the first optical coupler, the second optical coupler, and the third optical coupler. The OTDM-DPSK signal generator system may generate and output, from the monitor signal, the first multiple monitor signal.

For the convenience of the description, when the function of the optical carrier interferometer alone is described, a signal corresponding to an interference monitor signal is referred to as a first multiple monitor signal. This is done, however, to generally describe the function of the optical carrier interferometer without the limitation that the interferometer is incorporated into the optical carrier phase difference detector as a component. Specifically, when the optical carrier interferometer is incorporated into the optical carrier phase difference detector as a component, the monitor signal entering the optical carrier interferometer will output the interference monitor signal.

The optical carrier interferometer may also preferably include the first half mirror, the ¼-wavelenth plate, the second half mirror, the first ½-bit delay device, the first phase fine adjustment device, the first total reflection mirror, the second total reflection mirror, the third half mirror, the second ½-bit delay device, the second phase fine adjustment device, the third total reflection mirror, and the fourth total reflection mirror. The optical carrier interferometer may thus be manufactured, for small production, as a low cost optical carrier interferometer.

The optical carrier interferometer may also preferably include the polarizer, the half mirror, the ½-bit delay device, the first total reflection mirror, the first uniaxial crystal, the second total reflection mirror, the second uniaxial crystal, and the analyzer. The optical carrier interferometer may thus be manufactured, for small production, as a low cost and compact optical carrier interferometer.

BRIEF DESCRIPTION OF THE DRAWINGS

The objects and features of the present invention will become more apparent from consideration of the following detailed description taken in conjunction with the accompanying drawings in which:

FIGS. 19A, 19B and 19C are schematic views useful for understanding the operation of the second bulk optical element, FIG. 19A illustrating the polarization state of a first split signal passing through a first path, FIG. 19B illustrating the polarization state of a second split signal passing through a second path, FIG. 19C illustrating the polarization state of an interference signal caused by interference between the first and second split signals passing through the first and second paths, respectively.

DESCRIPTION OF THE PREFERRED EMBODIMENTS

Figure 1:
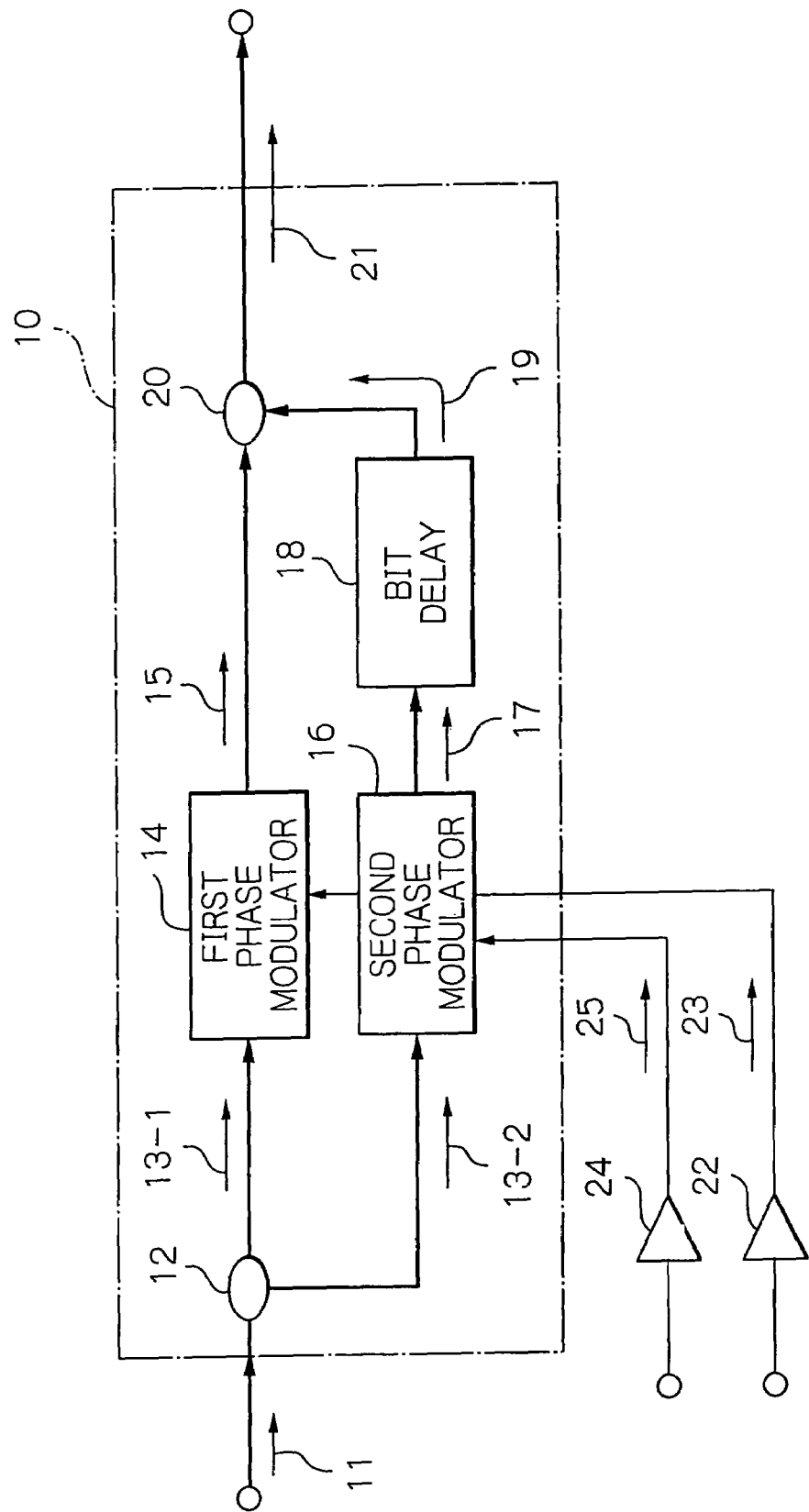
FIG. 1 is a schematic block diagram of the configuration of an OTDM-DPSK signal generator system.
Figure 2:
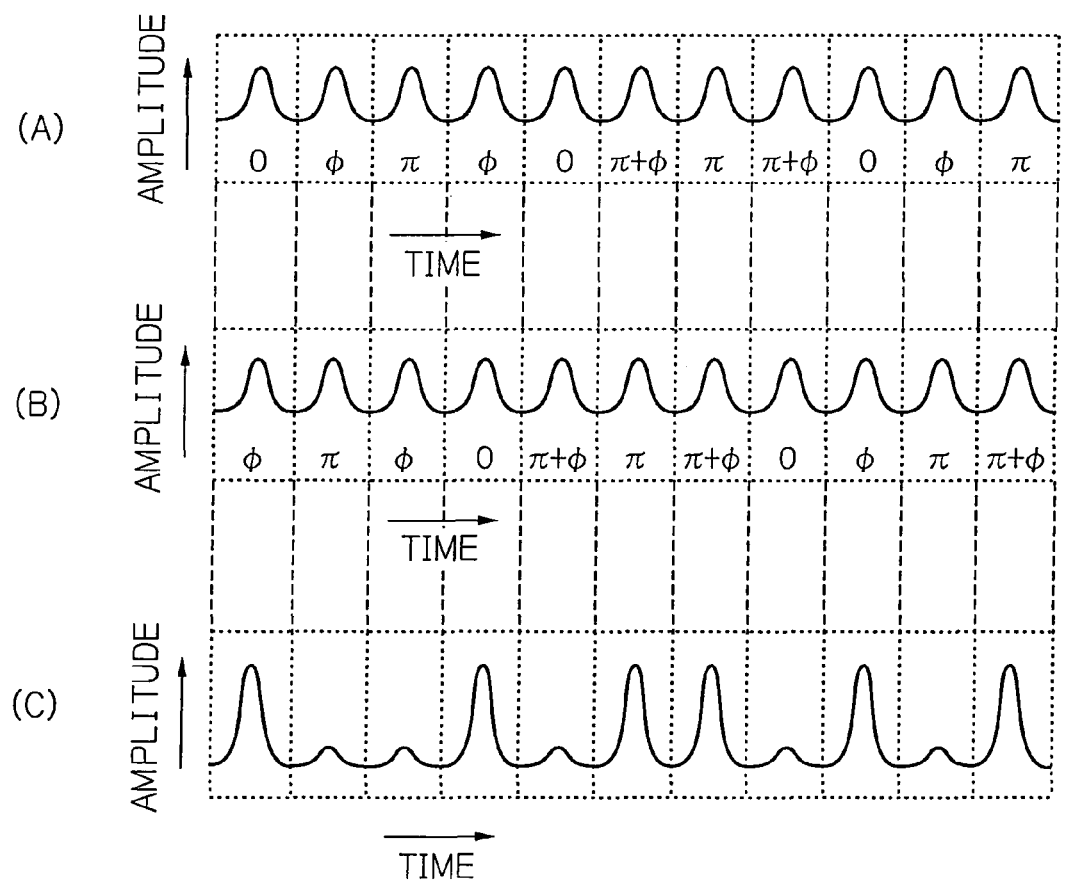
FIG. 2 shows the temporal waveforms of an optical signal in an OTDM-DPSK signal generator system, wherein part (A) shows the temporal waveform of a first phase shift keying signal, part (B) shows the temporal waveform of a delayed second phase shift keying signal, and part (C) shows the temporal waveform of a multiple phase shift keying signal.

With reference to the accompanying drawings, preferred embodiments of the present invention will be described in more detail below. Those drawings show exemplified configurations of embodiments of the invention, and are merely intended to schematically show the arrangement or the like of constituent elements to the extent that the present invention can be well understood, and should not be understood to restrict the invention thereby. In the following discussion, specific conditions or the like may be used, but they are merely appropriate examples, and the present invention is not limited thereto.

In the drawings, arrows are depicted along transmission lines of signals with reference numerals attached thereto to identify the signals propagating over the corresponding transmission lines. Arrows along transmission lines may sometimes be omitted but instead directly provide transmission line with reference numerals that identify signals propagating thereover. Throughout the drawings, like components are designated by the same reference numerals, and their repetitive description may be omitted.

Figure 3:
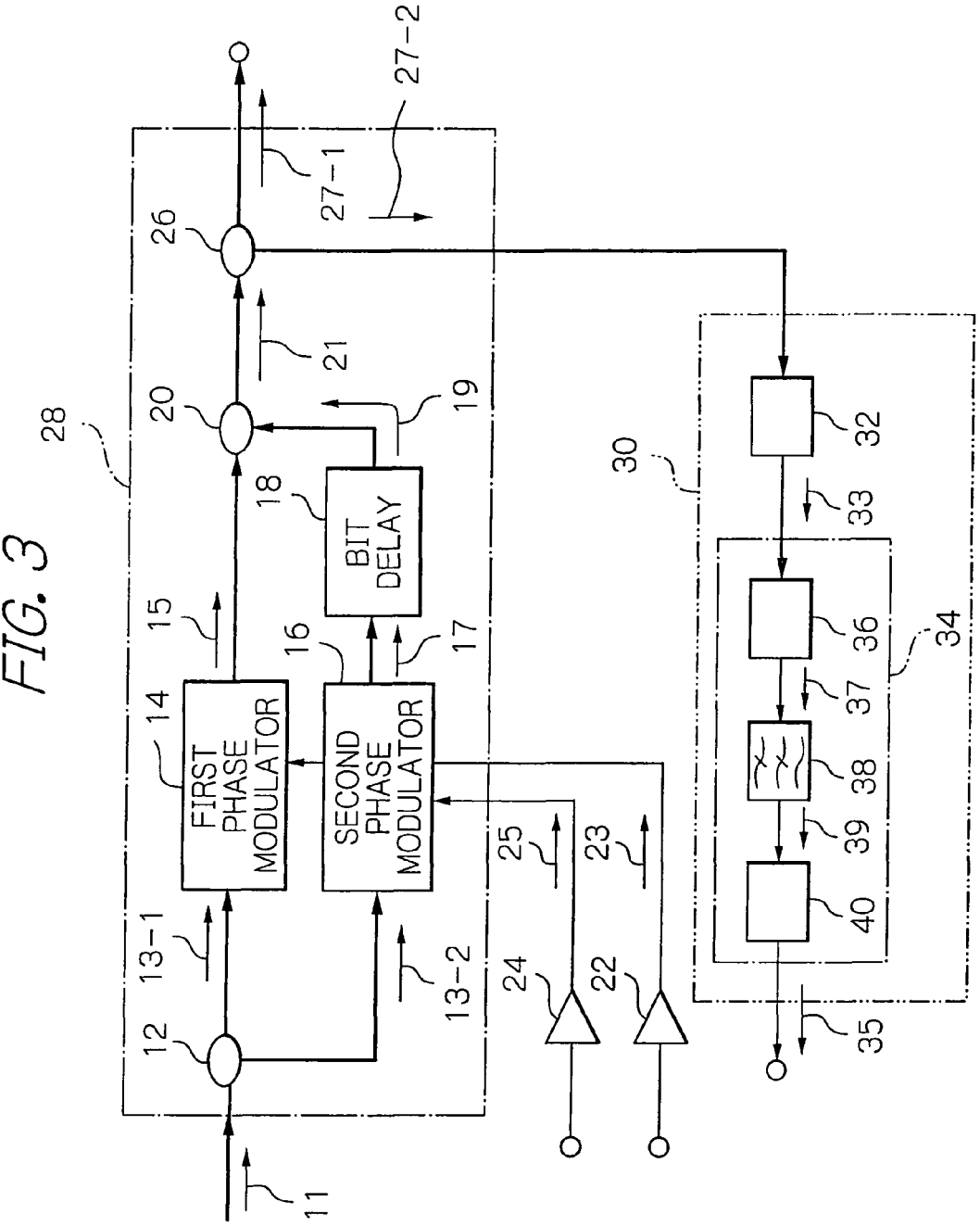
FIG. 3 is a schematic block diagram of the configuration of a duplex OTDM-DPSK signal generator system including an optical carrier phase difference detector.

Referring to now FIG. 3, the configuration and operation of a first optical time division multiplexing differential phase shift keying (OTDM-DPSK) signal generator system will be described below. FIG. 3 is a schematic block diagram of the configuration of a duplex OTDM-DPSK signal generator system including an optical carrier phase difference detector that detects an optical carrier phase difference between optical pulses in an OTDM-DPSK signal.

The first duplex OTDM-DPSK signal generator system includes an OTDM-DPSK signal generator 28 and an optical carrier phase difference detector 30, which are interconnected as illustrated.

The OTDM-DPSK signal generator 28 includes the optical splitter 12, the first phase modulator 14, the second phase modulator 16, the ½-bit delay device 18, the optical coupler 20, and a monitor signal splitter 26, which are interconnected as shown. The optical splitter 12 splits the optical pulse string 11 into the first optical pulse string 13-1 and the second optical pulse string 13-2. The first and second phase modulators 14 and 16 receive the first and second optical pulse strings 13-1 and 13-2, respectively. The modulators 14 and 16 then generate the first and second channel DPSK signals 15 and 17 coded in DPSK scheme and output them, respectively.

The first channel binary digital signal is amplified by the first modulator driver 22 to a level that can operate the first phase modulator 14. The amplified signal is then supplied to the first phase modulator 14 as the first channel electrical signal 23. Similarly, the second channel binary digital signal is amplified by the second modulator driver 24 to a level that may operate the second phase modulator 16. The amplified signal is then supplied to the second phase modulator 16 as the second channel electrical signal 25.

The first channel DPSK signal 15 is a signal generated by the first phase modulator 14 that codes the first optical pulse string 13-1 in DPSK scheme. The first signal 15 enters the optical coupler 20. The second channel DPSK signal 17 is a signal generated by the second phase modulator 16 that codes the second optical pulse string 13-2 in DPSK scheme. The second signal 17 enters the ½-bit delay device 18. The ½-bit delay device 18 provides the DPSK signal 17 with a time delay, thus generating the DPSK signal 19, and outputs it. The time delay, which may be referred to hereafter as "½-bit time delay", corresponds to ½ of the time occupied by one of the optical pulses in the input DPSK signal 17 on the time axis. The DPSK signal 19 then enters the optical coupler 20.

The ½-bit delay device 18 may include an etalon using such as BK7 glass. The etalon may be used as the ½-bit delay device 18 by selecting an etalon with a thickness required to provide a ½-bit time delay to the DPSK signal 17 passing through the etalon and inserting the etalon between the second phase modulator 16 and the optical coupler 20.

The optical coupler 20 provides the first channel DPSK signal 15 and the ½-bit time-delayed DPSK signal 19 with the OTDM by bit interleaving the signals 15 and 19, thus generating and outputting the duplex OTDM-DPSK signal 21. The OTDM-DPSK signal 21 then enters the monitor signal splitter 26.

The monitor signal splitter 26 splits the OTDM-DPSK signal 21 into a monitor signal 27-1 and a monitor signal 27-2. The OTDM-DPSK signal 27-1 is output as the output signal of the OTDM-DPSK signal generator 28. The monitor signal 27-2 enters the optical carrier phase difference detector 30.

The optical carrier phase difference detector 30 generates and outputs an optical carrier phase difference detection signal 35 as a function of an optical carrier phase difference between the optical pulses in the monitor signal 27-2.

The optical carrier phase difference detector 30 includes an optical carrier interferometer 32 and an interference signal detector 34, which are interconnected as depicted. The optical carrier interferometer 32 receives the monitor signal 27-2. The monitor signal 27-2 is subject to an intensity modulation depending on the optical carrier phase difference between the optical pulses in the monitor signal 27-2, thus outputting an interference signal light as an interference monitor signal 33. The interference signal detector 34 receives the interference monitor signal 33, and generates and outputs an optical carrier phase difference detection signal 35.

The interference signal detector 34 includes an photoelectric converter 36, a low-pass filter 38, and an intensity detector 40, which are interconnected as illustrated. The photoelectric converter 36 photoelectrically converts the interference monitor signal 33, thus outputting an electrical interference signal 37. When the interference monitor signal 33 is photoelectrically converted, the signal 33 loses information on its nature as the optical carrier, i.e. the frequency component of the optical carrier, and an electrical signal waveform formed of an envelope of the optical carriers is generated as the electrical interference signal 37. Specifically, the photoelectric converter 36 may not respond to the frequency components of the optical carrier at a frequency much higher than the bit rate frequency of the interference multiple monitor signal. The photoelectric converter 36 may only generate, as the electrical interference signal 37, the electrical signal component formed of the envelope of the optical carriers at a frequency equal to the bit rate frequency of the interference multiple monitor signal.

The low-pass filter 38 cuts off the high frequency components of the electrical interference signal 37, thus outputting an electrical interference signal 39 that is a simple voltage signal. The intensity detector 40 detects the time average intensity of the electrical interference signal 39 in the form of direct-current voltage. The detector 40 then converts the intensity to a direct-current signal that may operate an optical carrier phase difference controller as will be described below. The detector 40 then outputs the direct-current signal as the optical carrier phase difference detection signal 35. The low-pass filter 38 may include a loop filter and the like as appropriate.

Figure 4:
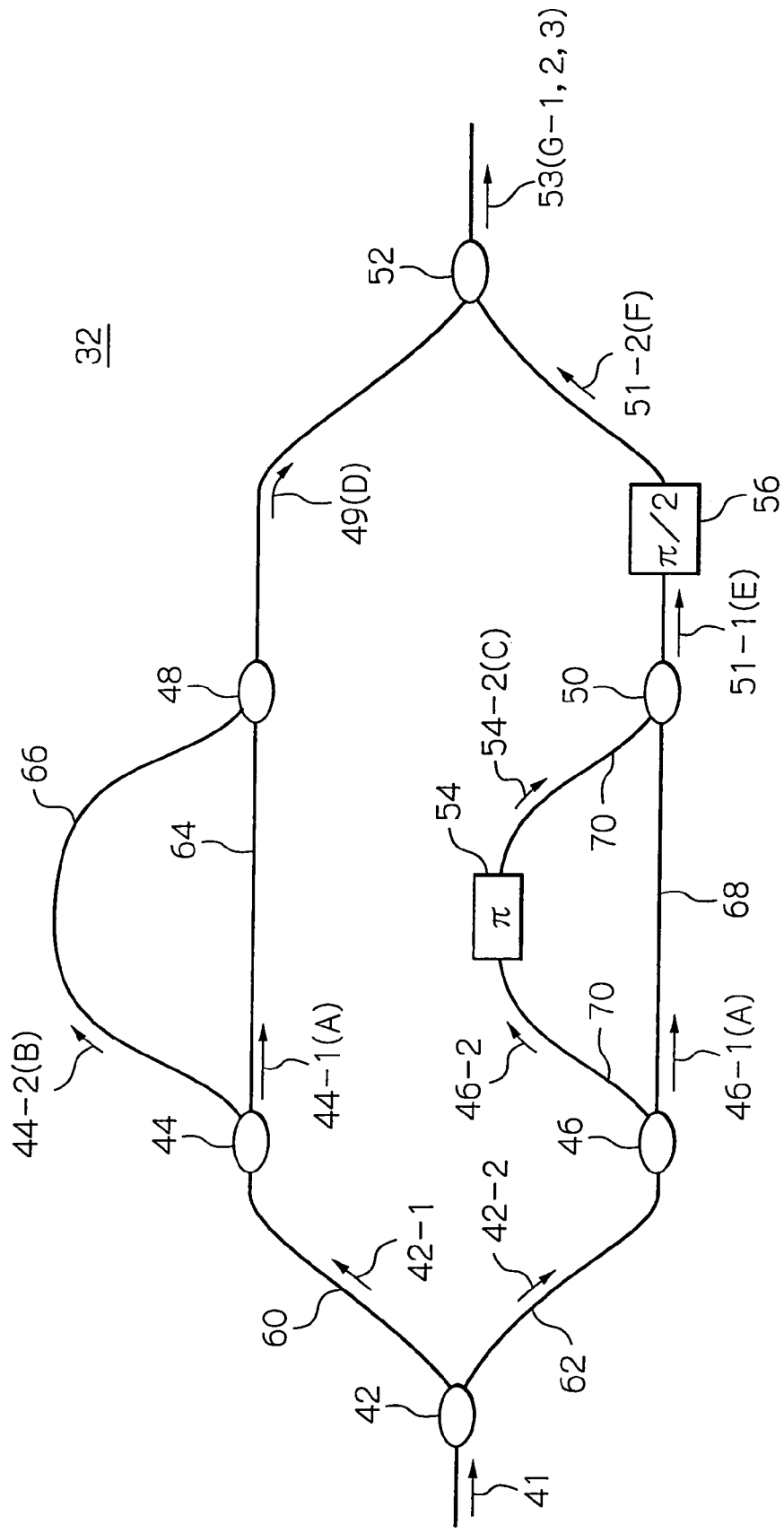
FIG. 4 is a schematic configuration diagram of an optical carrier interferometer.

Referring to then FIG. 4, the optical carrier interferometer 32 will be described below with respect to its configuration. FIG. 4 is a schematic configuration diagram of the optical carrier interferometer.

The optical carrier interferometer 32 includes a first optical splitter 42, a second optical splitter 44, a third optical splitter 46, a π phase shifter 54, a π/2 phase shifter 56, a first optical coupler 52, a second optical coupler 48, and a third optical coupler 50, which are coupled as illustrated.

The first optical splitter 42 splits a monitor signal 41 (27-2) according to its intensity into a first and a second split monitor signal 42-1 and 42-2, and outputs them. The signals 42-1 and 42-2 enter a first and a second arm waveguide 60 and 62, respectively.

The second optical splitter 44 splits the first split monitor signal 42-1 according to its intensity into a (1-1)th and a (1-2)th split monitor signal 44-1 and 44-2, and outputs them. The signals 44-1 and 44-2 enter a (1-1)th and a (1-2)th arm waveguide 64 and 66, respectively.

The third optical splitter 46 splits the second split monitor signal 42-2 according to its intensity into a (2-1)th and a (2-2)th split monitor signal 46-1 and 46-2, and outputs them. The signals 46-1 and 46-2 enter a (2-1)th and a (2-2)th arm waveguide 68 and 70, respectively.

The (1-1)th and (1-2)th arm waveguides 64 and 66 are set to have optical path lengths so that the (1-1)th and (1-2)th split monitor signals 44-1 and 44-2 have a time delay difference between them corresponding to a time occupied by one of the optical pulses on the time axis.

The (2-1)th and (2-2)th arm waveguides 68 and 70 are set to have optical path lengths so that the (2-1)th and (2-2)th split monitor signals 46-1 and 46-2 have a time delay difference between them corresponding to a time occupied by one of the optical pulses on the time axis.

The π phase shifter 54 is inserted in the (2-2)th arm waveguide 70. The shifter 54 shifts the optical carrier phase of the (2-2)th split monitor signal 46-2 by π, generating and outputting a π phase shifted (2-2)th split monitor signal 54-2. The π phase shifter 54 may easily be formed by changing the effective refractive index of a portion of the waveguide.

The (2-1)th and (2-2)th arm waveguides 68 and 70 are set to have optical path lengths so that the (2-1)th and (2-2)th split monitor signals 46-1 and 46-2 have a time delay difference between them corresponding to a time occupied by one of the optical pulses on the time axis, as described above. Strictly speaking, however, the time delay difference corresponding to a time occupied by one of the optical pulses on the time axis is added with an optical path length difference that may cause a π shift of the optical carrier phase of the (2-2)th split monitor signal 46-2.

The (1-1)th and (1-2)th arm wave guides 64 and 66 transmit the (1-1)th and (1-2)th split monitor signals 44-1 and 44-2, respectively. The second optical coupler 48 then multiplexes the signals 44-1 and 44-2, thus generating and outputting a second multiple monitor signal 49.

The π phase shifter 54 outputs then phase shifted (2-2)th split monitor signal 54-2. The (2-1)th arm waveguide 68 transmits the (2-1)th split monitor signal 46-1. The third optical coupler 50 then multiplexes the signals 54-2 and 46-1, thus generating and outputting a third multiple monitor signal 51-1.

The π/2 phase shifter 56 shifts the optical carrier phase of the third multiple monitor signal 51-1 by π/2, thus generating and outputting a π/2 phase shifted third multiple monitor signal 51-2. The π/2 phase shifter 56 may easily be formed by changing the effective refractive index of a portion of the waveguide.

The second optical coupler 48 outputs the second multiple monitor signal 49. The first optical coupler 52 multiplexes the signal 49 and the π/2 phase shifted third multiple monitor signal 51-2, thus generating and outputting a first multiple monitor signal 53.

The optical path length from the first optical splitter 42 to the second optical splitter 44 is set to be equal to the optical path length from the first optical splitter 42 to the third optical splitter 46. The optical path length from the second optical coupler 48 to the first optical coupler 52 is set to be equal to the optical path length from the third optical coupler 50 to the first optical coupler 52. Strictly speaking, however, the π/2 phase shifter 56 causes an optical path length difference between the optical path length from the second optical coupler 48 to the first optical coupler 52 and the optical path length from the third optical coupler 50 to the first optical coupler 52. The optical path length difference may cause a π/2 shift of the optical carrier phase of the third multiple monitor signal 51-1.

Referring to FIGS. 3 to 7B, an operation of the first duplex OTDM-DPSK signal generator system will be described in more detail below. In order to describe the operation of the first duplex OTDM-DPSK signal generator system, it is assumed that the first phase shift keying signal 15 as the first channel DPSK signal and the second phase shift keying signal 17 as the second channel DPSK signal both have a bit rate of 40 Gbit/s. The multiple phase shift keying signal 21 as a duplex OTDM-DPSK signal thus has a bit rate of 80 Gbit/s. The signal 21 is generated from the first and second phase shift keying signals 15 and 17 provided with the OTDM. Therefore, if it is assumed that the first and second channel DPSK signals have a specific bit rate, the following discussion may hold true for different bit rates without loss of generality.

The optical pulse string 11 at a frequency of 40 GHz enters the OTDM-DPSK signal generator 28. The optical pulse string 11 is split by the optical splitter 12 into the first and second optical pulse strings 13-1 and 13-2. The first and second optical pulse strings 13-1 and 13-2 enter the first and second phase modulators 14 and 16, respectively.

The first and second phase modulators 14 and 16 code the first and second optical pulse strings 13-1 and 13-2 in DPSK scheme using the transmission signals supplied from the first and second modulator drivers 22 and 24, thus generating and outputting the first and second phase shift keying signals 15 and 17, respectively.

The second phase shift keying signal 17 enters the ½-bit delay device 18. The device 18 provides the signal 17 with a time delay of $1.25 \times 10^{-7}$ second ($=1/(2 \times 40 \times 10^{9})$) corresponding to ½-bit, thus generating and outputting the delayed second phase shift keying signal 19. The first phase shift keying signal 15 and the delayed second phase shift keying signal 19 are multiplexed by the optical coupler 20 into the multiple phase shift keying signal 21, which is then output from the coupler 20. Thus, the OTDM-DPSK signal generator 28 converts, according to the optical pulse string 11, the two-channel transmission signals supplied from the first and second modulator drivers 22 and 24 into the DPSK signals. The generator 28 then provides the two-channel DPSK signals with the OTDM, thus generating the multiple phase shift keying signal 21 that is the OTDM-DPSK signal.

The generation and output of the multiple phase shift keying signal 21 is the original function of the OTDM-DPSK signal generator 28. In order to detect, however, the optical carrier phase difference between the optical pulses in the multiple phase shift keying signal 21, the OTDM-DPSK signal generator 28 further includes the monitor signal splitter 26. The splitter 26 is to split from the multiple phase shift keying signal 21 the monitor signal 27-2. The monitor signal 27-2 split by the monitor signal splitter 26 then enters the optical carrier phase difference detector 30.

The multiple phase shift keying signal 21 is generated by the optical coupler 20 multiplexing the first and delayed second phase shift keying signals 15 and 19. No means is provided to maintain a constant phase relationship between the signals 15 and 19 when multiplexing them. Therefore the phase differences between the optical pulses in the multiple phase shift keying signal 21 are randomly distributed at zero, φ, π, or φ+π.

After coded in DPSK scheme, the DPSK signal is configured as a binary digital signal with the phase differences between the optical pulses included therein being zero or π. It is thus ideal that the phase differences between the optical pulses in the multiple phase shift keying signal 21 are distributed at zero or π. Specifically, it is ideal that the phase differences between the optical pulses in the multiple phase shift keying signal 21 are always maintained to provide (φ=zero.

In order to generate the multiple phase shift keying signal 21 that is always maintained to provide φ=zero, therefore, it is first necessary to know the value of φ. A means to measure the value of φ is the optical carrier phase difference detector 30. The optical carrier phase difference detector 30 generates and outputs the optical carrier phase difference detection signal 35. The signal 35 is provided as a function of the optical carrier phase difference between the optical pulses in the multiple phase shift keying signal 21.

A description will now be given of an operation of the optical carrier phase difference detector 30, from receiving the monitor signal 27-2 to generating the optical carrier phase difference detection signal 35. Until the optical carrier phase difference detection signal 35 is generated, the central role is played by the optical carrier interferometer 32. With reference, therefore, to FIG. 4 showing the configuration of the optical carrier interferometer 32 and FIG. 5 showing temporal waveforms of the optical signal at each location in the optical carrier interferometer 32, also referring as appropriate to FIGS. 6A through 7B, the operation of the optical carrier interferometer 32 will be described in more detail below.

Figure 5:
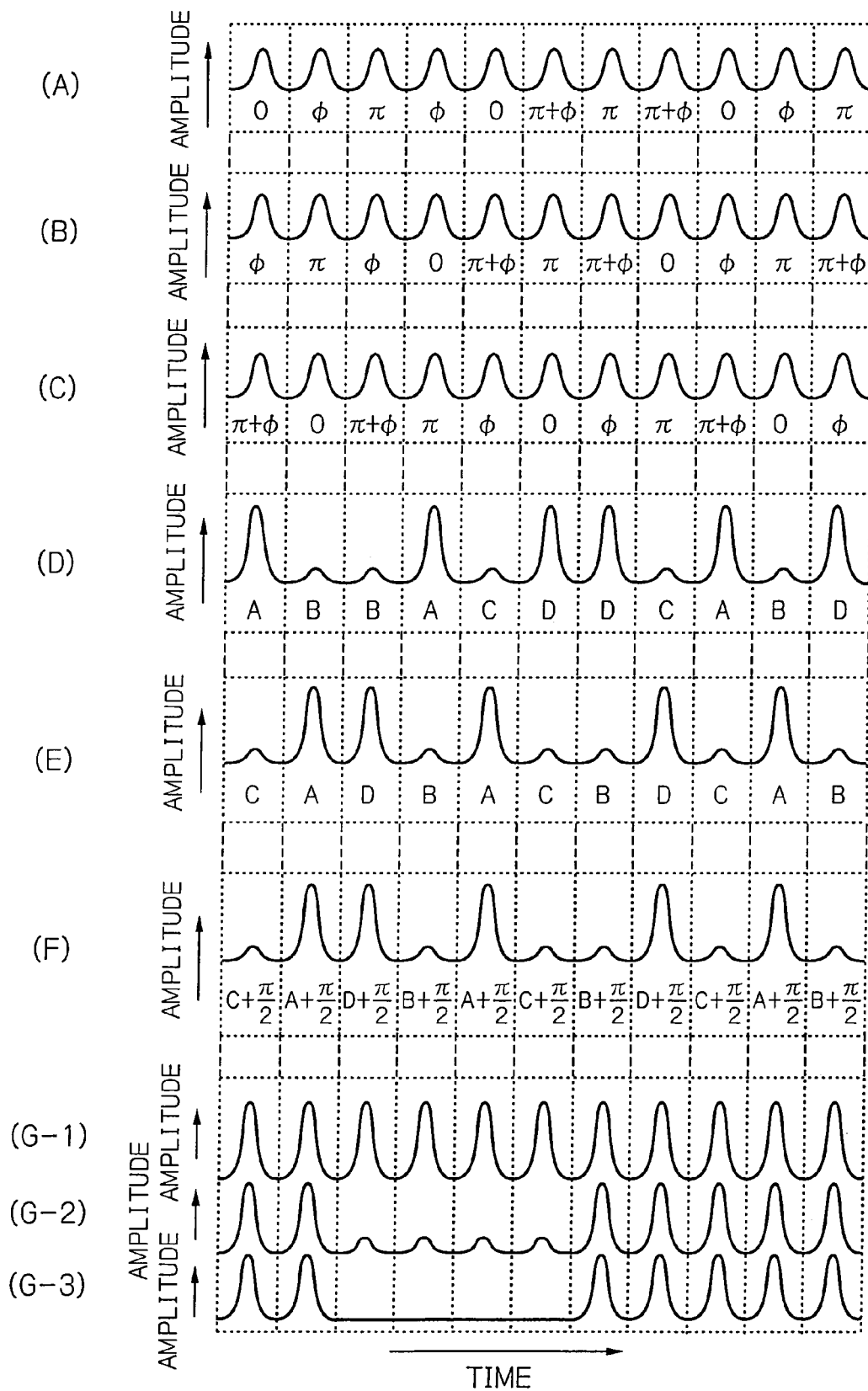
FIG. 5 shows the temporal waveforms of an optical signal at locations in an optical carrier interferometer, wherein part (A) shows the temporal waveform of a (1-1)th split monitor signal and a (2-1)th split monitor signal, part (B) shows the temporal waveform of a (1-2)th split monitor signal, part (C) shows the temporal waveform of a $\pi$ phase shifted (2-1)th split monitor signal, part (D) shows the temporal waveform of a second multiple monitor signal, part (E) shows the temporal waveform of a third multiple monitor signal, part (F) shows the temporal waveform of a $\pi/2$ phase shift third multiple monitor signal, part (G-1) shows the temporal waveform of a first multiple monitor signal for $\phi$=zero or $\phi$=$\pi$, part (G-2) shows the temporal waveform of a first multiple monitor signal for φ=π/4 or φ=3π/4, and part (G-3) shows the temporal waveform of a first multiple monitor signal for φ=π/2.

In FIG. 5, parts (A) to (G-3) show temporal waveforms of the optical signal at each location in the optical carrier interferometer as shown in FIG. 4. Part (A) shows the temporal waveform of the (1-1)th and (2-1)th split monitor signals 44-1 and 46-1, part (B) shows the temporal waveform of the (1-2) th split monitor signal 44-2, part (C) shows the temporal waveform of the π phase shifted (2-1)th split monitor signal 54-2, part (D) shows the temporal waveform of the second multiple monitor signal 49, part (E) shows the temporal waveform of the third multiple monitor signal 51-1, part (F) shows the temporal waveform of the π/2 phase shifted third multiple monitor signal 51-2, part (G-1) shows the temporal waveform of the first multiple monitor signal 53 for φ=zero or φ=π, part (G-2) shows the temporal waveform of the first multiple monitor signal 53 for φ=π/4 or (φ=3 π/4, and part (G-3) shows the temporal waveform of the first multiple monitor signal 53 for φ=π/2. The x-axis is the time axis on an arbitrary scale. The y-axis represents the amplitude. In FIG. 5, parts (D), (E) and (F), the letters A, B, C, and D means phases <A, <B, <C, and <D, respectively, the mark "<" before a capital letter denoting a phase in the context, which will be described later on.

The optical carrier phase difference detector 30 is used in the first OTDM-DPSK signal generator system and is also used in the second to forth OTDM-DPSK signal generator systems as described below. The signal that enters the optical carrier phase difference detector 30 is therefore not limited to the signal 27-2 here, but is generally referred to as the monitor signal 41 for the description.

The temporal waveform of the monitor signal 41 is given as the temporal waveform shown in FIG. 5, part (A). The waveform of the signal may be shown using an arbitrary origin of the time axis. In the following description, therefore, it is assumed for the convenience of the description that the temporal waveforms of the (1-1)th and (2-1)th split monitor signals 44-1 and 46-1 are also given as the temporal waveform shown in part (A). The origin of the time axis for the temporal waveform of the monitor signal 41 and the origin of the time axis for the temporal waveforms of the (1-1)th and (2-1)th split monitor signals 44-1 and 46-1 are originally offset from each other. In the following discussion, however, the offset may not be taken into account.

When the monitor signal 41 enters the optical carrier interferometer 32, the signal 41 is split according to its intensity by the first optical splitter 42 into the first and second split monitor signals 42-1 and 42-2. The first and second split monitor signals 42-1 and 42-2 are split according to their intensity by the second and third optical splitters 44 and 46 into the (1-1)th and (1-2)th split monitor signals 44-1 and 44-2 and the (2-1)th and (2-2)th split monitor signals 46-1 and 46-2, respectively.

The (1-1)th and (1-2)th arm waveguides 64 and 66 are set to have optical path lengths so that the (1-1)th and (1-2)th split monitor signals 44-1 and 44-2 have a time delay difference between them corresponding to a time occupied by one of the optical pulses on the time axis. The time delay difference may sometimes be referred to hereafter as "one bit delay difference", and is here equal to $2.5 \times 10^{-7}$ second. The (1-2)th split monitor signal 44-2 is therefore added to the (1-1)th split monitor signal 44-1 with one bit delay difference between them by the second optical coupler 48.

The (2-1)th and (2-2)th arm waveguides 68 and 70 are set to have optical path lengths so that the (2-1)th and (2-2)th split monitor signals 46-1 and 46-2 have one bit delay difference between them. In addition, the π phase shifter 54 is inserted in the (2-2)th arm waveguide 70. The (2-2)th split monitor signal 46-2 is thus added to the (2-1)th split monitor signal 46-1 by the third optical coupler 50 with one bit delay difference and an additional π phase shift delay difference between them. The π phase shift delay difference means that the phase of the (2-2)th split monitor signal 46-2 as the optical carrier is shifted by π, the signal 46-2 being added with a time difference corresponding to the phase π.

The second and third optical couplers 48 and 50 generate and output the second and third multiple monitor signals 49 and 51-1, respectively. The temporal waveforms of the signals 49 and 51-1 will be described below with reference to FIG. 5, parts (A) to (E).

The (1-1)th arm waveguide 64 transmits the (1-1)th split monitor signal 44-1. The (1-2)th arm waveguide 66 transmits the (1-2)th split monitor signal 44-2. The signals 44-1 and 44-2 have the temporal waveforms shown in FIG. 5, parts (A) and (B), respectively. The two signals interfere with each other in the second optical coupler 48, thus outputting the second multiple monitor signal 49. The second multiple monitor signal 49 therefore has a temporal waveform shown in part (D). The (2-1)th arm waveguide 68 transmits the (2-1)th split monitor signal 46-1. The (2-2)th arm waveguide 70 transmits the π phase shifted (2-2)th split monitor signal 54-2. The signals 46-1 and 54-2 have the temporal waveforms shown in parts (A) and (C), respectively. The two signals interfere with each other in the third optical coupler 50, thus outputting the third multiple monitor signal 51-1. The third multiple monitor signal 51-1 therefore has a temporal waveform as shown in part (E).

Referring to FIG. 5, part (A), the phase differences between the optical pulses in the (1-1)th and (2-1)th split monitor signals 44-1 and 46-1 are randomly distributed at zero, φ, π, or φ+π. The (1-2)th split monitor signal 44-2 has one bit delay difference with respect to the (1-1)th and (2-1)th split monitor signals 44-1 and 46-1. The signal 44-2 thus has, as shown in part (B), one bit shift of the optical pulse phase.

The second multiple monitor signal 49 results from the (1-1)th and (1-2)th split monitor signals 44-1 and 44-2 that interfere with each other. The signal 49 therefore has a temporal waveform as shown in FIG. 5, part (D). With respect to an example where φ is sufficiently smaller than π, a description will be given of why the second multiple monitor signal 49 has a temporal waveform as shown in part (D).

In FIG. 5, part (D), the time slots containing the optical pulses are referred to, from left to right, as the first bit, the second bit and the like. With respect to the first bit in part (D), the optical pulse of the (1-1)th split monitor signal 44-1 shown in part (A) has a phase of zero, and the optical pulse of the (1-2)th split monitor signal 44-2 shown in part (B) has a phase of φ. The optical pulse of the second multiple monitor signal 49 shown in part (D) thus has a phase of zero+φ. This means the interference almost in phase, providing the optical pulse A of the strong light intensity.

Similarly, with respect to the second bit, the optical pulse of the second multiple monitor signal 49 has a phase of φ+π. This means the interference almost in opposite phase, providing the optical pulse B of the weak light intensity. At the fifth bit, the optical pulse of the second multiple monitor signal 49 has a phase of zero+(π+φ), providing the optical pulse C of the weak light intensity. At the sixth bit, the optical pulse of the second multiple monitor signal 49 has a phase of (π+φ)+π, providing the optical pulse D of the strong light intensity.

Thus, the interference between the optical pulse of the (1-1)th split monitor signal 44-1 and the optical pulse of the (1-2)th split monitor signal 44-2 may be categorized into the following interferences (1) to (4). (1) When the two optical pulses have a phase of zero and φ (or φ and zero), respectively, the interference may cause the optical pulse A of the strong light intensity. (2) When the two optical pulses have a phase of π and φ (or φ and π), respectively, the interference may cause the optical pulse B of the weak light intensity. (3) When the two optical pulses have a phase of zero and π+φ (or π+φ and zero), respectively, the interference may cause the optical pulse C of the weak light intensity. (4) When the two optical pulses have a phase of π+φ and π (or π and π+φ) respectively, the interference may cause the optical pulse D of the strong light intensity.

The temporal waveform of the third multiple monitor signal 51-1 in FIG. 5, part (E), may similarly be understood as the temporal waveform of the second multiple monitor signal 49 in part (D).

With reference to FIGS. 6A to 6D, the intensity of the optical pulse generated by the interference of two optical pulses will be described for the following conditions: (1) the two optical pulses have a phase of zero and φ (or φ and zero), respectively; (2) the two optical pulses have a phase of π and φ (or φ and π), respectively; (3) the two optical pulses have a phase of zero and π+φ (or π+φ and zero), respectively; and (4) the two optical pulses have phase of π+φ and π (or π and π+φ), respectively.

FIGS. 6A to 6D illustrate the combination of the phase shift keying signals. The figures show, in the phasor diagram, the state of the optical pulses in the phase shift keying signal. The phasor diagram is a measure of indicating, by means of a positional vector, the position of a point on the complex plane, the point corresponding to the state of the optical pulses in the phase shift keying signal. A position on the complex plane corresponds one-to-one to a complex number. Specifically, the phasor diagram is a technique that associates the absolute value and the phase of the complex number with the amplitude and the phase of the optical pulses as the optical carrier in the phase shift keying signal, and indicates the position vector corresponding to the complex number on the complex plane or Gaussian plane.

Figure 6A:
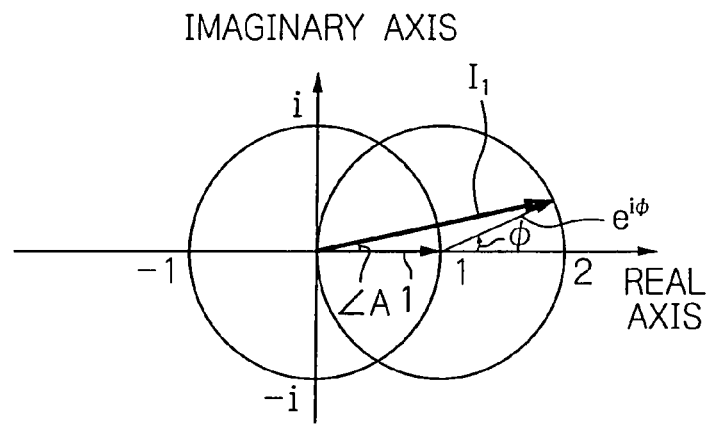
FIGS. 6A through 6D are phasor diagrams useful for understanding the combination of phase shift keying signals.
Figure 6B:
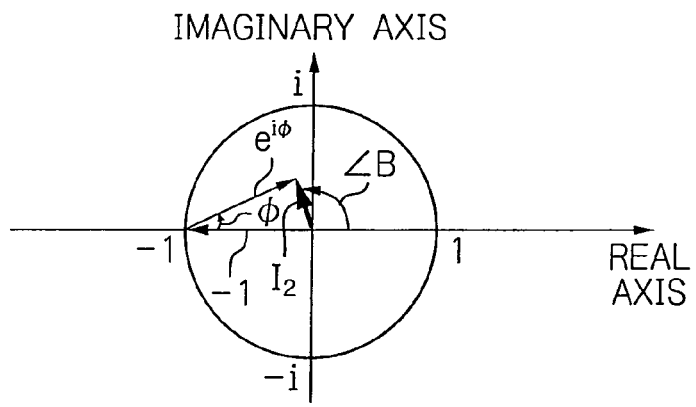
Figure 6C:
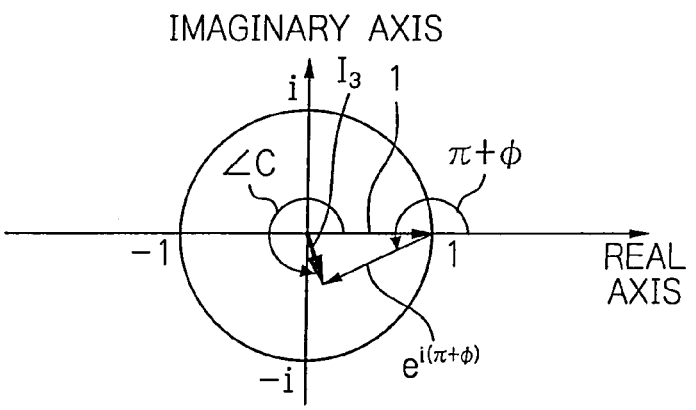
Figure 6D:
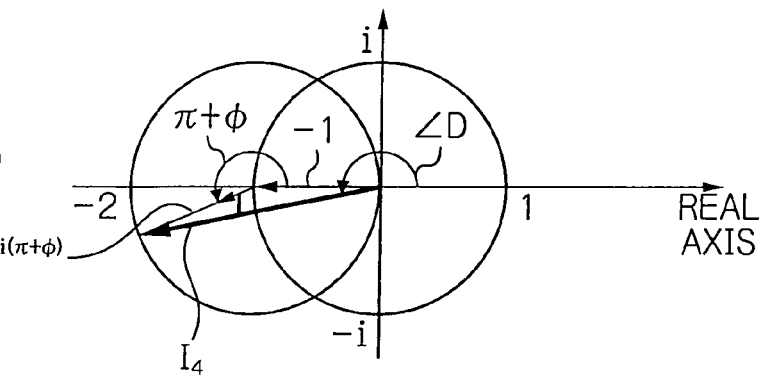

FIG. 6A shows the state where the two optical pulses have a phase of zero and φ (or φ and zero), respectively. FIG. 6B shows the state where the two optical pulses have a phase of π and φ (or φ and π), respectively. FIG. 6C shows the state where the two optical pulses have a phase of zero and π+φ (or π+φ and zero), respectively. FIG. 6D shows the state where the two optical pulses have a phase of π+φ and π (or π and π+φ), respectively.

In the following conditions (1) to (4), the interference between two optical pulses will be described with the amplitudes of the optical pulses interfered each being normalized to one.

(1) Two optical pulses with a phase of zero and φ (or φ and zero), respectively. The state of the optical pulse with a phase of zero may be given by $e^i \times 0 = 1$. The state of the optical pulse with a phase of φ may be given by $e^i\phi$. Note, however, that the time-dependent term $e^{i[omega]t}$ as the optical carrier for the optical pulse with zero or φ phase (the angle frequency is [omega]) is omitted here because it will not affect the following discussion. Likewise, in the conditions (2) to (4), the time-dependent term $e^{i[omega]t}$ is omitted.

The two optical pulses are represented, in the phasor diagram, as the position vectors on the complex plane. When the optical pulse with a phase of zero and the optical pulse with a phase of φ interfere with each other, the resultant optical pulse has a state $I_1$ that may be given by the following expression (1).

$$I_1 = 1 + e^i\phi \quad (1)$$

The state $I_1$ of the optical pulse resulting from the interference has a phase of <A. The phase <A may be given by the following expression (2). The intensity $|I_1|$ may be given by the following expression (3).

$$<A = \tan^{-1}\{\sin\phi/(1+\cos\phi)\} \quad (2)$$

$$|I_1| = \{2(1+\cos\phi)\}^{1/2} \quad (3)$$

In FIG. 6A, the phase <A of the state $I_1$ of the optical pulse is given as an angle of the vector $I_1$ to the real axis, the vector $I_1$ representing the state $I_1$ of the optical pulse. The intensity $|I_1|$ provides the intensity of the optical pulse A of the strong light intensity shown in FIG. 5, part (D).

(2) Two optical pulses with a phase of π and φ (or φ and π), respectively. The state of the optical pulse with a phase of π may be given by $e^i\pi = -1$. The state of the optical pulse with a phase of φ may be given by $e^i\phi$. When the optical pulse with a phase of π and the optical pulse with a phase of φ interfere with each other, the resultant optical pulse has a state $I_2$ that may be given by the following expression (4).

$$I_2 = -1 + e^i\phi \quad (4)$$

The state $I_2$ of the optical pulse resulting from the interference has a phase of <B. The phase <B may be given by the following expression (5). The intensity $|I_2|$ may be given by the following expression (6).

$$<B = \tan^{-1}\{-\sin\phi/(1-\cos\phi)\} + \phi \quad (5)$$

$$|I_2| = \{2(1-\cos\phi)\}^{1/2} \quad (6)$$

In FIG. 6B, the phase <B of the state $I_2$ of the optical pulse is given as an angle of the vector $I_2$ to the real axis, the vector $I_2$ representing the state $I_2$ of the optical pulse. Note that the phase <B is an angle measured anticlockwise from the positive real axis. The intensity $|I_2|$ provides the intensity of the optical pulse B of the weak light intensity shown in FIG. 5, part (D).

(3) Two optical pulses with a phase of zero and π+φ (or π+φ and zero), respectively. The state of the optical pulse with a phase of zero may be given by $e^i \times 0 = 1$. The state of the optical pulse with a phase of π+φ may be given by $e^{i(\pi+\phi)}$. When the optical pulse with a phase of zero and the optical pulse with a phase of π+φ interfere with each other, the resultant optical pulse has a state $I_3$ that may be given by the following expression (7).

$$I_3 = 1 + e^{i(\pi+\phi)} \quad (7)$$

The state $I_3$ of the optical pulse resulting from the interference has a phase of <C. The phase <C may be given by the following expression (8). The intensity $|I_3|$ may be given by the following expression (9).

$$<C = \tan^{-1}\{-\sin\phi/(1-\cos\phi)\} \quad (8)$$

$$|I_3| = \{2(1-\cos\phi)\}^{1/2} \quad (9)$$

In FIG. 6C, the phase <C of the state $I_3$ of the optical pulse is given as an angle of the vector $I_3$ to the real axis, the vector $I_3$ representing the state $I_3$ of the optical pulse. Note that the phase <C is an angle measured anticlockwise from the positive real axis. The intensity $|I_3|$ provides the intensity of the optical pulse C of the weak light intensity shown in FIG. 5, part (D).

(4) Two optical pulses with a phase of π+φ and π (or π and π+φ), respectively. The state of the optical pulse with a phase of π may be given by $e^i\pi = -1$. The state of the optical pulse with a phase of π+φ may be given by $e^{i(\pi+\phi)}$. When the optical pulse with a phase of π and the optical pulse with a phase of π+φ interfere with each other, the resulting optical pulse has a state $I_4$ that may be given by the following expression (10).

$$I_4 = -1 + e^{i(\pi+\phi)} \quad (10)$$

The state $I_4$ of the optical pulse resulting from the interference has a phase of <D. The phase <D may be given by the following expression (11). The intensity |I$_4$| may be given by the following expression (12).

$$<D=\tan^{-1}\{\sin\phi/(1+\cos\phi)\}+\pi \quad (11)$$

$$|I_4|=\{2(1+\cos\phi)\}^{1/2} \quad (12)$$

In FIG. 6D, the phase <D of the state I$_4$ of the optical pulse is given as an angle of the vector I$_4$ to the real axis, the vector I$_4$ representing the state I$_4$ of the optical pulse. Note that the phase <D is an angle measured anticlockwise from the positive real axis. The intensity |I$_4$| provides the intensity of the optical pulse D of the strong light intensity shown in FIG. 5, part (D).

When an offset $\phi$ (zero <$\phi$=<$\pi$) from the optical carrier phase difference (zero or $\pi$) between the optical pulses is equal to zero, |I$_2$|=|I$_3$|=zero where the optical pulses B and C of the weak light intensity disappear, and also |I$_1$|=|I$_4$|=2 where the optical pulses A and D become the optical pulses of the maximum intensity. When $\phi$=$\pi$, |I$_1$|=|I$_4$|=zero where the optical pulses A and D of the weak light intensity disappear, and also |I$_2$|=|I$_3$|=2 where the optical pulses B and C biome the optical pulses of the maximum intensity.

In FIG. 5, parts (D) and (E) show the temporal waveforms of the second and third multiple monitor signals 49 and 51-1. The temporal waveforms show that, for both of $\phi$=zero and $\phi$=$\pi$, the optical pulse of the weak light intensity disappears and the optical pulse of the strong light intensity only becomes the optical pulse signal.

The temporal waveform in FIG. 5, part (F), is the temporal waveform of the interference signal generated from the third multiple monitor signal 51-1 in FIG. 5, part (E,) by shifting the phase as the optical carrier of the signal 51-1 by $\pi$/2.

As can be seen from the expressions (2), (5), (8), and (11), and from FIGS. 6A to 6D, the vectors I$_1$ and I$_2$, the vectors I$_1$ and I$_3$, the vectors I$_2$ and I$_4$, and the vectors I$_3$ and I$_4$ are orthogonal to each other, respectively. Note that the vectors representing the states I$_1$ to I$_4$ of the optical pulse are referred to as the vectors I$_1$ to I$_4$, respectively.

The second and third multiple monitor signals 49 and 51-1 are offset from each other by a phase of 90 degree ($\pi$/2 radian) or −90 degree (−$\pi$/2 radian). A measure is then taken where in the optical carrier interferometer 32, the third multiple monitor signal 51-1 is passed through the $\pi$/2 phase shifter 56 to delay its phase by 90 degree ($\pi$/2 radian), generating the $\pi$/2 phase shifted third multiple monitor signal 51-2.

The second multiple monitor signal 49 and the $\pi$/2 phase shifted third multiple monitor signal 51-2 are added in the first optical coupler 52, generating the first multiple monitor signal 53. The signal 53 has temporal waveforms as shown in FIG. 5, parts (G-1), (G-2) and (G-3). Specifically, the two types of optical pulses including the optical pulse of the strong light intensity I$_a$ and the optical pulse of the weak light intensity I$_b$ form the first multiple monitor signal 53. The light intensity I$_a$ and I$_b$ are given, according to the expressions (3), (6), and (9), by the following expressions (13) and (14).

$$I_a=\{2(1+\cos\phi)\}^{1/2}+\{2(1-\cos\phi)\}^{1/2} \quad (13)$$

$$I_b=\{2(1+\cos\phi)\}^{1/2}-\{2(1-\cos\phi)\}^{1/2} \quad (14)$$

Figure 7A:
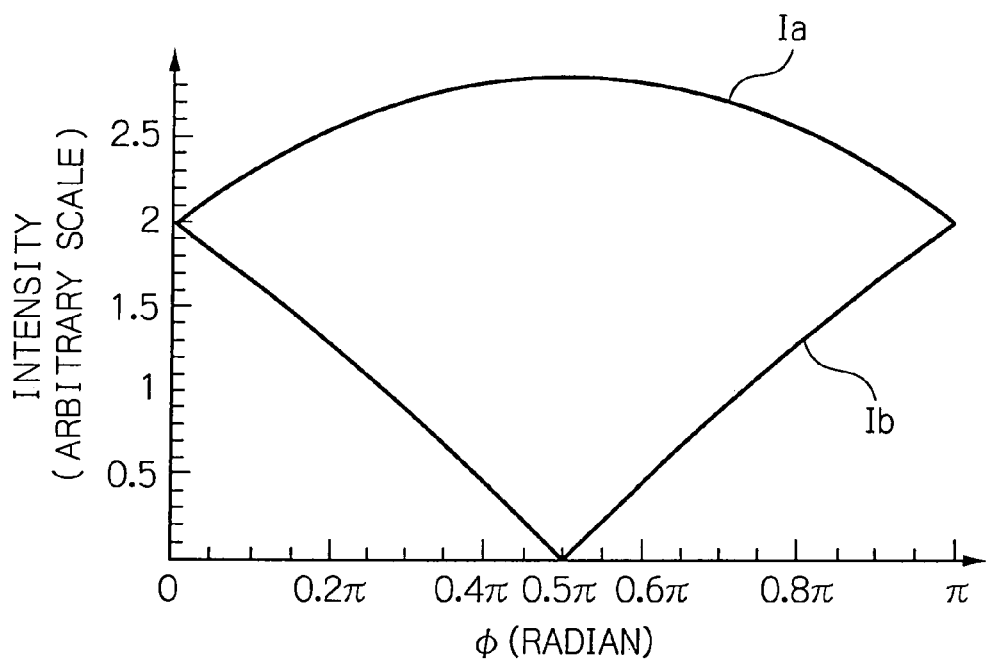
FIGS. 7A and 7B show a relationship between the intensity of a multiple phase shift keying signal and phase fluctuations φ, FIG. 7A showing two types of optical pulse intensity of a first multiple monitor signal each given as a function of φ, and FIG. 7B showing the intensity of an optical carrier phase difference detection signal given as a function of φ.
Figure 7B:
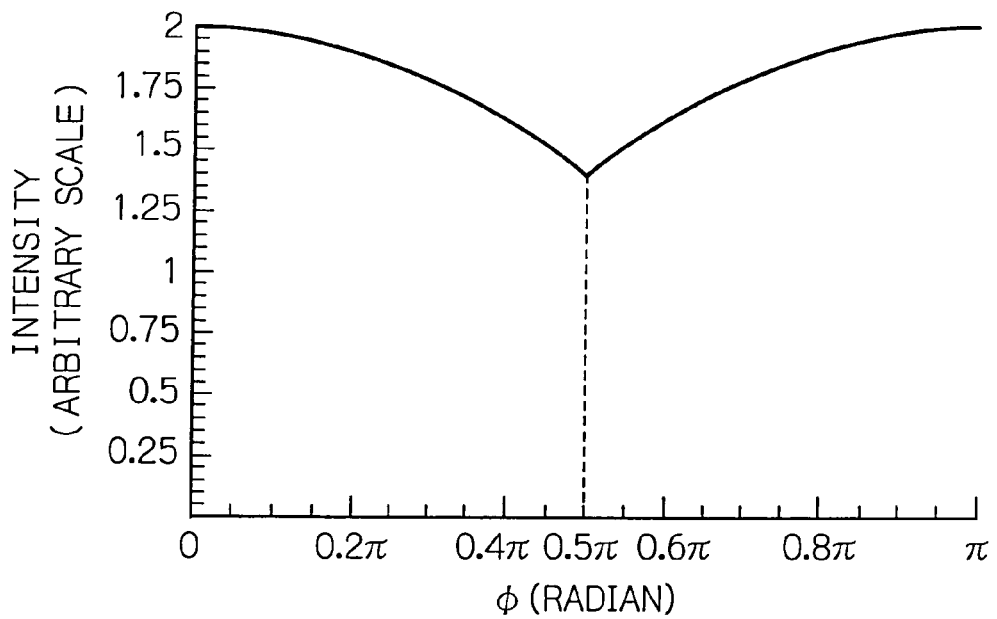

With reference to FIGS. 7A and 7B, the dependence of the light intensity I$_a$ and I$_b$ on the phase fluctuations $\phi$ will be described below. FIGS. 7A and 7B show a relationship between the intensity of the multiple phase shift keying signal and the phase fluctuations $\phi$. FIG. 7A shows the two types of optical pulse intensity (the light intensity I$_a$ and I$_b$) of the first multiple monitor signal 53 as a function of $\phi$. FIG. 7B shows an average of the light intensity I$_a$ and I$_b$. The x-axis is the value of $\phi$. The y-axis is the light intensity on an arbitrary scale. FIGS. 7A and 7B thus show the intensity of the optical carrier phase difference detection signal 35 as a function of $\phi$.

Referring to FIG. 7A, when $\phi$=$\pi$/2 radian (0.5$\pi$ radian), the light intensity I$_a$ reaches the maximum and the light intensity I$_b$ reaches the minimum (the minimum is zero). Referring to FIG. 7B, the average of the light intensity I$_a$ and I$_b$ reaches the minimum when $\phi$=$\pi$/2 radian (0.5 $\pi$ radian).

The first multiple monitor signal 53 corresponds to, in the duplex OTDM-DPSK signal generator system in FIG. 3, the interference monitor signal 33. The optical carrier interferometer 32 outputs the interference monitor signal 33. The signal 33 then enters the photoelectric converter 36 in the interference signal detector 34. The signal 33 is photoelectrically converted by the converter 36 and output as the electrical interference signal 37. When the interference monitor signal 33 is photoelectrically converted, the electrical signal component formed of the envelope of the optical carriers at a frequency equal to the bit rate frequency of the interference multiple monitor signal is only generated as the electrical interference signal 37. The electrical interference signal 37 enters the low-pass filter 38. The filter 38 time averages the alternating component of the electrical interference signal 37, thus cutting off the high frequency component. The resultant signal is output as the electrical interference signal 39.

The average of the two types of optical pulse intensity in the first multiple monitor signal 53 (($I_a$+$I_b$)/2) is also a value in proportion to the time average of the electrical interference signal 39 output from the low-pass filter 38. The electrical interference signal 39 is thus a signal that is generated by cutting off the high frequency component that provides the average of the light intensity I$_a$ and I$_b$ in FIG. 7B, and is a signal to which the average of the light intensity I$_a$ and I$_b$ is reflected (a signal in proportion to the time average of the light intensity I$_a$ and I$_b$).

Specifically, the optical carrier phase difference detector 30 in the first OTDM-DPSK signal generator system generates the electrical interference signal 39 that is in proportion to the time average of the light intensity I$_a$ and I$_b$. The intensity detector 40 converts the direct-current electrical interference signal 39 to a direct-current signal that may drive the optical carrier phase difference controller as described below, thus generating and outputting the optical carrier phase difference detection signal 35. In this way, it is possible to detect the optical carrier phase difference between the optical pulses in the OTDM-DPSK signal 21.

With reference to FIG. 7B, the average of the light intensities I$_a$ and I$_b$ reaches the minimum when $\phi$=$\pi$/2 radian (0.5 $\pi$ radian). Therefore, the direct-current voltage value of the electrical interference signal 39 output from the low-pass filter 38 reaches the minimum when $\phi$=$\pi$/2 radian. The phase fluctuations of the multiple phase shift keying signal have a size $\phi$ of 0 to 2 $\pi$ radian. For 0 and $\pi$ radian, however, the optical carrier phase difference between the adjacent optical pulses is $\pi$, thus providing the signals in the same state. The value $\phi$ of 0 to $\pi$/2 may thus cover all states of the signal. In the range of value $\phi$ between 0 and $\pi$/2, the optical carrier phase difference detection signal 35 reaches the maximum when the phase fluctuations of the multiple phase shift keying signal have the minimum size $\phi$ ($\phi$=0), and the signal 35 reaches the minimum when the phase fluctuations have the maximum size $\phi$ ($\phi$=$\pi$/2 radian). The OTDM-DPSK signal generator 28 may thus be controlled to generate the OTDM-DPSK signal 21 for the maximum value of the optical carrier phase difference detection signal 35, thus controlling the optical carrier phase difference between the optical pulse signals 15 and 19 that are coded in DPSK scheme.

Figure 8:
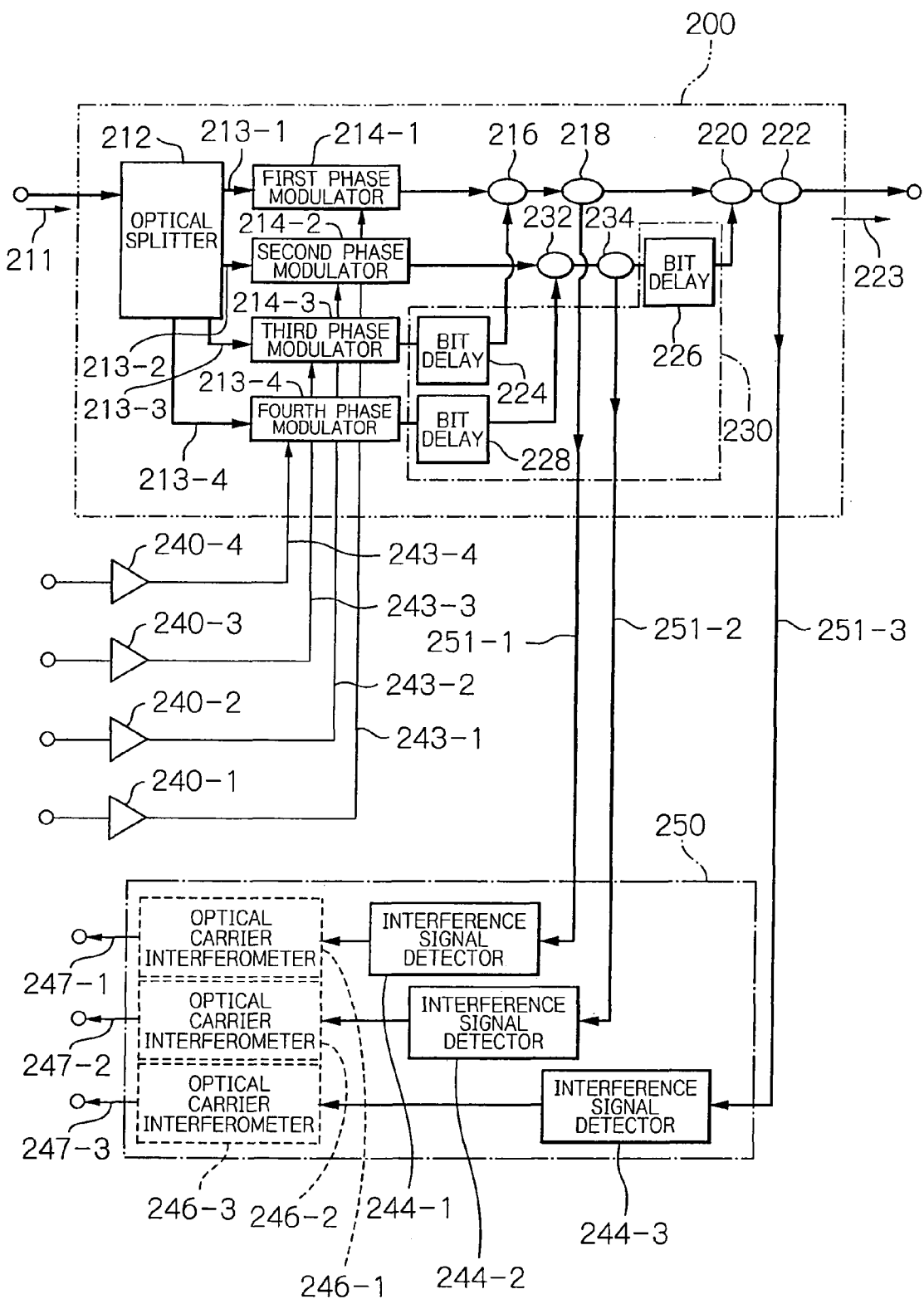
FIG. 8 is a schematic block diagram of the configuration of a quadplex OTDM-DPSK signal generator system including an optical carrier phase difference detector.

Well, referring to FIG. 8, a description will be given of the configuration of a first OTDM-DPSK signal generator system that generates and outputs $2^N$-multiple OTDM-DPSK signals, where N is an integer of 2 or more. Although the description is given with respect to a specific case where N=2, i.e. quadplex OTDM-DPSK signals are generated and output by the first OTDM-DPSK signal generator system, the same description may hold true for N=3 or more. The operation is similar to what occurs when the duplex OTDM-DPSK signals are generated and output by the first OTDM-DPSK signal generator system, so that its repetitive description is omitted here. FIG. 8 is a schematic block diagram of the configuration of a quadplex OTDM-DPSK signal generator system including an optical carrier phase difference detector.

An OTDM-DPSK signal generator 200 includes, for generally an integer of 2 or more, an optical splitter, a first to a $2^N$th phase modulator, plural ($2^N$−1) optical couplers, and plural ($2^{N−k}$) kth-order monitor signal splitters, where k is an integer from 1 to N. The plural ($2^{N−k}$) kth-order monitor signal splitters split, from plural ($2^{N−k}$) kth-order optical time division multiplexing differential phase shift keying signals, kth-order monitor signals, respectively. The portion 200 includes, for N=2 where k is only 1 or 2, a first to a $2^2$th phase modulator (a first to a fourth phase modulator), plural ($2^2$−1) optical couplers (three optical couplers), two (i.e. ($2^{2-1}$)=$2^1$) first-order monitor signal splitters, and one (i.e. ($2^{2-2}$)=$2^0$) second-order monitor signal splitter.

Referring to FIG. 8, for N=2, a first quadplex OTDM-DPSK signal generator system includes an optical splitter 212, a first to a fourth phase modulator 214-1 to 214-4, three optical couplers 216, 220, and 232, two first-order monitor signal splitters 218 and 234, and one second-order monitor signal splitter 222, which are interconnected as illustrated.

The optical splitter 212 splits an optical pulse string 211 into a first to a fourth optical pulse string 213-1 to 213-4. The first to fourth phase modulators 214-1 to 214-4 receive the first to fourth optical pulse strings 213-1 to 231-4, respectively. The modulators 214-1 to 214-4 then output the first to fourth channel DPSK signals coded in DPSK scheme, respectively. The first to fourth phase modulators 214-1 to 214-4 are supplied with a first to a fourth channel electrical signal 243-1 to 243-4 from a first to a fourth modulator driver 240-1 to 240-4, respectively.

The three optical couplers 216, 220, and 232 provide the DPSK to the first to fourth channel DPSK signals, thus generating and outputting a quadplex OTDM-DPSK signal 223. The signal generator 200 also includes a bit delay circuit 230. The circuit 230 provides each of the first to fourth channel differential phase shift keying signals with a time delay necessary to bit interleave the signals to provide them with the optical time division multiplexing. The bit delay circuit 230 may refer to bit delay devices 224, 226, and 228. Each of the bit delay devices 224 and 228 is adapted to have a function of adding a time delay corresponding to half of the time occupied on the time axis by one of the optical pulses in the first to fourth channel DPSK signals. The bit delay device 226 is adapted to have a function of adding a time delay corresponding to one-fourth of the time occupied on the time axis by one of the optical pulses in the first to fourth channel DPSK signals.

The signal generator 200 includes two first-order monitor signal splitters 218 and 234. The first-order monitor signal splitter 218 splits from the first-order OTDM-DPSK signal a first-order monitor signal 251-1. The first-order OTDM-DPSK signal is generated from the first and third channel DPSK signals provided with the OTDM. The first-order monitor signal splitter 234 splits from another first-order OTDM-DPSK signal a first-order monitor signal 251-2. Another first-order OTDM-DPSK signal is generated from the second and fourth channel DPSK signals provided with the OTDM. The second-order monitor signal splitter 222 splits from the second-order OTDM-DPSK signal a second-order monitor signal 251-3.

The optical carrier phase difference detector 250 includes optical carrier interferometers 244-1 to 244-3 and interference signal detectors 246-1 to 246-3. The detector 250 generates optical carrier phase difference detection signals 247-1 to 247-3 as a function of the optical carrier phase difference between the optical pulses in the first- and second-order monitor signals 251-1 to 251-3, respectively.

Figure 9:
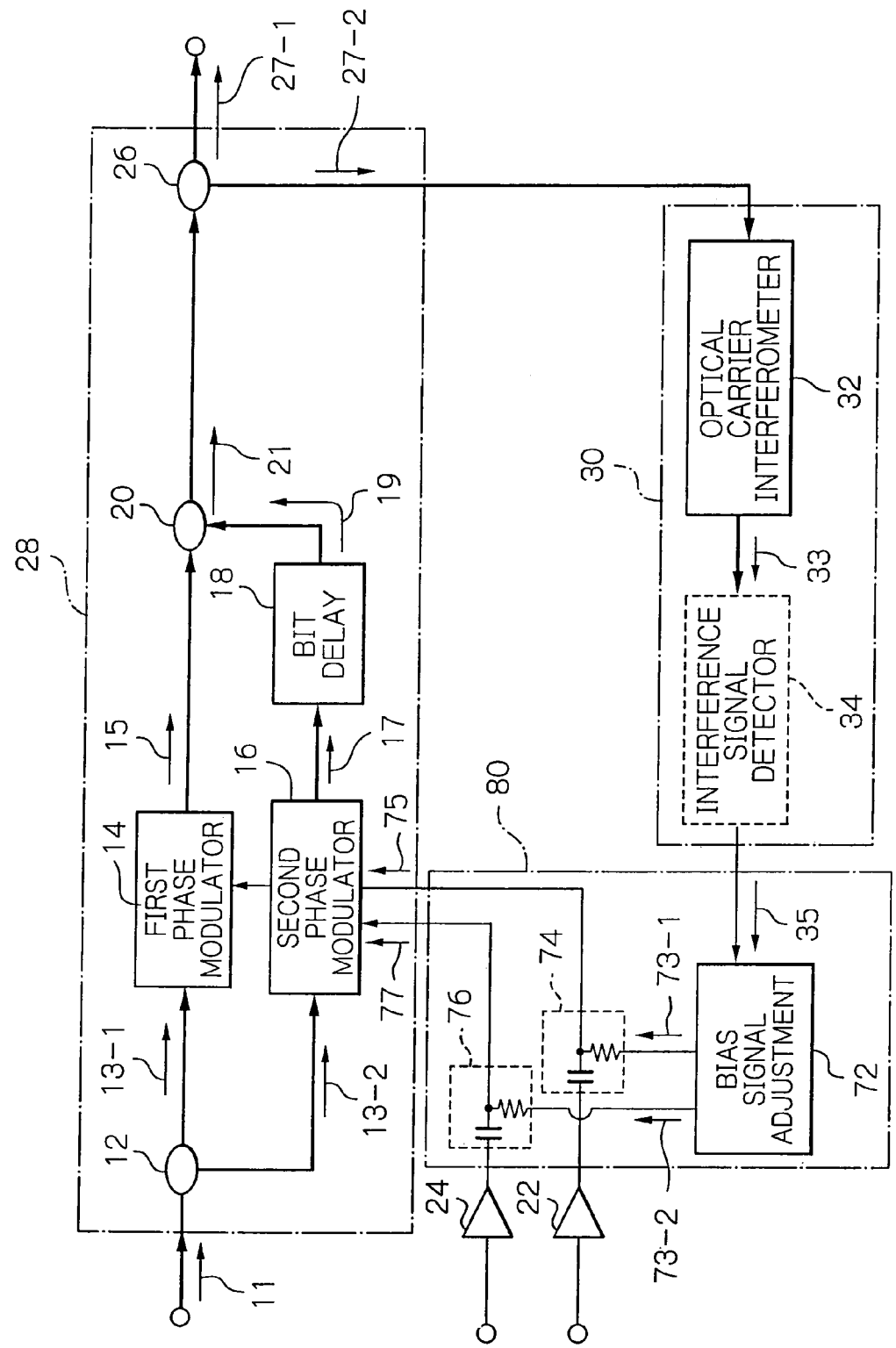
FIG. 9 is a schematic block diagram of the configuration of a duplex OTDM-DPSK signal generator system that includes an optical carrier phase difference detector and an optical carrier phase difference controller, and has a function of an optical carrier phase difference control.

Referring now to FIG. 9, a configuration and an operation of the second OTDM-DPSK signal generator system will be described below. FIG. 9 is a schematic block diagram of the configuration of a duplex OTDM-DPSK signal generator system. The system includes an optical carrier phase difference detector and an optical carrier phase difference controller, and has a function of an optical carrier phase difference control.

The second OTDM-DPSK signal generator system includes the OTDM-DPSK signal generator 28, the optical carrier phase difference detector 30, and an optical carrier phase difference controller 80. The OTDM-DPSK signal generator 28 and the optical carrier phase difference detector 30 are similar to those in the first OTDM-DPSK signal generator system. A repetitive description of their configurations and functions is omitted here.

The optical carrier phase difference controller 80 includes a bias signal adjustment device 72. The adjustment device 72 supplies the first and second phase modulators 14 and 16 with a first and a second bias adjustment signal 73-1 and 73-2, respectively. The first and second modulator drivers 22 and 24 supply the first and second channel transmission signals. The controller 80 includes a first and a second signal coupler 74 and 76. The couplers 74 and 76 couple and add the first and second bias adjustment signals 73-1 and 73-2 to the first and second channel transmission signals, respectively. The first and second signal couplers 74 and 76 may include a device called a "bias-T", which includes a capacitor and a resistor. The capacitors in the first and second signal couplers 74 and 76 have a function of preventing the first and second bias adjustment signals 73-1 and 73-2 from entering the first and second modulator drivers 22 and 24, respectively.

When the optical carrier phase difference controller 80 receives the optical carrier phase difference detection signal 35, it generates, in order to reduce the fluctuations φ of the OTDM-DPSK signal 27-1 to zero, the first and second bias adjustment signals 73-1 and 73-2 to control the first and second phase modulators 14 and 16, respectively. The first and second bias adjustment signals 73-1 and 73-2 are then coupled, via the first and second signal couplers 74 and 76, to the first and second channel transmission signals, and are supplied to the first and second phase modulators 14 and 16 as optical carrier phase difference control signals 75 and 77, respectively.

As described above, the optical carrier phase difference detection signal 35 reaches the maximum when the phase fluctuations of the multiple phase shift keying signal have the minimum size φ (φ=0), and the signal 35 reaches the minimum when the phase fluctuations have the maximum size φ (φ=π/2 radian). The optical carrier phase difference controller 80 supplies the OTDM-DPSK signal generator 28 with the optical carrier phase difference control signals 75 and 77. The control signals 75 and 77 may feedback control the OTDM-DPSK signal generator 28 so that the optical carrier phase difference detection signal 35 reaches the maximum value, the fluctuations having the minimum size φ. The second OTDM-DPSK signal generator system may thus control the optical carrier phase difference between the optical pulse signals coded in DPSK scheme.

Figure 10:
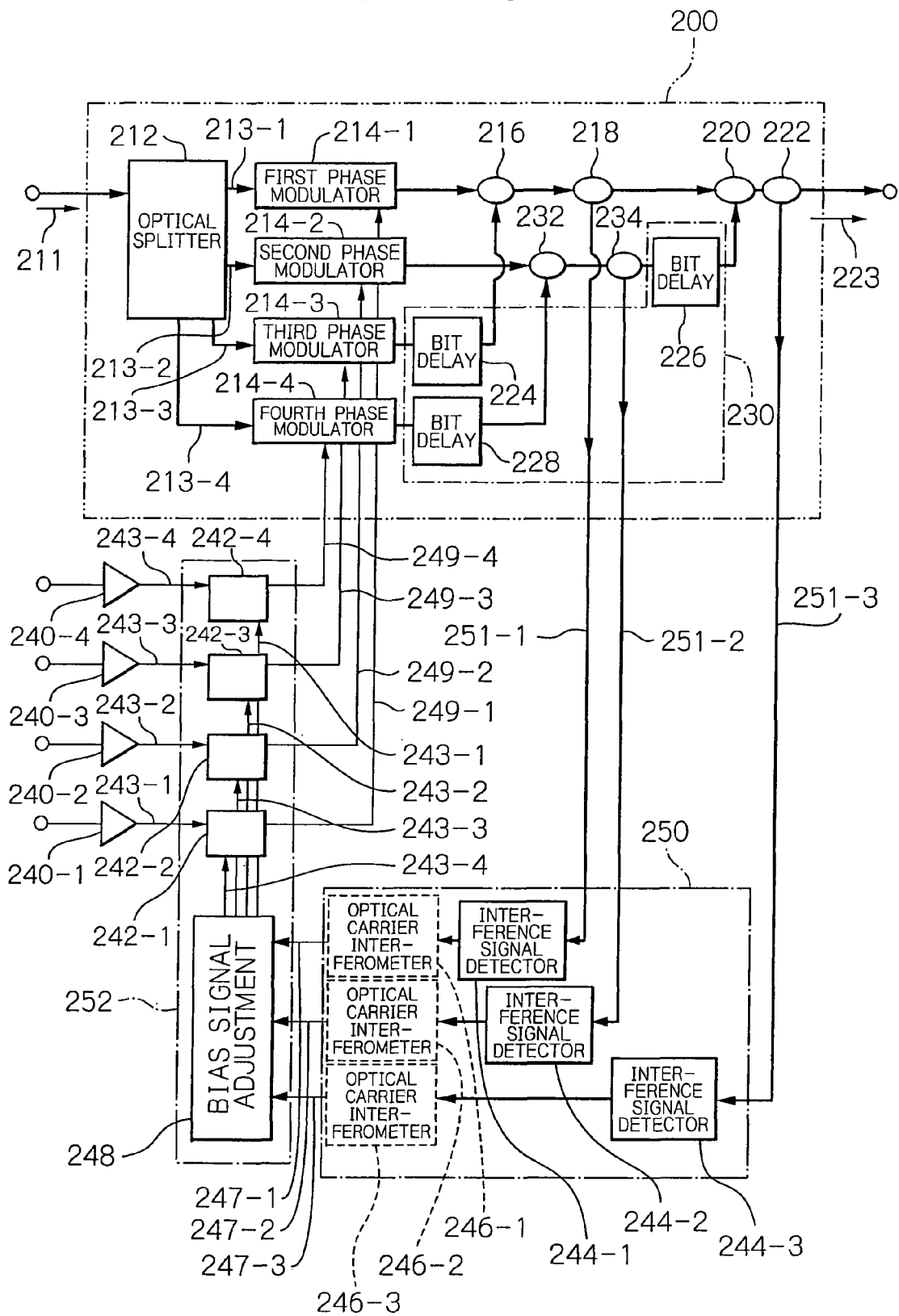
FIG. 10 is a schematic block diagram of the configuration of a quadplex OTDM-DPSK signal generator system that includes an optical carrier phase difference detector and an optical carrier phase difference controller, and has a function of an optical carrier phase difference control.

Referring to FIG. 10, a description will be given of the configuration of a second OTDM-DPSK signal generator system that generates and outputs $2^N$-multiple OTDM-DPSK signals, where N is an integer of 2 or more. FIG. 10 is a schematic block diagram of the configuration of a quadplex OTDM-DPSK signal generator system. The quadplex OTDM-DPSK signal generator system includes an optical carrier phase difference detector and an optical carrier phase difference controller, and has a function of an optical carrier phase difference control. Although the description is given with respect to a specific case where N=2, i.e. quadplex OTDM-DPSK signals are generated and output by the second OTDM-DPSK signal generator system, the same description may hold true for N=3 or more.

The second OTDM-DPSK signal generator system that generates and outputs the $2^N$ multiple OTDM-DPSK signals, where N is an integer of 2 or more, generally includes the OTDM-DPSK signal generator 200, the optical carrier phase difference detector 250, and the optical carrier phase difference controller 252, each of which is configured as follows. The OTDM-DPSK signal generator 200 and the optical carrier phase difference detector 250 are similar to those in the first $2^N$ multiple OTDM-DPSK signals generator system described with reference to FIG. 8. A repetitive description of their configurations and functions is omitted here.

The optical carrier phase difference controller 252 includes a bias signal adjustment device 248, and a first to a fourth signal coupler 242-1 to 242-4. The first to fourth signal couplers 242-1 to 242-4 have configurations similar to those of the first and second signal couplers 74 and 76 in FIG. 9. The first to fourth modulator drivers 240-1 to 240-4 output the first to fourth channel transmission signals 243-1 to 243-4, respectively. The first to fourth signal couplers 242-1 to 242-4 couple and add the first to fourth bias adjustment signals to the signals 243-1 to 243-4, thus generating and outputting optical carrier phase difference control signals 249-1 to 249-4, respectively. The optical carrier phase difference control signals 249-1 to 249-4 are supplied to the first to fourth phase modulators 214-1 to 214-4, respectively.

The optical carrier phase difference controller 252 may thus feedback control the OTDM-DPSK signal generator 200 so that the optical carrier phase difference detection signals 247-1 to 247-3 reaches the maximum value, the fluctuations having the minimum size φ. It may thus be possible to control the optical carrier phase difference between the optical pulse signals coded in DPSK scheme that are generated and output by the first to fourth phase modulators 214-1 to 214-4.

In the OTDM-DPSK signal generator systems according to the first and second embodiments, the optical carrier phase difference detection signal that is output from the optical carrier phase difference detector reaches the maximum value when the phase fluctuations of the OTDM-DPSK signal have the minimum size φ. Therefore, compared to the variation of the size φ of the phase fluctuations of the OTDM-DPSK signal, the variation of the optical carrier phase difference detection signal will not become very large because it resides in the vicinity of the maximum value. When, in the vicinity of the maximum value of the optical carrier phase difference detection signal, the optical carrier phase difference detection signal decreases, it may be impossible to determine whether the size φ of the phase fluctuations decreases or increases. Specifically, when the optical carrier phase difference detection signal increases or decreases, it may be impossible to determine how the size φ of the phase fluctuations varies, i.e. whether it increases or decreases.

Then, a third OTDM-DPSK signal generator system is presented which is different in terms of the relationship in which the optical carrier phase difference detection signal that is output from the optical carrier phase difference detector reaches the maximum value when the phase fluctuations of the OTDM-DPSK signal have the minimum size φ. Specifically, the third system is adapted to be able to generate a monitor signal having a different wavelength from the OTDM-DPSK signal. The third OTDM-DPSK signal generator system is adapted to allow the monitor signal having a different wavelength from the OTDM-DPSK signal to have, when the phase fluctuations of the OTDM-DPSK signal have the minimum size φ, a value ranging between the maximum and minimum values. The third system is adapted to observe, instead of observing the variation of the optical carrier phase difference detection signal, the variation of the monitor signal having a different wavelength from the OTDM-DPSK signal, thus evaluating the size φ of the phase fluctuations of the OTDM-DPSK signal.

The optical carrier phase difference detection signal and the OTDM-DPSK signal may be set to be offset from each other on the time axis. Therefore, when the phase fluctuations of the OTDM-DPSK signal have a zero size φ, the optical carrier phase difference detection signal may vary around a point apart from the maximum value, so that the detection signal may vary sufficiently largely. Because when the phase fluctuations of the OTDM-DPSK signal have a zero size φ, the optical carrier phase difference detection signal may vary around a point apart from the maximum value, the optical carrier phase difference detection signal may monotone decrease or monotone increase. Therefore, when the phase fluctuations of the OTDM-DPSK signal decrease their size φ, the optical carrier phase difference detection signal definitely decreases or increases. Specifically, when the optical carrier phase difference detection signal increases or decreases, it is possible to determine how the size φ of the phase fluctuations varies (whether it increases or decreases).

Figure 11:
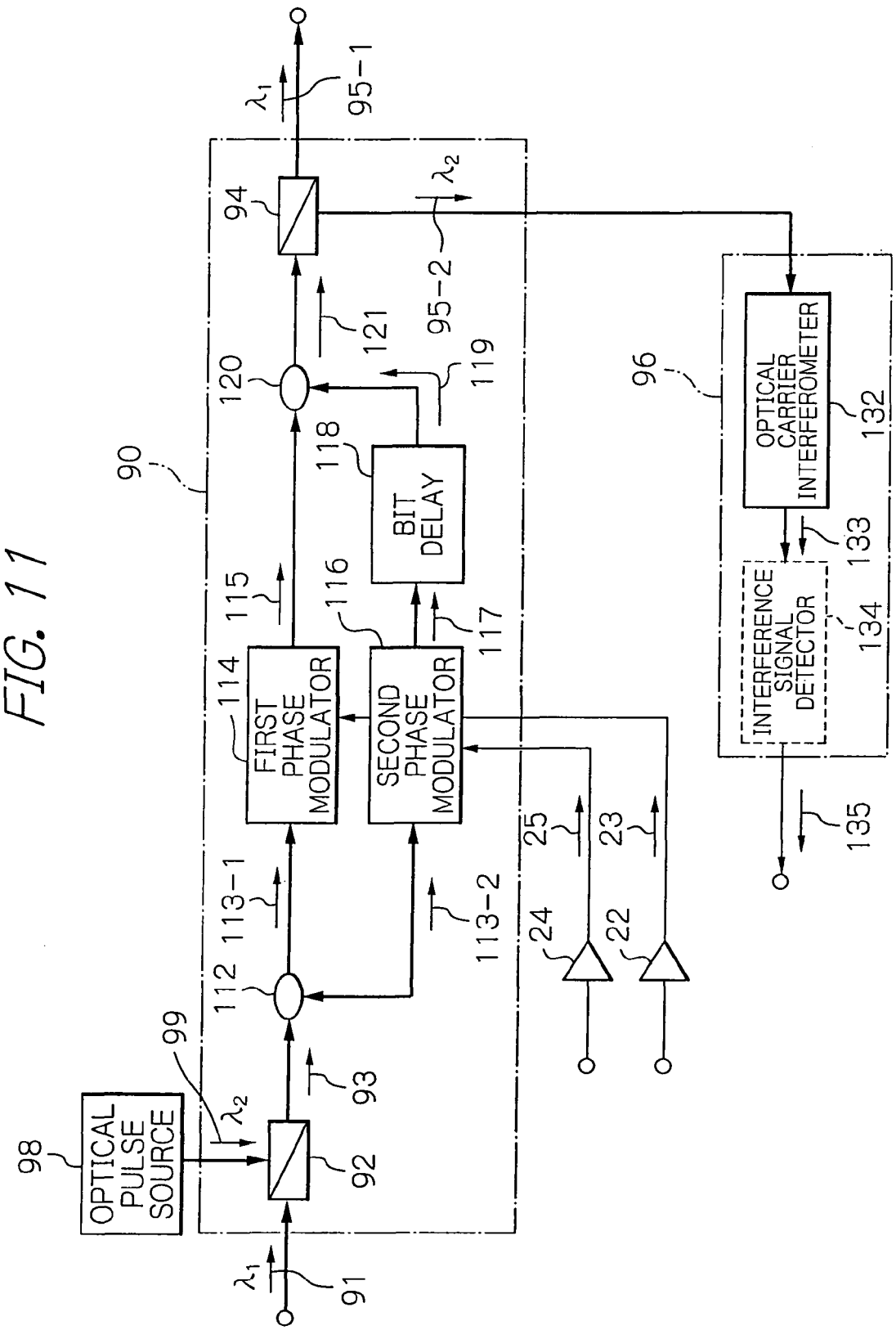
FIG. 11 is a schematic block diagram of the configuration of an OTDM-DPSK signal generator system that includes an optical carrier phase difference detector and uses a two-wavelength optical pulse string.

The third OTDM-DPSK signal generator system is adapted to generate a monitor signal having a different wavelength from the OTDM-DPSK signal. The third system thus includes, as shown in FIG. 11, an OTDM-DPSK signal generator 90 and an optical carrier phase difference detector 96. The OTDM-DPSK signal generator 90 has, however, a different configuration from those in the first and second OTDM-DPSK signal generator systems.

The OTDM-DPSK signal generator 90 includes a wavelength division multiplexing (WDM) coupler 92, an optical splitter 112, a first phase modulator 114, a second phase modulator 116, a bit delay device 118, an optical coupler 120, and a WDM splitting filter 94. The WDM coupler 92 adds an optical pulse string 91 at a wavelength of $\lambda_1$ and an optical pulse string 99 at a wavelength of $\lambda_2$, thus generating and outputting a multiple wavelength optical pulse string 93. Note that $\lambda_1 \neq \lambda_2$. The optical splitter 112 splits the multiple wavelength optical pulse string 93 into a first and a second multiple wavelength optical pulse string 113-1 and 113-2.

The first and second phase modulators 114 and 116 receive the first and second multiple wavelength optical pulse strings 113-1 and 113-2, and generate and output a first and a second channel DPSK signal 115 and 117 coded in DPSK scheme, respectively. The bit delay device 118 receives the DPSK signal 117. The device 118 then provides the signal 117 with a ½-bit time delay, thus generating and outputting a DPSK signal 119. The DPSK signal 119 enters the optical coupler 20. The first and second channel DPSK signals 115 and 117 both include signal components at wavelengths of $\lambda_1$ and $\lambda_2$.

The optical coupler 120 provides the DPSK signals 115 and 119 with the OTDM, thus generating and outputting a duplex OTDM-DPSK signal 121. The WDM splitting filter 94 functions as a monitor signal splitter that splits the duplex OTDM-DPSK signal 121 into an OTDM-DPSK signal 95-1 at a wavelength of $\lambda_1$ and a monitor signal 95-2 at a wavelength of $\lambda_2$.

The optical carrier phase difference detector 96 generates and outputs an optical carrier phase difference detection signal 135. The signal 135 is given as a function of an optical carrier phase difference between the optical pulses in the monitor signal 95-2 at a wavelength of $\lambda_2$.

The optical carrier phase difference detection signal 135 is generated and output by the optical carrier phase difference detector 96. The detector 96 includes an optical carrier interferometer 132 and an interference signal detector 134. The optical carrier interferometer 132 receives the monitor signal 95-2. The interferometer 132 then modulates, depending on the optical carrier phase difference between the optical pulses in the monitor signal 95-2, the intensity of the monitor signal 95-2, thus generating interference light and outputting the interference light as an interference monitor signal 133. The interference signal detector 134 receives the interference monitor signal 133 and generates and outputs the optical carrier phase difference detection signal 135.

The interference signal detector 134 is configured in a similar way to the interference signal detector 34 in the first and second OTDM-DPSK signal generator systems. A repetitive description of its configuration and function is omitted here.

The optical carrier phase difference detector 96 has a signal processing process from receiving the monitor signal 95-2 at a wavelength of $\lambda_2$ to generating and outputting the optical carrier phase difference detection signal 135. The process is similar to the process in the optical carrier phase difference detector 30 in the first and second OTDM-DPSK signal generator systems. The interference monitor signal 133 output from the optical carrier interferometer 132 corresponds to the first multiple monitor signal 53 shown in FIG. 4. The signal 133 thus includes the two types of optical pulses: the optical pulse of the strong light intensity $I_a$ and the optical pulse of the weak light intensity $I_b$. The light intensity $I_a$ and $I_b$ are given by the expressions (13) and (14). Note, however, that the interference monitor signal 133 corresponding to the first multiple monitor signal 53 has a different wavelength ($\lambda_2$) from the OTDM-DPSK signal, the wavelength being $\lambda_1$.

The monitor signal 95-2 is formed as follows. An optical pulse source 98 at a wavelength of $\lambda_2$ supplies the optical pulse string 99 at a wavelength of $\lambda_2$. The optical pulse string 99 is processed by the first phase modulator 114, the second phase modulator 116, and the bit delay device 118, thus generating the OTDM-DPSK signal at a wavelength of $\lambda_2$. The OTDM-DPSK signal is split by the WDM splitting filter 94 to provide the monitor signal 95-2. In the following discussion, therefore, the interference monitor signal 133 may be considered similar to the interference multiple monitor signal 33 shown in FIG. 3. Note, however, that the OTDM-DPSK signal 95-1 and the monitor signal 95-2 at wavelengths of $\lambda_1$ and $\lambda_2$, respectively, have been provided with ½ bit at time-slot positions offset to each other on the time axis.

The two signals 95-1 and 95-2 may have the offset time-slot positions by inputting to the WDM coupler 92 the optical pulse strings 91 and 99 at wavelengths of $\lambda_1$ and $\lambda_2$, respectively, with different time-slot positions between the optical pulse strings 91 and 99 at wavelengths of $\lambda_1$ and $\lambda_2$, respectively. Ideally, it is preferable to adjust the timing at which the optical pulse strings 91 and 92 at wavelengths of $\lambda_1$ and $\lambda_2$ enter the DM coupler 92 so that the time slot of the optical pulse string 99 at a wavelength of $\lambda_2$ is at the midpoint of a time slot adjacent to the optical pulse string 91 at a wavelength of $\lambda_1$.

Figure 12:
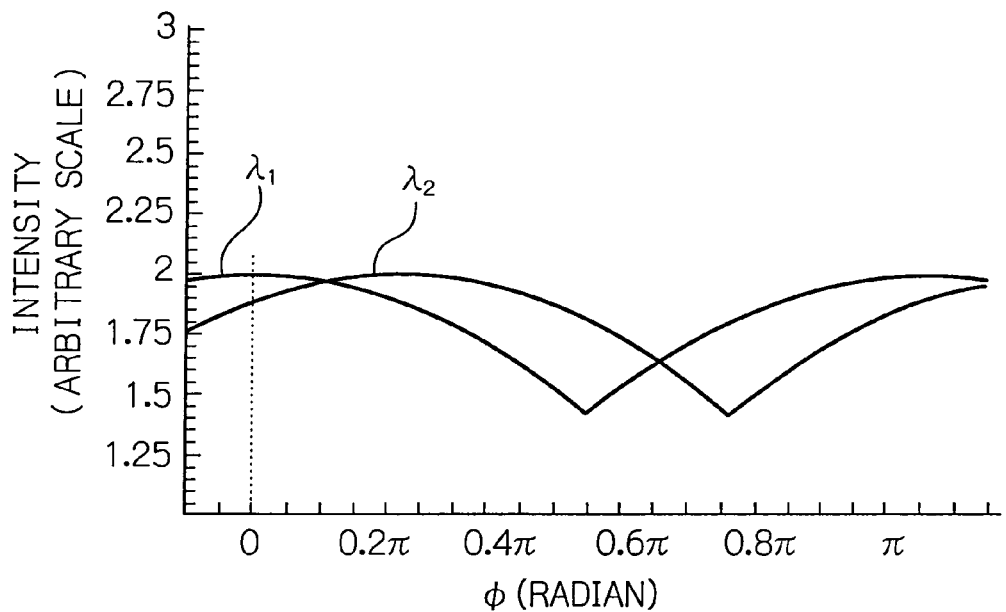
FIG. 12 plots curves $\lambda_1$ and $\lambda_2$, the curve $\lambda_1$ providing an average of two types of optical pulse intensity of an interference monitor signal at a wavelength $\lambda_1$ as a function of φ, the curve $\lambda_2$ providing an average of two types of optical pulse intensity of an interference monitor signal appearing in FIG. 11 at a wavelength $\lambda_2$ as a function of φ.
Figure 13:
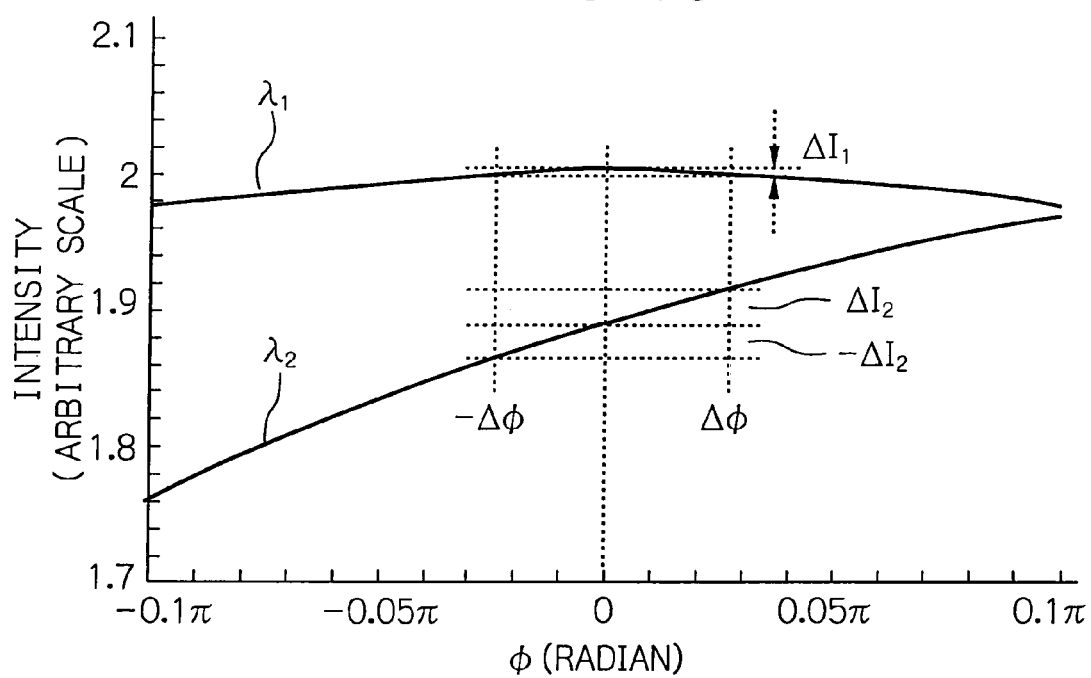
FIG. 13 shows part of FIG. 12 enlarged in the vicinity of φ=zero.

With reference to FIGS. 12 and 13, the optical carrier phase difference detection signal 135 will be described below. The interference monitor signal 133 at a wavelength of $\lambda_2$ includes the optical pulses of the two types of intensity. The high frequency component providing the average of the optical pulses of the two types of intensity $((I_a+I_b)/2)$ is cut off. The optical carrier phase difference detection signal 135 is then generated that reflects the average of the light intensity $I_a$ and $I_b$ (the signal is in proportion to the time average of the light intensity $I_a$ and $I_b$). FIG. 12 shows two curves. One curve, which may be referred to hereafter as a "curve $\lambda_1$", provides the average of the two types of optical pulse intensity of the OTDM-DPSK signal at a wavelength of $\lambda_1$ as a function of $\phi$. The other curve, which may be referred to hereafter as a "curve $\lambda_2$", provides the average of the two types of optical pulse intensity of the interference monitor signal 133 at a wavelength of $\lambda_2$ as a function of $\phi$. Specifically, the curve $\lambda_2$ provides the average $((I_a+I_b)/2)$ of the two types of optical pulse intensity ($I_a$ and $I_b$) of the interference monitor signal 133 as a function of $\phi$. FIG. 13 is an enlarged view of the vicinity of ($\phi$=zero in FIG. 12. In FIGS. 12 and 13, the x-axis is the value of $\phi$ and the y-axis is the light intensity on an arbitrary scale.

In FIG. 12, the curve $\lambda_1$ corresponds to the curve in FIG. 7B that provides the average of the two types of optical pulse intensity of the interference multiple monitor signal. The OTDM-DPSK signal 95-1 at a wavelength of $\lambda_1$ and the monitor signal 95-2 at a wavelength of $\lambda_2$ are artificially offset on the time axis. The curve $\lambda_1$ and the curve $\lambda_2$ are thus offset on the x-axis.

In order that the exact midpoint of a time slot adjacent to the OTDM-DPSK signal 95-1 at a wavelength of $\lambda_1$ is the time slot on the time axis at which the monitor signal 95-2 at a wavelength of $\lambda_2$ is provided with one bit, the monitor signal 95-2 at a wavelength of $\lambda_2$ is artificially offset to the OTDM-DPSK signal 95-1 at a wavelength of $\lambda_1$. This may make the following possible. When the phase fluctuations of the OTDM-DPSK signal 95-1 at a wavelength of $\lambda_1$ have the minimum size $\phi$, the optical carrier phase difference detection signal 135 may have a value ranging between the maximum and the minimum.

As seen in FIG. 12, the average of the two types of optical pulse intensity of the OTDM-DPSK signal 95-1 at a wavelength of $\lambda_1$ is the maximum at $\phi$=zero. At this point, however, the average of the two types of optical pulse intensity of the interference monitor signal 133 at a wavelength of $\lambda_2$ is not the maximum. FIG. 13 enlarges the vicinity of $\phi$=zero where the curve $\lambda_1$ is the maximum in FIG. 12. In the curve $\lambda_1$, a small variation $\pm\Delta\phi$ in $\phi$ in the vicinity of $\phi$=zero causes a very small variation $\Delta I_1$ in the average of the two types of optical pulse intensity as shown in FIG. 13. In contrast, in the curve $\lambda_2$, small variations $+\Delta\phi$ and $-\Delta\phi$ in $\phi$ cause a variation $\Delta I_2$ of $+\Delta I_2$ and $-\Delta I_2$, respectively, in the average of the two types of optical pulse intensity. The variation $\Delta I_2$ in the curve $\lambda_2$ is sufficiently larger than the variation $\Delta I_1$ in the curve $\lambda_1$. Also in the curve $\lambda_2$, the small variations of $+\Delta\phi$ and $-\Delta\phi$ in $\phi$ cause the variation $\Delta I_2$ with different symbols as $+\Delta I_2$ and $-\Delta I_2$, respectively.

Therefore, in the vicinity of the maximum value of the optical carrier phase difference detection signal (the position at $\phi$=zero where the average of the two types of optical pulse intensity of the OTDM-DPSK signal 95-1 at a wavelength of $\lambda_1$ is the maximum), when the optical carrier phase difference detection signal decreases, whether the size $\phi$ of the phase fluctuations decreases or increases may be determined using the symbol of the variation $\Delta I_2$.

A fourth OTDM-DPSK signal generator system includes an OTDM-DPSK signal generator 400 and an interference signal detector 134 as the optical carrier phase difference detector. The OTDM-DPSK signal generator 400 is configured differently from the third OTDM-DPSK signal generator system. The optical carrier interferometer may be eliminated. The OTDM-DPSK signal generator 400 is configured by replacing the optical coupler 120 and the WDM splitting filter 94 in the OTDM-DPSK signal generator 90 of the third OTDM-DPSK signal generator system with a compound optical add drop module 142 that combines the functions of the components 120 and 94. The OTDM-DPSK signal generator 400 may thus reduce the number of parts included therein and the optical carrier interferometer may be eliminated, thus allowing the system to be manufactured at a lower cost.

Figure 14:
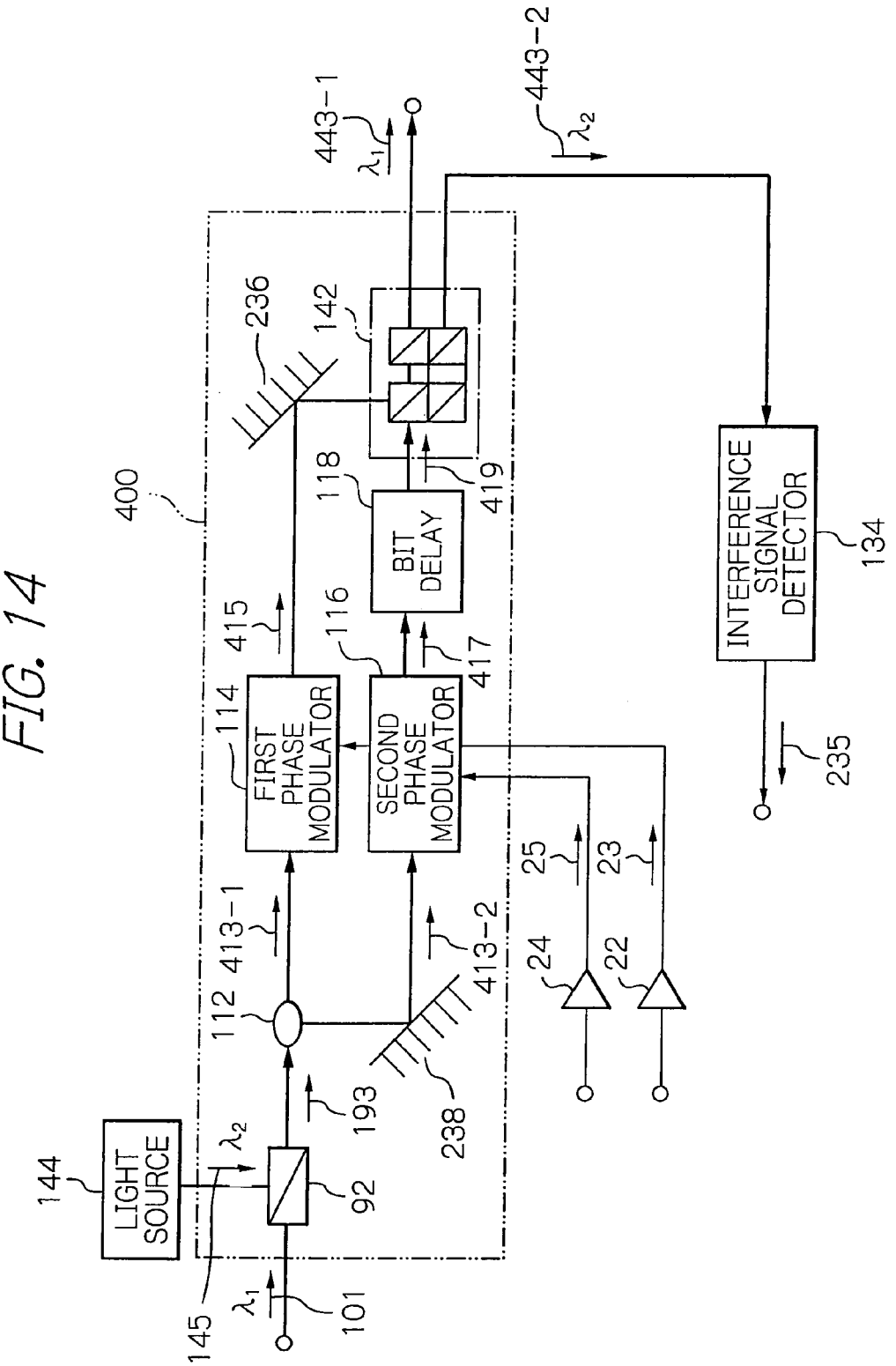
FIG. 14 is a schematic block diagram of the configuration of an OTDM-DPSK signal generator system including an optical carrier phase difference detector that includes a compound optical add drop module.
Figure 15A:
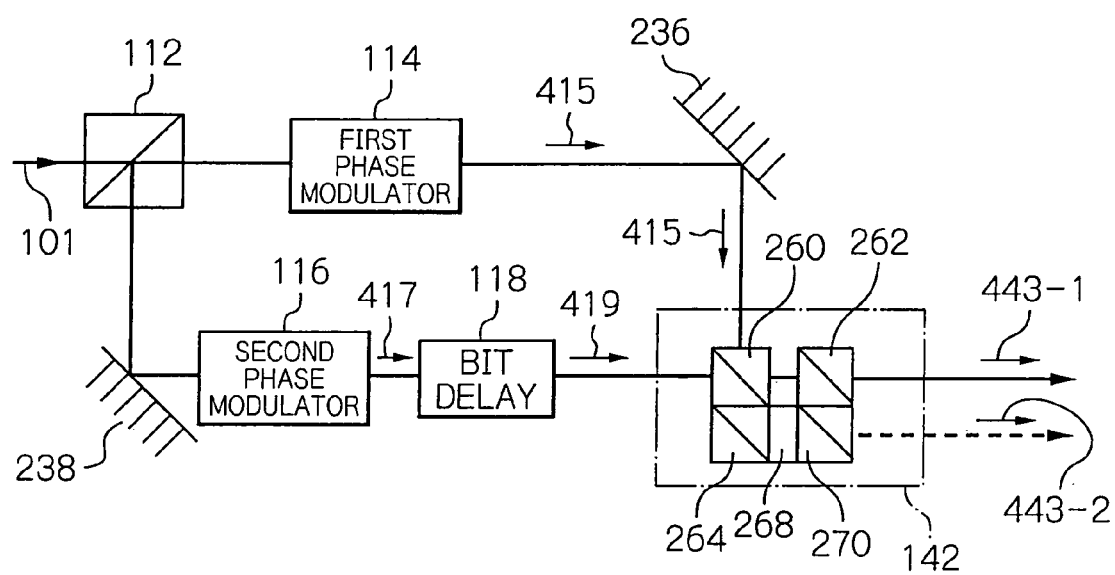
FIGS. 15A and 15B illustrate the generation process of a monitor signal at a wavelength of $\lambda_2$ in an OTDM-DPSK signal generator system including the optical carrier phase difference detector that includes the compound optical add drop module, FIG. 15A schematically showing the OTDM-DPSK signal generator and also showing the configuration of a compound optical add drop module, FIG. 15B illustrating a process in which a first and a second channel DPSK signal generate a monitor signal at a wavelength of $\lambda_2$ in the compound optical add drop module.
Figure 15B:
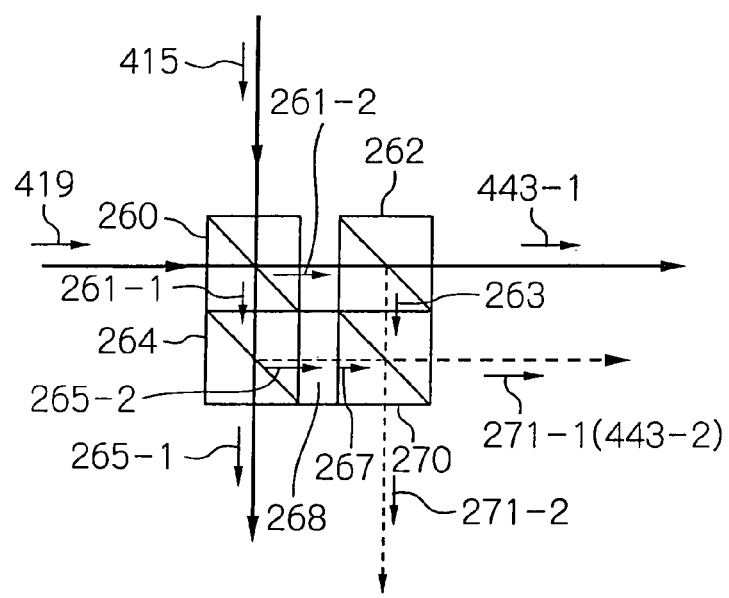

With reference to FIGS. 14, 15A, and 15B, the configuration of the fourth OTDM-DPSK signal generator system will be described below. FIG. 14 is a schematic block diagram of the configuration of the fourth OTDM-DPSK signal generator system including an optical carrier phase difference detector that includes a compound optical add drop module as an optical add drop module. FIGS. 15A and 15B illustrate a generation process of a monitor signal at a wavelength of $\lambda_2$ in an OTDM-DPSK signal generator system including an optical carrier phase difference detector that includes a compound optical add drop module as an optical add drop module. FIG. 15A schematically shows an OTDM-DPSK signal generator and also shows the configuration of a compound optical add drop module. FIG. 15B illustrates a process in which a first and a second channel DPSK signal generate a monitor signal at a wavelength of $\lambda_2$ in a compound optical add drop module.

The OTDM-DPSK signal generator 400 includes the WDM coupler 92, the optical splitter 112, the first phase modulator 114, the second phase modulator 116, the bit delay device 118, and a compound optical add drop module 142. The WDM coupler 92, the optical splitter 112, the first phase modulator 114, the second phase modulator 116, and the bit delay device 118 in the OTDM-DPSK signal generator 400 are similar to those in the OTDM-DPSK signal generator 90 in the third OTDM-DPSK signal generator system. They are thus referred to by like reference numerals. The OTDM-DPSK signal generator 400 is, however, configured differently from the OTDM-DPSK signal generator 90 in the third OTDM-DPSK signal generator system in that the generator 400 includes the compound optical add drop module 142 and the like. Further, the OTDM-DPSK signal generator 400 processes a signal different from the signal processed by the OTDM-DPSK signal generator 90 in the third OTDM-DPSK signal generator system. The signals in the third and fourth OTDM-DPSK signal generator systems are thus referred to by different reference numerals for distinction.

The WDM coupler 92 adds an optical pulse string 101 at a wavelength of $\lambda_1$ and continuous wave light 145 at a wavelength of $\lambda_2$, thus generating and outputting a multiple wavelength optical pulse string 193. The optical splitter 112 splits the multiple wavelength optical pulse string 193 into a first and a second multiple wavelength optical pulse string 413-1 and 413-2. The first and second phase modulators 114 and 116 receive the first and second multiple wavelength optical pulse strings 413-1 and 413-2, respectively. The first and second modulators 114 and 116 then generate and output a first and a second channel DPSK signal 415 and 417 coded in DPSK scheme, respectively. Note that the second multiple wavelength optical pulse string 413-2 is reflected by a reflecting mirror 238 to the second phase modulator 116. The first and second channel DPSK signals 415 and 417 both include signal components at wavelengths of $\lambda_1$ and $\lambda_2$.

The bit delay device 118 provides the input second channel DPSK signal 417 with a ½-bit time delay, thus generating and outputting an DPSK signal 419. The bit delay device 118 provides the second channel DPSK signal 417 with a time delay necessary to bit interleave the first and second channel DPSK signals 415 and 417 and provide them with the OTDM. The time delay corresponds to half of the time occupied on the time axis by one of the optical pulses in the second channel DPSK signal 417. The first channel DPSK signal 415 reflected by the reflecting mirror 236 and the second channel DPSK signal 419 enter the compound optical add drop module 142.

The compound optical add drop module 142 includes, as shown in FIG. 15B, a first half mirror 260, a second half mirror 262, a third half mirror 264, a ¼-wavelenth plate 268, and a fourth half mirror 270. The second half mirror 262 is provided at an output of the first half mirror 260 that outputs light incident on and reflected by the first half mirror 260. The third half mirror 264 is provided at an output of the first half mirror 260 that outputs light incident on and transmitted by the first half mirror 260. The ¼-wavelenth plate 268 is provided at an output of the third half mirror 264 that outputs light incident on and reflected by the third half mirror 264. The fourth half mirror 270 is provided at the position where light reflected and output from the second half mirror 262 and light reflected and output from the third half mirror 264 interfere.

The second half mirror 262 is a WDM splitting filter that transmits incident light at a wavelength of $\lambda_1$ and reflects incident light at a wavelength of $\lambda_2$. The third half mirror 264 is a WDM splitting filter that transmits incident light at a wavelength of $\lambda_1$ and reflects incident light at a wavelength of $\lambda_2$.

The compound optical add drop module 142 receives the DPSK signals 415 and 419 and provides them with the optical time division multiplexing, thus generating and outputting a duplex OTDM-DPSK signal 443-1 at a wavelength of $\lambda_1$ and an interference monitor signal 271-1 (443-2) at a wavelength of $\lambda_2$.

The interference signal detector 134 is configured in a similar way to the interference signal detector 34 in the first and second OTDM-DPSK signal generator systems. The detector 134 receives an interference monitor signal 443-2 at a wavelength of $\lambda_2$ and outputs an optical carrier phase difference detection signal 235.

Figure 16:
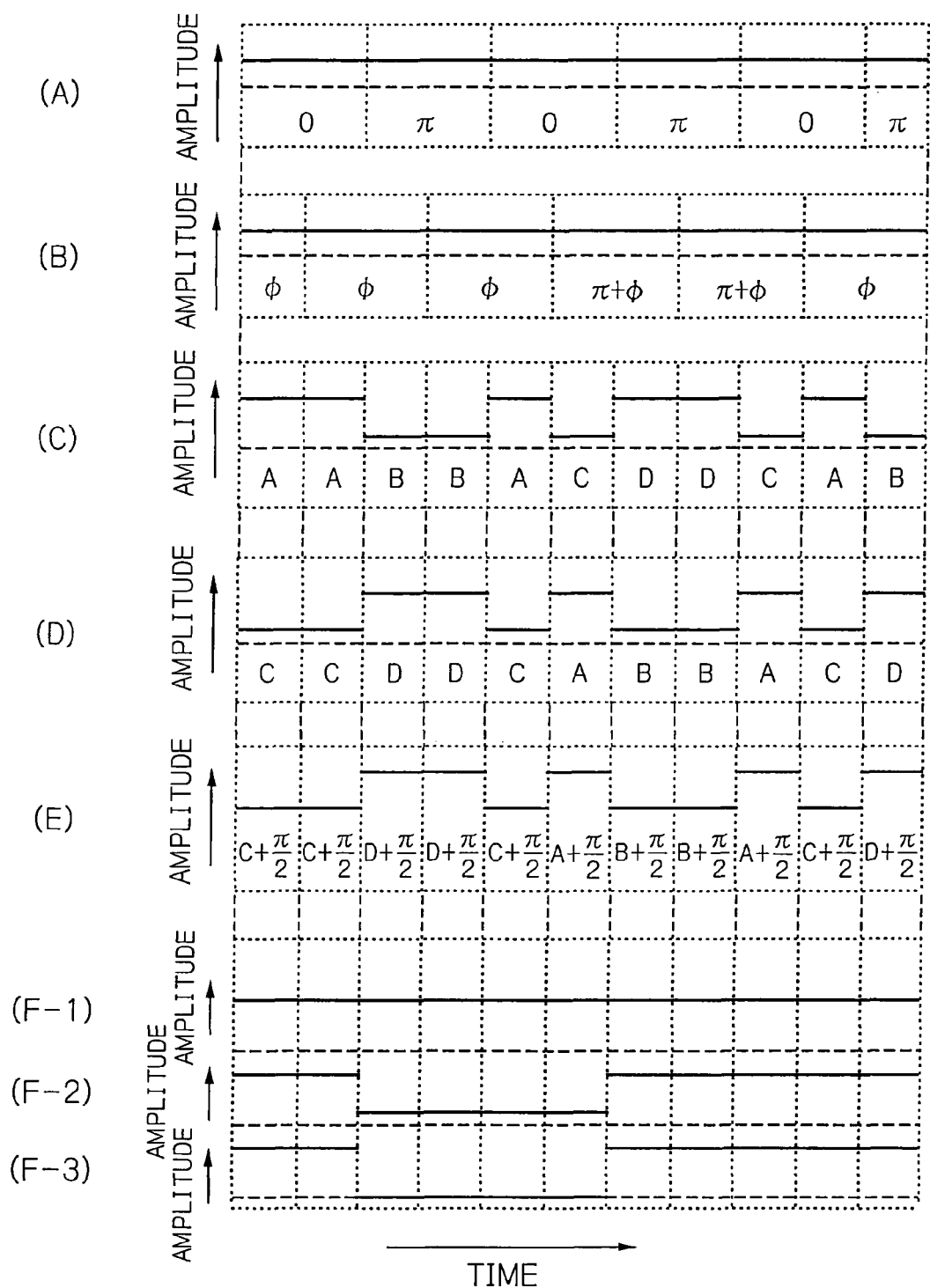
FIG. 16 shows temporal waveforms of light signals at each location in a fourth OTDM-DPSK signal generator system, particularly in a compound optical add drop module, part (A) showing the temporal waveform of a first channel DPSK signal at a wavelength of $\lambda_2$, part (B) showing the temporal waveform of a second channel DPSK signal provided with a one bit time delay, part (C) showing the temporal waveform of a (2-2)th signal, part (D) showing the temporal waveform of a (3-2)th signal, part (E) showing the temporal waveform of a (3-2)th phase difference added signal, part (F) showing the temporal waveform of a (4-1)th signal, part (F-1) showing the temporal waveform of a (4-1)th signal for (φ=zero or φ=π, part (F-2) showing the temporal waveform of a (4-1)th signal for φ=π/4 or φ=3π/4, and part (F-3) showing the temporal waveform of a (4-1)th signal for φ=π/2.

Referring now to FIGS. 15A, 15B, and 16, an operation of the fourth OTDM-DPSK signal generator system will be described below. FIG. 16, parts (A) to (F-3) show temporal waveforms of the optical signals at each location in the fourth OTDM-DPSK signal generator system, particularly in the compound optical add drop module 142. FIG. 16, part (A), shows the temporal waveform of a first channel DPSK signal at a wavelength of $\lambda_2$. Part (B) shows the temporal waveform of a second channel DPSK signal generated from a second channel DPSK signal provided with a one bit time delay. Part (C) shows the temporal waveform of a (2-2)th signal. Part (D) shows the temporal waveform of a (3-2)th signal. Part (E) shows the temporal waveform of a (3-2)th phase difference added signal. Part (F) shows the temporal waveform of a (4-1)th signal. Part (F-1) shows the temporal waveform of a (4-1)th signal for φ=zero or φ=π. Part (F-2) shows the temporal waveform of a (4-1)th signal for φ=π/4 or φ=3π/4. Part (F-3) shows the temporal waveform of a (4-1)th signal for φ=π/2. A, B, C, and D shown in parts (C), (D) and (E) means the phase <A, <B, <C, and <D as described above, respectively.

The duplex OTDM-DPSK signal 443-1 at a wavelength of $\lambda_1$ is simply a signal that passes through the compound optical add drop module 142. The signal 443-1 is thus similar to the OTDM-DPSK signal 95-1 at a wavelength of $\lambda_1$ that is output from the WDM light splitting filter 94 in the third OTDM-DPSK signal generator system.

The first channel DPSK signal 415 at a wavelength of $\lambda_2$ and the second channel DPSK signal 419 generated from the second channel DPSK signal 417 provided with a ½-bit time delay are the temporal waveforms shown in FIG. 16, parts (A) and (B), respectively. The signal at a wavelength of $\lambda_2$ is a signal generated from continuous wave light supplied from a continuous wave light source 144 at a wavelength of $\lambda_2$. The signal at $\lambda_2$ is thus not the pulse signal as shown in FIG. 5, parts (A) to (G-3), but the direct-current signal. In FIG. 16, parts (A) to (F-3), the broken line represents a level at the signal intensity zero, and the interval between the solid line and the broken line represents the signal intensity.

The DPSK signals 415 and 419 first enter the first half mirror 260 in the compound optical add drop module 142. The reflective surface of the first half mirror 260 reflects light. Light then undergoes a phase change of π/2. The DPSK signal 419 passes through the reflective surface of the first half mirror 260. The DPSK signal 415 reflects on the reflective surface of the first half mirror 260, undergoing a phase change of π/2. The two signals are then added and input to the second half mirror 262 as a (1-2)th signal 261-2. The second half mirror 262 is a WDM optical add drop module that transmits a signal component at a wavelength of $\lambda_1$ and reflects a signal component at a wavelength of $\lambda_2$. Among the (1-2)th signal 261-2 input to the second half mirror 262, therefore, a (1-2)th transmission signal 443-1 that is a signal at a wavelength of $\lambda_1$ component passes through the second half mirror 262 and a (2-2)th signal 263 that is a signal at a wavelength of $\lambda_2$ component reflects the mirror 262, and both signals are output. The (2-2)th signal 263 enters, after output from the second half mirror 262, the fourth half mirror 270.

The third half mirror 264 is also a WDM optical add drop module that transmits a signal component at a wavelength of $\lambda_1$ and reflects a signal component at a wavelength of $\lambda_2$. Among the (1-1)th signal 261-1 input to the third half mirror 264, therefore, a transmission component 265-1 that is a signal at a wavelength of $\lambda_1$ component passes through the third half mirror 264, and a (3-2)th signal 265-2 that is a signal at a wavelength of $\lambda_2$ component reflects the mirror 264, and both signals are output. The transmission component 265-1 is discarded.

The (1-2)th signal 261-2 enters the second half mirror 262 and reflects on its reflective surface, thus generating the (2-2)th signal 263. The signal 263 has a waveform as shown in FIG. 16, part (C). The reflective surface of the first half mirror 260 adds the DPSK signals 415 and 419, thus generating the (1-1)th signal 261-1. The signal 261-1 then reflects on the reflective surface of the third half mirror 264, thus generating the (3-2)th signal 265-2. The signal 265-2 has a temporal waveform shown in FIG. 16, part (D).

The (3-2)th signal 265-2 is added, during passing through the ¼-wavelength plate 268, with a phase difference of π/2, thus generating and outputting a (3-2)th phase difference added signal 267. The (3-2)th phase difference added signal 267 has a temporal waveform as shown in FIG. 16, part (E).

The (2-2)th signal 263 and the (3-2)th phase difference added signal 267 are added on the fourth half mirror 270, thus outputting a (4-1)th signal 271-1. The (2-2)th signal 263 and the (3-2)th phase difference added signal 267 are added on the fourth half mirror 270 and output as a (4-2)th signal 271-2. The signal 271-2 is, however, discarded.

The (4-1)th signal 271-1 has a temporal waveform shown in FIG. 16, part (F-1), for the phase fluctuations φ of zero or π, a temporal waveform shown in part (F-2) for φ of π/4 or 3 π/4, and a temporal waveform shown in part (F-3) for φ of π/2. Depending on the phase fluctuations φ, therefore, the temporal waveform of the (4-1)th signal 271-1 varies as shown in parts (F-1), (F-2) and (F-3). The (4-1)th signal 271-1 may thus be used to monitor the phase fluctuations φ. The (4-1)th signal 271-1 corresponds to the interference monitor signal 443-2 at a wavelength of $\lambda_2$ shown in FIG. 14. The (4-1)th signal 271-1 may thus be input to the interference signal detector 134, thus generating and outputting the optical carrier phase difference detection signal 235.

The first, second and third OTDM-DPSK signal generator systems according to the first, second and third embodiments, respectively, include an optical carrier interferometer that is configured as a light waveguide type interferometer including a planar lightwave circuit (PLC) as described with reference to FIG. 4. The PLC may form an optical carrier interferometer that may be mass produced inexpensively. For small production, however, the PLC may form an optical carrier interferometer of high unit cost.

Figure 17A:
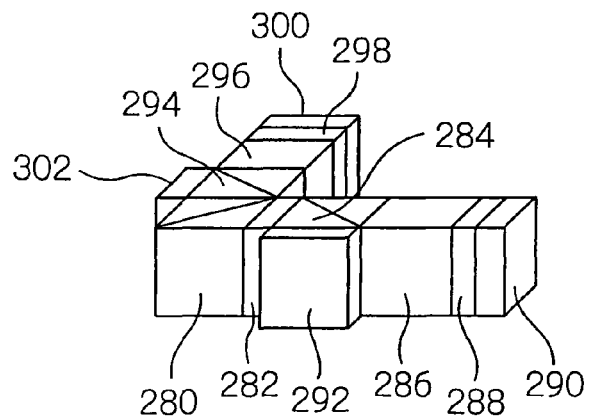
FIGS. 17A and 17B show the schematic configuration of an optical carrier interferometer using a first bulk optical element, FIG. 17A being a perspective view of the optical carrier interferometer using the first bulk optical element viewed almost from the above, FIG. 17B being a plan view viewed from the top in FIG. 17A.
Figure 17B:
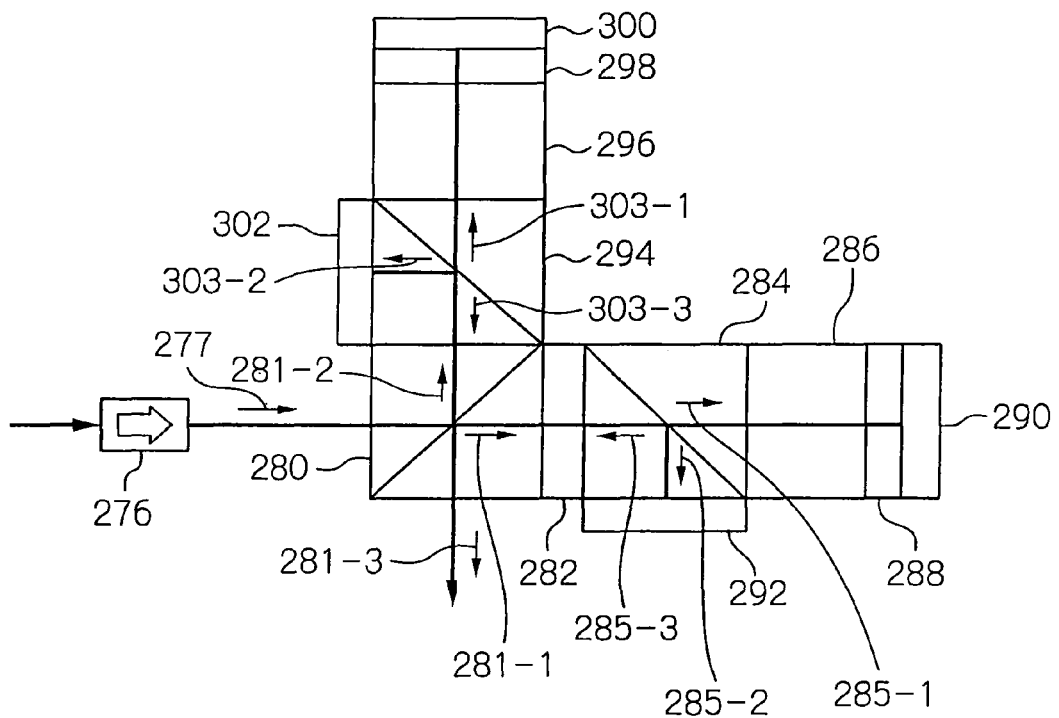

For small production of the OTDM-DPSK signal generator system, an exemplified optical carrier interferometer formed using a bulk optical element, i.e. an optical carrier interferometer using a first bulk optical element, which can be manufactured in a small amount at low cost will be described below with respect to FIGS. 17A and 17B. FIGS. 17A and 17B are schematic configuration diagrams of an optical carrier interferometer using a first bulk optical element. FIG. 17A is a perspective view of an optical carrier interferometer using a first bulk optical element as viewed from the front top. FIG. 17B is a plan view as viewed from the top.

An optical carrier interferometer using the first bulk optical element includes a first half mirror 280, a ¼-wavelenth plate 282, a second half mirror 284, a first ½-bit delay device 286, a first phase fine adjustment device 288, a first total reflection mirror 290, a second total reflection mirror 292, a third half mirror 294, a second ½-bit delay device 296, a second phase fine adjustment device 298, a third total reflection mirror 300, and a fourth total reflection mirror 302.

The first half mirror 280 receives an input signal incident thereon. In the direction in which the input signal passes through the first half mirror 280, provided are the first half mirror 280, the ¼-wavelenth plate 282, the second half mirror 284, the first ½-bit delay device 286, the first phase fine adjustment device 288, and the first total reflection mirror 290 in series. In the direction in which the input signal reflects from the first half mirror 280, provided are the first half mirror 280, the third half mirror 294, the second ½-bit delay device 296, the second phase fine adjustment device 298, and the third total reflection mirror 300 in series. The second total reflection mirror 292 is provided on a side of the second half mirror 284 to which signal light passing through the first half mirror 280 is reflected by the second half mirror 284. The fourth total reflection mirror 302 is provided on a side of the third half mirror 294 to which signal light passing through the first half mirror 280 is reflected by the third half mirror 294.

After passing through a light isolator 276, an input signal 277 enters the first half mirror 280 that splits the signal 277 into a first and a second optical signal 281-1 and 281-2. It is assumed here that the input signal 277 is the OTDM-DPSK signal. The first and second optical signals 281-1 and 281-2 have temporal waveforms as shown in FIG. 5, parts (A) and (B), respectively.

The first optical signal 281-1 is an optical signal that has passed through the first half mirror 280. After output from the first half mirror 280, the first optical signal 281-1 passes through the ¼-wavelenth plate 282 into the second half mirror 284. The second half mirror 284 splits the first optical signal 281-1 into a (1-1)th optical signal 285-1 and a (1-2)th optical signal 285-2. The (1-1)th optical signal 285-1 passes through the second half mirror 284, through the first ½-bit delay device 286 and the first phase fine adjustment device 288. The signal 285-1 then reflects from the first total reflection mirror 290, and passes back through the first phase fine adjustment device 288 and the first ½-bit delay device 286 to the second half mirror 284.

The (1-2)th optical signal 285-2 reflects from the second total reflection mirror 292 back to the second half mirror 284. The reflective surface of the second half mirror 284 produces an interference between the (1-1)th optical signal 285-1 reflecting back from the first total reflection mirror 290 and the (1-2)th optical signal 285-2 reflecting from the second total reflection mirror 292.

The (1-1)th optical signal 285-1 passes through the first ½-bit delay device 286 twice. The signal 285-1 is thus one bit behind the (1-2)th optical signal 285-2 when it interferes with the signal 285-2. The (1-1)th optical signal 285-1 passes and returns through the first phase fine adjustment device 288. The signal 285-1 thus has, as the optical carrier of the optical signal, a phase delay of $\pi$ behind (1-2)th optical signal 285-2. The first and second total reflection mirrors 290 and 292 reflect the (1-1)th and (1-2)th optical signals 285-1 and 285-2 back to the second half mirror 284, respectively. The signals 285-1 and 285-2 then interfere, thus providing a third optical signal 285-3. The signal 285-3 is then output from the second half mirror 284.

The first half mirror 280 splits the signal 281-2 from the input signal 277. The signal 281-2 then enters the third half mirror 294 that splits the signal 281-2 into a (2-1)th and a (2-2)th optical signal 303-1 and 303-2. The (2-1)th optical signal 303-1 is an optical signal that has passed through the third half mirror 294. The (2-1)th optical signal 303-1 then passes through the second ½-bit delay device 296 and the second phase fine adjustment device 298. The signal 303-1 then reflects from the third total reflection mirror 300, and passes back though the second phase fine adjustment device 298 and the second ½-bit delay device 296 to the third half mirror 294. The (2-2)th optical signal 303-2 is an optical signal that has reflected from the third half mirror 294. The (2-2)th optical signal 303-2 then reflects from the fourth total reflection mirror 302 back to the third half mirror 294.

The (2-1)th optical signal 303-1 passes and returns through the second ½-bit delay device 296 and the second phase fine adjustment device 298. The signal 303-1 is thus one bit behind the (2-2)th optical signal 303-2 at the third half mirror 294 when it interferes with the signal 303-2. The (2-1)th optical signal 303-1 passes and returns through the second phase fine adjustment device 298. The signal 303-1 is thus in phase, as the optical carrier of the optical signal, with the (2-2)th optical signal 303-2 in the third half mirror 294. The third and fourth total reflection mirrors 300 and 302 reflect the (2-1)th and (2-2)th optical signals 303-1 and 303-2 back to the third half mirror 294, respectively. The signals 303-1 and 303-2 then interfere, thus providing a fourth optical signal 303-3. The signal 303-3 is then output from the third half mirror 294.

The third optical signal 285-3 passes through, after output from the second half mirror 284, the ¼-wavelenth plate 282. The signal 285-3 thus has a phase delay of $\pi/2$, as the optical carrier of the optical signal, before entering the first half mirror 280. The third optical signal 285-3 has a phase delay of $\pi/2$, as the optical carrier of the optical signal. The signal 285-3 interferes, at the first half mirror 280, with the fourth optical signal 303-3, thus providing an interference signal 281-3. The signal 281-3 is then output from the first half mirror 280.

A description will now be given of the correspondence between the components in the configuration of the optical carrier interferometer using the first bulk optical element and the components in the optical carrier interferometer in FIG. 4. The correspondence between the components is as follows. The first half mirror 280 serves as a combination of the first optical coupler 52 and the first optical splitter 42 in the optical carrier interferometer in FIG. 4. The second half mirror 284 serves as a combination of the third optical coupler 50 and the third optical splitter 46 in the optical carrier interferometer in FIG. 4. The third half mirror 294 serves as a combination of the second optical coupler 48 and the second optical splitter 44 in the optical carrier interferometer in FIG. 4.

Therefore, from the correspondence between the components in the optical carrier interferometer using the first bulk optical element and the components in the optical carrier interferometer in FIG. 4, the interference signal 281-3 output from the first half mirror 280 has temporal waveforms that equal those shown in FIG. 5, parts (G-1), (G-2) and (G-3). This means that the interference signal 281-3 is an optical signal equivalent to the first multiple monitor signal 53 in FIG. 4, and is also an optical signal similar to the interference monitor signal output from the optical carrier interferometer in the first to third OTDM-DPSK signal generator systems.

The light isolator 276 is provided on the input side of the optical carrier interferometer using the first bulk optical element. The isolator 276 serves to reduce light reflected from the optical carrier interferometer. The optical carrier interferometer using the first bulk optical element may provide a similar function to the optical carrier interferometer using the PLC in the first to third OTDM-DPSK signal generator systems according to the first to third embodiments. The optical carrier interferometer using the first bulk optical element may thus generate and output the first multiple monitor signal from the monitor signal.

The optical carrier interferometer using the first bulk optical element is large in size. A large optical carrier interferometer requires an advanced technology to maintain a uniform and constant temperature. A change in the temperature of the optical carrier interferometer may change the refractive index of the bulk optical element such as the wavelength plate in the optical carrier interferometer. It could thus not be ensured that the optical carrier interferometer operates as designed.

Figure 18A:
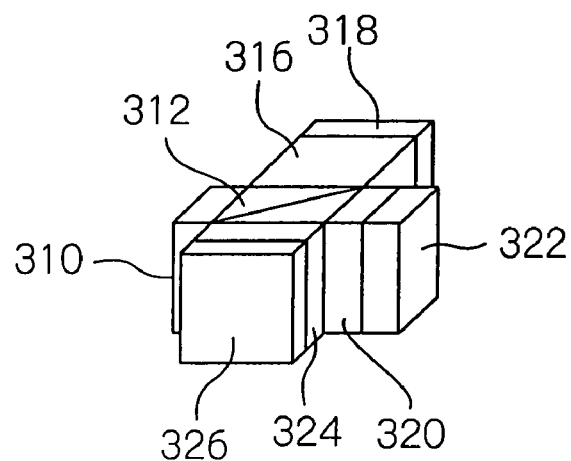
FIGS. 18A and 18B show the schematic configuration of an optical carrier interferometer using a second bulk optical element, FIG. 18A being a perspective view of the optical carrier interferometer using the second bulk optical element viewed almost from the above, FIG. 18B being a plan view viewed from the top in FIG. 18A.
Figure 18B:
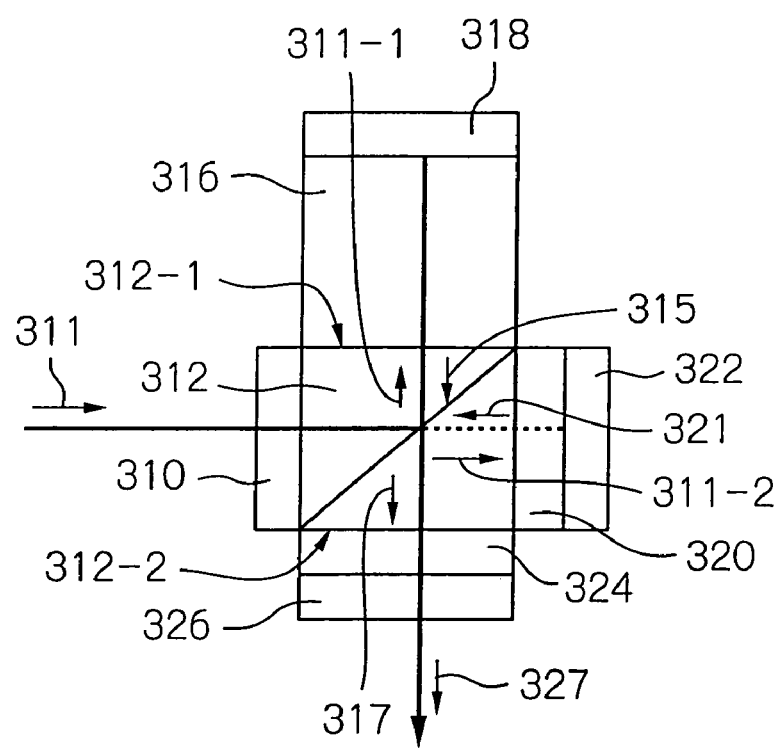

The present invention thus provides an optical carrier interferometer using a second bulk optical element, which is compact and may provide a function as the optical carrier interferometer. With reference to FIGS. 18A and 18B, a configuration and an operation of an optical carrier interferometer using a second bulk optical element will be described below. FIGS. 18A and 18B schematically show the configuration of an optical carrier interferometer using a second bulk optical element. FIG. 18A is a perspective view of the optical carrier interferometer using the second bulk optical element as viewed almost from the front top. FIG. 18B is a plan view as viewed from the top in FIG. 18A.

The optical carrier interferometer using the second bulk optical element includes a polarizer 310, a half mirror 312, a ½-bit delay device 316, a first total reflection mirror 318, a first uniaxial crystal 320, a second total reflection mirror 322, a second uniaxial crystal 324, and an analyzer 326.

The half mirror 312 receives an input signal incident thereon. In the direction in which the input signal passes through the half mirror 312, provided are the polarizer 310, the half mirror 312, the first uniaxial crystal 320, and the second total reflection mirror 322 in series. Input signal light is reflected by the half mirror 312 to an output end surface 312-1 of the half mirror 312. From an output end surface 312-1, provided are the ½-bit delay device 316 and the first total reflection mirror 318 in sequence. An end surface 312-2 is opposite to the end surface 312-1 of the half mirror 312 to which input signal light is reflected by the half mirror 312. From the end surface 312-2, provided are the second uniaxial crystal 324 and the analyzer 326 in sequence.

The first uniaxial crystal 320 may include, for example, a half-wavelength plate made of a quartz plate. The first uniaxial crystal 320 has a thickness d in the direction in which light travels. The thickness d is given by the expression (15).

$$(\Delta n \times d)/\lambda = m + (1/2), \quad (15)$$

where $\lambda$ is a wavelength, $\Delta n$ is the difference between the refractive indices of the crystal for the ordinary ray and the extraordinary ray, and m is an integer.

The second uniaxial crystal 324 is provided in a similar way to the first uniaxial crystal 320. The second crystal 324 may include a half-wavelength plate that provides a similar function to the plate in the first crystal 320.

With reference to FIGS. 18 through 19C, an operation of the optical carrier interferometer using the second bulk optical element will be described below. FIGS. 19A, 19B and 19C illustrate an operation of the second bulk optical element. FIG. 19A illustrates the polarized state of a first split signal passing through a first path. FIG. 19B illustrates the polarized state of a second split signal passing through a second path. FIG. 19C illustrates the polarized state of an interference signal generated by interference between the first and second split signals passing through the first and second paths, respectively. The direction in which light signal travels is the z-axis. The first and second uniaxial crystals 320 and 324 are provided with a line segment with arrows at both ends. The line segment indicates the direction of the crystal axis. The analyzer 326 is also provided with a line segment with arrows at both ends. The line segment indicates the direction in which the electric field vector of transmitted light oscillates.

The input signal 311 is generated and output, during passing through the polarizer 310, as linear polarized light. The signal 311 then enters the half mirror 312 that splits the signal 311 into a first and a second split signal 311-1 and 311-2. It is assumed here that the input signal 311 is the OTDM-DPSK signal.

The first split signal 311-1 is a signal that propagates over a first path. The first path is a path that runs from the reflective surface of the half mirror 312 through the ½-bit delay device 316, reflects from the first total reflection mirror 318, and passes back through the ½-bit delay device 316 to the reflective surface of the half mirror 312.

The first split signal 311-1 passes through, as shown in FIG. 19A, the ½-bit delay device 316, thus undergoing a ½-bit delay. The signal 311-1 then reflects from the first total reflection mirror 318. After reflecting from the first total reflection mirror 318, the first split signal 311-1 passes back through the ½-bit delay device 316 to undergo another ½-bit delay, thus providing a signal having a total of one bit delay, i.e. a first reflection signal 315. The signal 315 then reaches the reflective surface of the half mirror 312.

FIG. 19A schematically shows an oscillation of the electric field vector of the first split signal 311-1 as the optical carrier, i.e. a light wave in the form of sinusoidal wave. It is an oscillation when the signal 311-1 propagates through the first path, thus being generated as the first reflection signal 315, and reaches the reflective surface of the half mirror 312. It is assumed here that the signal includes the phase fluctuations $\phi$. Because the first reflection signal 315 does not pass through the half-wavelength plate, it has a zero phase difference between the polarized components orthogonal to each other.

The second split signal 311-2 is a signal that propagates over a second path. The second path is a path that runs through the reflective surface of the half mirror 312 and through the first uniaxial crystal 320, i.e. half-wavelength plate, reflects from the second total reflection mirror 322, and passes back through the first uniaxial crystal 320 to the reflective surface of the half mirror 312. The signal 320a is a signal that has passed through the first uniaxial crystal 320 once. The signal 320b is a signal that has passed through the first uniaxial crystal 320 twice. The second split signal 311-2 passes and returns through the first uniaxial crystal 320 as shown in FIG. 19B and reaches, as the second reflection signal 321, the reflective surface of the half mirror 312. At this point, a phase difference of $\pi$ occurs between two polarized components: one in an angle of 45 degrees with respect to the x-axis and the other in an angle of 45 degrees with respect to the y-axis. In FIGS. 19B and 19C, in order to easily distinguish from the oscillation of the electric field vector of the first reflection signal 315 in FIG. 19A, the oscillation of the electric field vector of the second reflection signal 321 is shown by a broken line.

The first and second reflection signals 315 and 321 interfere at the reflective surface of the half mirror 312, thus generating an interference signal 317. The signal 317 then enters the second uniaxial crystal 324. The first and second reflection signals 315 and 321 have interference between their components that oscillate in the same direction. The interference causes a signal 324a.

The components perpendicular to the crystal axis of the first uniaxial crystal 320 interfere in the relationship shown in FIG. 5, parts (A) and (B), thus providing an interference signal having a temporal waveform shown in part (D). The components perpendicular to the crystal axis of the first uniaxial crystal 320 interfere in the relationship shown in parts (A) and (C), thus providing an interference signal having a temporal waveform shown in part (E). The crystal axis of the first uniaxial crystal 320 is adjusted as follows. The axis is in parallel with the polarization direction of the interference signal 317. The crystal 320 provides a phase difference of $\pi/2$ with respect to the polarized component perpendicular to the polarization direction of the signal 317, the phase difference being equal to $\pi$ when passing and returning through the crystal 320.

The interference signal 317 passes through the analyzer 326, thus providing interference between its component in parallel with the crystal axis of the first uniaxial crystal 320 and its component perpendicular to the crystal axis. An interference signal 327 is then generated and output. The interference signal 327 has temporal waveforms that equal those shown in FIG. 5, parts (G-1), (G-2) and (G-3). The interference signal 327 is thus an optical signal equivalent to the first multiple monitor signal 53 in FIG. 4 and is also an optical signal similar to the interference monitor signal output from the optical carrier interferometer in the first, second and third OTDM-DPSK signal generator systems. The optical carrier interferometer using the second bulk optical element may thus generate and output the first multiple monitor signal from the monitor signal.

The optical carrier interferometer using the second bulk optical element may use only one half mirror 312. This interferometer may thus use fewer parts than the optical carrier interferometer using the first bulk optical element to provide the equivalent function, thus providing compactness.

The entire disclosure of Japanese patent application No. 2006-265680 filed on Sep. 28, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An optical time division multiplexing differential phase shift keying (OTDM-DPSK) signal generator system, comprising:
   an OTDM-DPSK signal generator, including
      an optical splitter splitting an optical pulse string into a first optical pulse string and a second optical pulse string,
      a first and a second phase modulator that receive the first and second optical pulse strings, generating and outputting a first and a second channel differential phase shift keying (DPSK) signal coded in DPSK scheme respectively,
      an optical coupler that provides the first and second channel DPSK signals with an optical time division multiplexing, generating and outputting a duplex OTDM-DPSK signal, and
      a monitor signal splitter that splits a monitor signal, from the duplex OTDM-DPSK signal; and
   an optical carrier phase difference detector receiving the monitor signal, and generating and outputting an optical carrier phase difference detection signal as a function of an optical carrier phase difference between optical pulses in the monitor signal, wherein
   said OTDM-DPSK signal generator comprises a bit delay device, said bit delay device providing the second channel DPSK signal with a time delay necessary to bit interleave each of the first and second channel DPSK signals to provide them with the optical time division multiplexing, the time delay corresponding to half of the time on a time axis occupied by one of the optical pulses in the second channel DPSK signal.

2. An optical time division multiplexing differential phase shift keying (OTDM-DPSK) signal generator system, comprising:
   an OTDM-DPSK signal generator, including
      an optical splitter splitting an optical pulse string into a first optical pulse string and a second optical pulse string,
      a first and a second phase modulator that receive the first and second optical pulse strings, generating and outputting a first and a second channel differential phase shift keying (DPSK) signal coded in DPSK scheme respectively,
      an optical coupler that provides the first and second channel DPSK signals with an optical time division multiplexing, generating and outputting a duplex OTDM-DPSK signal, and
      a monitor signal splitter that splits a monitor signal, from the duplex OTDM-DPSK signal; and
   an optical carrier phase difference detector receiving the monitor signal, and generating and outputting an optical carrier phase difference detection signal as a function of an optical carrier phase difference between optical pulses in the monitor signal, said optical carrier phase difference detector including:
      an optical carrier interferometer that receives the input monitor signal, and modulates, depending on the optical carrier phase difference between the optical pulses in the monitor signal, intensity of the monitor signal to generate interference light, and outputs the interference light as an interference monitor signal; and
      an interference signal detector that receives the interference monitor signal, generating and outputting an optical carrier phase difference detection signal, said interference signal detector comprising:
         a photoelectric converter that photoelectrically converts the interference multiple monitor signal, outputting an electrical interference signal;
         a low-pass filter that cuts off a high frequency component of the electrical interference signal, outputting a low frequency electrical interference signal; and
         an intensity detector that detects a time average intensity of the low frequency electrical interference signal, outputting the optical carrier phase difference detection signal.

3. The OTDM-DPSK signal generator system in accordance with claim 2, wherein
   said optical carrier interferometer comprises a first optical splitter, a second optical splitter, a third optical splitter, a $\pi$ phase shifter, a $\pi/2$ phase shifter, a first optical coupler, a second optical coupler, and a third optical coupler,
   said first optical splitter intensity splits the monitor signal into a first and a second split monitor signal and outputs the signals to a first and a second arm waveguide, respectively,
   said second optical splitter splits the first split monitor signal according to its intensity into a (1-1)th and a (1-2)th split monitor signal and outputs the signals to a (1-1)th and a (1-2)th arm waveguide, respectively,
   said third optical splitter splits the second split monitor signal according to its intensity into a (2-1)th and a (2-2)th split monitor signal and outputs the signals to a (2-1)th and a (2-2)th arm waveguide, respectively,
   said (1-1)th and (1-2)th arm waveguides have optical path length set so that the (1-1)th and (1-2)th split monitor signals have a time delay difference therebetween corresponding to a time occupied by one of the optical pulses on a time axis,
   said (2-1)th and (2-2)th arm waveguides have optical path length set so that the (2-1)th and (2-2)th split monitor signals have a time delay difference therebetween corresponding to a time occupied by one of the optical pulses on a time axis,
   said $\pi$ phase shifter is provided in said (2-2)th arm waveguide, and shifts an optical carrier phase of the (2-2)th split monitor signal by $\pi$, generating and outputting a $\pi$ phase shifted (2-2)th split monitor signal,
   said second optical coupler multiplexes the (1-1)th and (1-2)th split monitor signals that have propagated over said (1-1)th and (1-2)th arm waveguides, respectively, generating and outputting a second multiple monitor signal, said third optical coupler multiplexes the πphase shifted (2-2)th split monitor signal output from said π phase shifter and the (2-1)th split monitor signal that has propagated over said (2-1)th arm waveguide, generating and outputting a third multiple monitor signal, said π/2 phase shifter shifts an optical carrier phase of the third multiple monitor signal by π/2, generating and outputting a π/2 phase shifted third multiple monitor signal, said first optical coupler multiplexes the second multiple monitor signal output from said second optical coupler and the π/2 phase shifted third multiple monitor signal, generating and outputting the first multiple monitor signal, an optical path length from said first optical splitter to said second optical splitter is set substantially equal to an optical path length from said first optical splitter to said third optical splitter, and an optical path length from said second optical coupler to said first optical coupler is set substantially equal to an optical path length from said third optical coupler to said first optical coupler.

4. The OTDM-DPSK signal generator system in accordance with claim 2, wherein said optical carrier interferometer comprises a first half mirror, a ¼-wavelength plate, a second half mirror, a first ½-bit delay device, a first phase fine adjustment device, a first total reflection mirror, a second total reflection mirror, a third half mirror, a second ½-bit delay device, a second phase fine adjustment device, a third total reflection mirror, and a fourth total reflection mirror, said second half mirror, said first ½-bit delay device, said first phase fine adjustment device, and said first total reflection mirror are provided in series in a direction in which an input signal passes through said first half mirror, said first half mirror, said ¼-wavelenth plate, said first half mirror, said third half mirror, said second ½-bit delay device, said second phase fine adjustment device, and said third total reflection mirror are provided in series in a direction in which an input signal reflects from said first half mirror, said second total reflection mirror is provided on a side of said second half mirror to which signal light passing through said first half mirror is reflected and output by said second half mirror, and said fourth total reflection mirror is provided on a side of said third half mirror to which signal light passing through said first half mirror is reflected and output by said third half mirror.

5. The OTDM-DPSK signal generator system in accordance with claim 2, wherein said optical carrier interferometer comprises a polarizer, a half mirror, a ½-bit delay device, a first total reflection mirror, a first uniaxial crystal, a second total reflection mirror, a second uniaxial crystal, and an analyzer, said polarizer, said half mirror, said first uniaxial crystal, and said second total reflection mirror are provided in series in a direction in which an input signal passes through said half mirror, said ½-bit delay device and said first total reflection mirror are provided in sequence from an output end surface of said half mirror to which input signal light is reflected and output by said half mirror, and said second uniaxial crystal and said analyzer are provided in sequence from an end surface opposite to the end surface of said half mirror to which input signal light is reflected and output by said half mirror.

6. An optical time division multiplexing differential phase shift keying (OTDM-DPSK) signal generator system comprising:

an OTDM-DPSK signal generator; and
an optical carrier phase difference detector,
said OTDM-DPSK signal generator including,
an optical splitter splitting an optical pulse string into a first to a $2^N$th optical pulse string, where N is an integer of 2 or more, a first to a $2^N$th phase modulator that receive the first to $2^N$th optical pulse strings, generating and outputting a first to a $2^N$th channel differential phase shift keying (DPSK) signal coded in DPSK scheme, respectively, a plurality ($2^N-1$) of optical couplers that provide the first to $2^N$th channel DPSK signals with an optical time division multiplexing, generating and outputting $2^N$-multiple OTDM-DPSK signals, a plurality ($2^{N-1}$) of first-order monitor signal splitters that split, from a plurality ($2^{N-1}$) of first-order OTDM-DPSK signals, first-order monitor signals, respectively, the ($2^{N-1}$) first-order signals being generated from adjacent ith channel and (i+1)th channel DPSK signals provided with an optical time division multiplexing, where i is an integer from 1 to $2^{N-1}$, a plurality ($2^{N-k}$) of kth-order monitor signal splitters that split, from a plurality ($2^{N-k}$) of kth-order OTDM-DPSK signals, kth-order monitor signals, respectively, where k is an integer from 1 to N, said optical carrier phase difference detector receiving the first to kth-order monitor signals, and generating and outputting a plurality ($2^{N-1}$) of optical carrier phase difference detection signals as a function of optical carrier phase differences respectively present between optical pulses in each of the first to kth-order monitor signals.

7. The OTDM-DPSK signal generator system in accordance with claim 6, wherein said OTDM-DPSK signal generator comprising a bit delay circuit, said bit delay circuit providing each of the first to $2^N$th channel DPSK signals with a time delay necessary to bit interleave the signals to provide them with the optical time division multiplexing.

8. The OTDM-DPSK signal generator system in accordance with claim 6, wherein said optical carrier phase difference detector comprises:

a plurality (k) of optical carrier interferometers that receive the input first to kth order monitor signals, and modulate, depending on the optical carrier phase differences respectively present between the optical pulses in the first to kth order monitor signals, intensity of the first to kth order monitor signals to generate interference light, and output the interference light as first to kth interference monitor signals, respectively; and an interference signal detector that receives the kth interference monitor signals, generating and outputting the ($2^{N-1}$) optical carrier phase difference detection signals, said interference signal detector comprising:

a plurality (k) of photoelectric converters that photoelectrically convert the first to kth interference multiple monitor signals, outputting first to kth electrical interference signals, respectively;

a low-pass filter that cuts off high frequency components of the first to kth electrical interference signals, outputting first to kth low frequency electrical interference signals, respectively; and an intensity detector that detects a time average intensity of the first to kth low frequency electrical interference signals, outputting the ($2^{N-1}$) optical carrier phase difference detection signals.

9. An optical time division multiplexing differential phase shift keying (OTDM-DPSK) signal generator system comprising:

an OTDM-DPSK signal generator;

an optical carrier phase difference detector; and an optical carrier phase difference controller, said OTDM-DPSK signal generator including, an optical splitter splitting an optical pulse string into a first to a $2^N$th optical pulse string, where N is an integer of 2 or more, a first to a $2^N$th phase modulator that receive the first to $2^N$th optical pulse strings, generating and outputting a first to a $2^N$th channel differential phase shift keying (DPSK) signal coded in DPSK scheme, respectively, a plurality ($2^{N-1}$) of optical couplers that provide the first to $2^N$th channel DPSK-signals with an optical time division multiplexing, generating and outputting $2^N$-multiple OTDM-DPSK signals, and a plurality ($2^{N-1}$) of first-order monitor signal splitters that splits, from a plurality ($2^{N-1}$) of first-order OTDM-DPSK signals, first-order monitor signals, respectively, the ($2^{N-1}$) first-order signals being generated from adjacent ith channel and (i+1)th channel DPSK signals provided with an optical time division multiplexing, where i is an integer from 1 to $2^{N-1}$, a plurality ($2^{N-k}$) of kth-order monitor signal splitters that split, from a plurality ($2^{N-k}$) of kth-order OTDM-DPSK signals, kth-order monitor signals, respectively, where k is an integer from 1 to N, said optical carrier phase difference detector receiving the first to kth-order monitor signals, and generating and outputting a plurality ($2^{N-1}$) of optical carrier phase difference detection signals as a function of optical carrier phase differences respectively present between optical pulses in each of the first to kth-order monitor signals, and said optical carrier phase difference controller receiving the ($2^{N-1}$) optical carrier phase difference detection signals, and generating and outputting an optical carrier phase difference control signal to control said OTDM-DPSK signal generator so that fluctuations defined as an offset from a phase value zero or π to be taken by an optical carrier phase of optical pulses in the OTDM-DPSK signal are reduced to zero.

10. The OTDM-DPSK signal generator system in accordance with claim 9, wherein said optical carrier phase difference controller comprises:

a bias signal adjustment device that supplies said first to $2^N$th phase modulators with a first to a $2^N$th bias adjustment signal, respectively; and a first to a $2^N$th signal coupler that couple and add the first to $2^N$th bias adjustment signals to a first to a $2^N$th channel transmission signal supplied from a first to a $2^N$th modulator driver, respectively.

11. An optical time division multiplexing differential phase shift keying (OTDM-DPSK) signal generator system comprising:

an OTDM-DPSK signal generator; and an optical carrier phase difference detector, said OTDM-DPSK signal generator comprising, a wavelength division multiplexing coupler that adds an optical pulse string at a wavelength of $\lambda_1$ and an optical pulse string at a wavelength of $\lambda_2$, where $\lambda_1 \doteq \lambda_2$, generating and outputting a multiple wavelength optical pulse string, an optical splitter splitting the multiple wavelength optical pulse string into a first multiple wavelength optical pulse string and a second multiple wavelength optical pulse string, a first and a second phase modulator that receive the first and second multiple wavelength optical pulse strings, generating and outputting a first and a second channel differential phase shift keying (DPSK) signal coded in DPSK scheme, respectively, an optical coupler that provides the first and second channel DPSK signals with an optical time division multiplexing, generating and outputting a duplex OTDM-DPSK signal, and a wavelength division multiplexing splitting filter that splits the duplex OTDM-DPSK signal into an OTDM-DPSK signal at a wavelength of $\lambda_1$ and a monitor signal at a wavelength of $\lambda_2$, said optical carrier phase difference detector receiving the monitor signal, generating and outputting an optical carrier phase difference detection signal as a function of an optical carrier phase difference between optical pulses in the monitor signal.

12. An optical time division multiplexing differential phase shift keying (OTDM-DPSK) signal generator system comprising:

an OTDM-DPSK signal generator; and an interference signal detector, said OTDM-DPSK signal generator comprising, a wavelength division multiplexing coupler that adds an optical pulse string at a wavelength of $\lambda_1$ and an optical pulse string at a wavelength of $\lambda_2$, where $\lambda_1 \doteq \lambda_2$, generating and outputting a multiple wavelength optical pulse string, an optical splitter splitting the multiple wavelength optical pulse string into a first multiple wavelength optical pulse string and a second multiple wavelength optical pulse string, a first and a second phase modulator that receive the first and second multiple wavelength optical pulse strings, generating and outputting a first and a second channel differential phase shift keying (DPSK) signal coded in DPSK scheme, respectively, a compound optical add drop module that receives the first and second channel DPSK signals and provides the signals with an optical time division multiplexing, generating and outputting a duplex OTDM-DPSK signal and generating and outputting an interference monitor signal at a wavelength of $\lambda_2$, said interference signal detector receiving the interference monitor signal, generating and outputting an optical carrier phase difference detection signal as a function of an optical carrier phase difference between optical pulses in the interference monitor signal.

13. The OTDM-DPSK signal generator system in accordance with claim 12, wherein said compound optical add drop module includes a first half mirror, a second half mirror, a third half mirror, a ¼-wavelenth plate, and a fourth half mirror, said second half mirror is provided at an output of said first half mirror to which the first channel DPSK signal incident on said first half mirror is reflected and output, said third half mirror is provided at an output of said first half mirror to which the first channel DPSK signal incident on said first half mirror is transmitted and output, said ¼-wavelenth plate is provided at an output of said third half mirror to which the first channel DPSK signal incident on said third half mirror is reflected and output, and said fourth half mirror is provided at a position where signal light reflected and output from said second half mirror and signal light reflected and output from said third half mirror interfere.

* * * * *